(12) United States Patent
Kanazawa et al.

(10) Patent No.: US 6,249,500 B1
(45) Date of Patent: *Jun. 19, 2001

(54) DISK LOADING SYSTEM FOR A MAGNETO-OPTICAL DISK DRIVE

(75) Inventors: Hiroshi Kanazawa; Shimpei Shinozaki; Isao Okuda; Suguru Takishima, all of Tokyo (JP)

(73) Assignee: Asahi Kogaku Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,873

(22) Filed: Mar. 31, 1998

Related U.S. Application Data

(62) Division of application No. 08/337,228, filed on Nov. 4, 1994, now Pat. No. 5,768,241.

(30) Foreign Application Priority Data

| Nov. 6, 1993 | (JP) | 5-300868 |
| Nov. 6, 1993 | (JP) | 5-300869 |
| Nov. 6, 1993 | (JP) | 5-300870 |
| Nov. 6, 1993 | (JP) | 5-300871 |
| Nov. 6, 1993 | (JP) | 5-300872 |
| Nov. 6, 1993 | (JP) | 5-300873 |
| Nov. 6, 1993 | (JP) | 5-300875 |

(51) Int. Cl.$^7$ .............. G11B 33/92; G11B 17/04

(52) U.S. Cl. .............. 369/77.2; 360/99.06

(58) Field of Search .............. 360/99.06, 99.02, 360/99.03, 99.07; 369/77.2, 75.2; 242/338, 338.4

(56) References Cited

U.S. PATENT DOCUMENTS

| 4,794,481 | * 12/1988 | Suyama et al. | 360/99.06 |
| 4,835,646 | 5/1989 | Kurosawa et al. | 360/109 |
| 4,851,938 | 7/1989 | Inami | 360/69 |
| 4,862,445 | 8/1989 | Sasaki | 369/75.2 |
| 4,866,552 | 9/1989 | Nagase | 360/96.5 |

(List continued on next page.)

FOREIGN PATENT DOCUMENTS

| 2-148458 | * 6/1990 | (JP) . |
| 4-61060 | 2/1992 | (JP) . |
| 4-78058 | 3/1992 | (JP) . |
| 4-355242 | 12/1992 | (JP) . |
| 5-282733 | 10/1993 | (JP) . |

OTHER PUBLICATIONS

An English Language Translation of JP 5–282733.

Primary Examiner—David Davis
(74) Attorney, Agent, or Firm—Greenblum & Bernstein, P.L.C.

(57) ABSTRACT

A disk cartridge loading system for a disk drive. The loading system includes a disk cartridge holder, a drawing mechanism, a draw-in sensor, a loading sensor, and a controller. The drawing mechanism engages a partially inserted disk cartridge to fully draw the disk cartridge into the disk drive, so that the disk cartridge is accommodated in a disk cartridge holder. A holder moving mechanism moves the disk cartridge holder to a loading position, so that at least one of a data reading operation and a data writing operation can be performed. A draw-in sensor is provided to detect the partial insertion of the disk cartridge, while a loading sensor detects when the disk cartridge is located at the loading position. A control unit controls the drawing mechanism and the holder moving mechanism, based on a first signal produced by the draw-in sensor and a second signal produced by the loading sensor.

17 Claims, 89 Drawing Sheets

U.S. PATENT DOCUMENTS

| | | | |
|---|---|---|---|
| 4,891,727 | * 1/1990 | Sato et al. | 360/137 |
| 4,989,109 | 1/1991 | Morisawa | 360/106 |
| 4,995,027 | * 2/1991 | Aoyagi et al. | 369/77.1 |
| 5,032,942 | 7/1991 | Kurosawa et al. | 360/109 |
| 5,062,019 | 10/1991 | Morisawa | 360/106 |
| 5,111,350 | 5/1992 | Carey et al. | 360/99.06 |
| 5,119,358 | 6/1992 | Soga | 369/75.2 |
| 5,124,975 | 6/1992 | Naoki et al. | 369/291 |
| 5,126,899 | 6/1992 | Kanazawa | 360/99.07 |
| 5,142,523 | * 8/1992 | Kamoshita | 369/75.2 |
| 5,202,797 | 4/1993 | Kurosawa | 360/15 |
| 5,249,091 | 9/1993 | Shimzu et al. | 360/99.06 |
| 5,258,965 | * 11/1993 | Sekine et al. | 369/13 |
| 5,291,536 | 3/1994 | Matsumoto et al. | 378/35 |
| 5,301,176 | * 4/1994 | Kawachi et al. | 369/75.2 |
| 5,335,124 | 8/1994 | Yokota | 360/99.06 |
| 5,371,641 | * 12/1994 | Kim | 360/96.5 |
| 5,502,704 | 3/1996 | Ohmori | 369/77.2 |
| 5,577,008 | 11/1996 | Kanazawa et al. | 369/77.2 |
| 5,587,973 | 12/1996 | Kawazawa et al. | 369/77.2 |

* cited by examiner

Following Electromagnetic Fail-Safe Action

Drive Mechanism Return Following Fail-Safe Action of Fig. 61

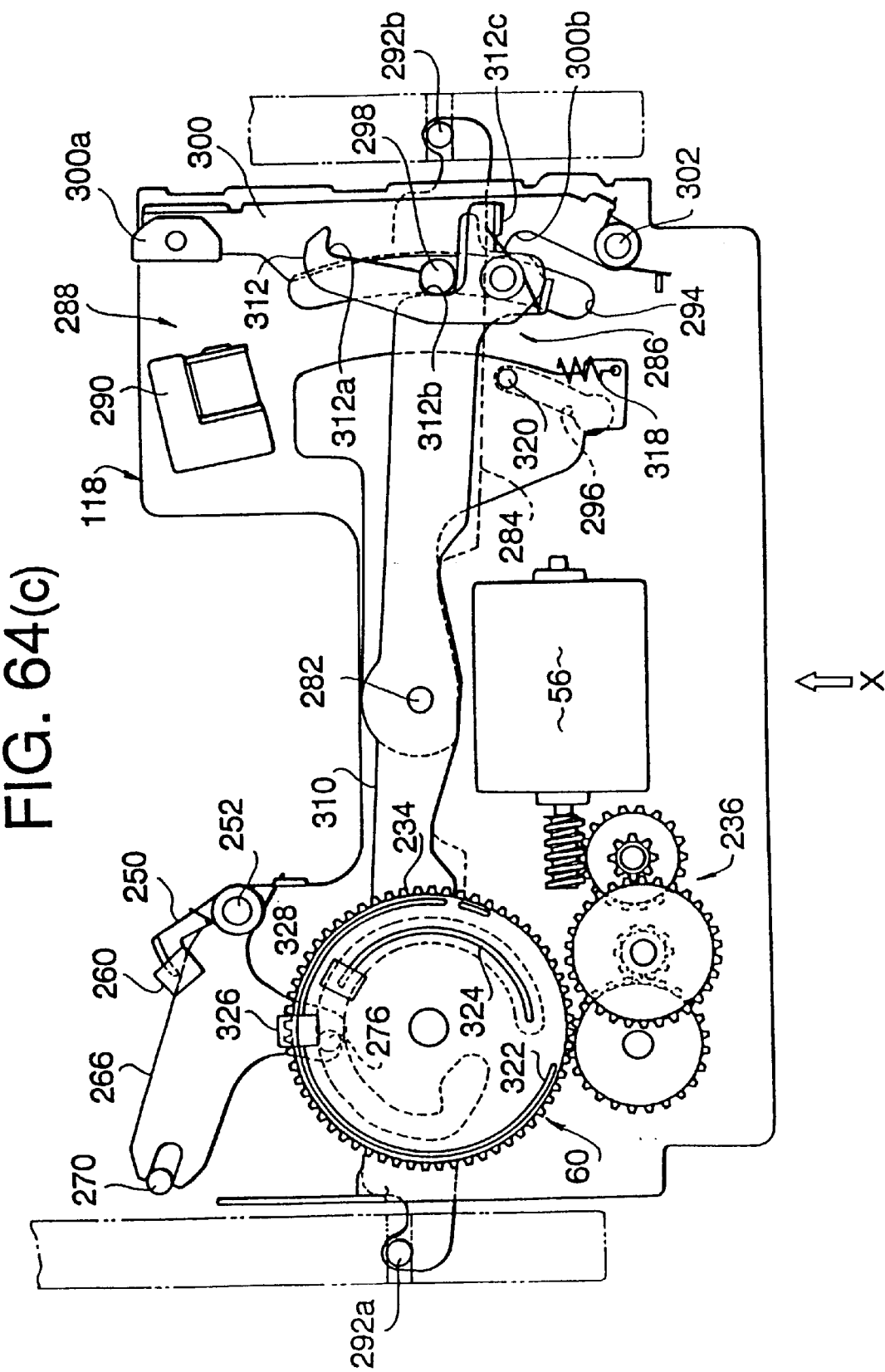

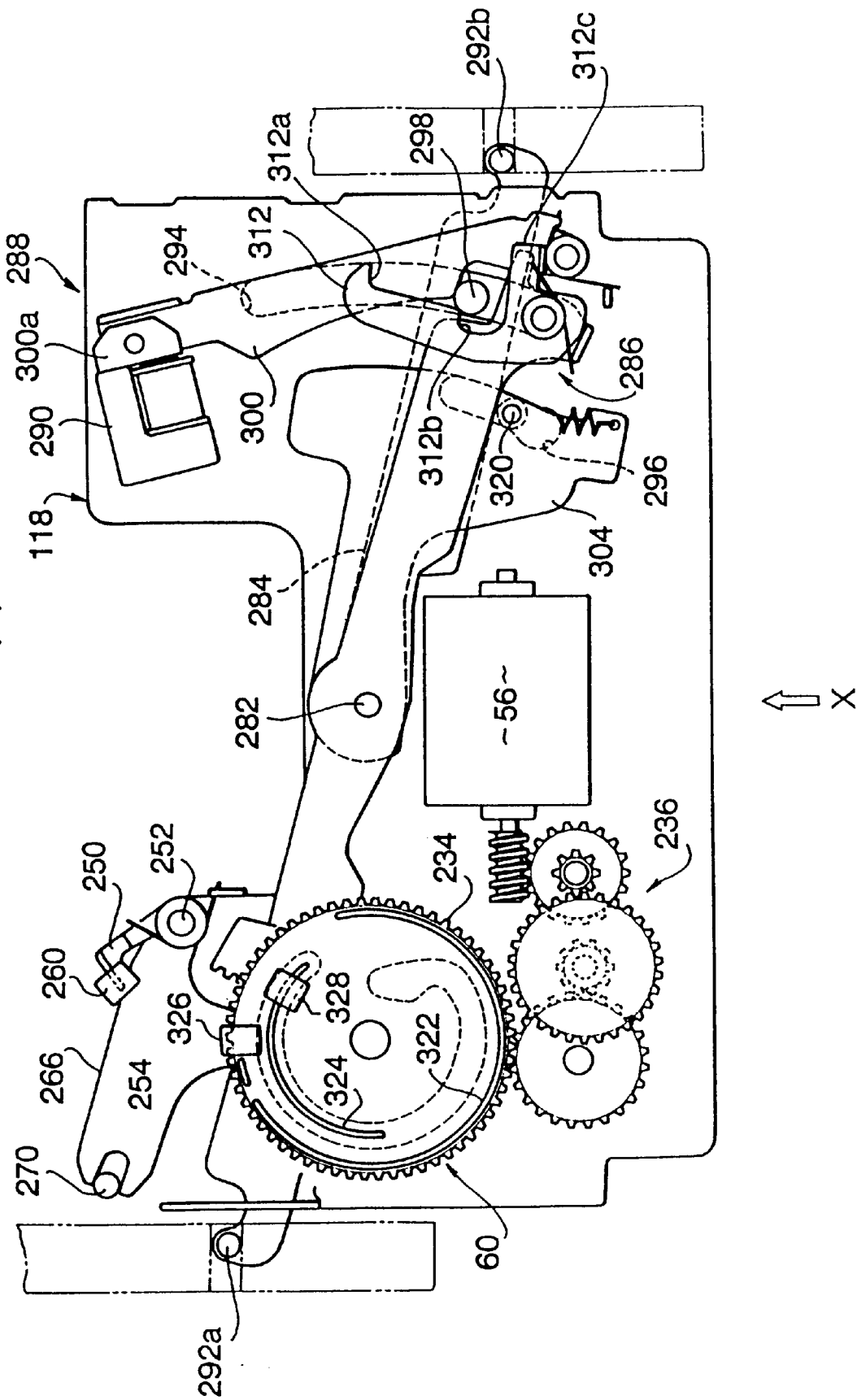

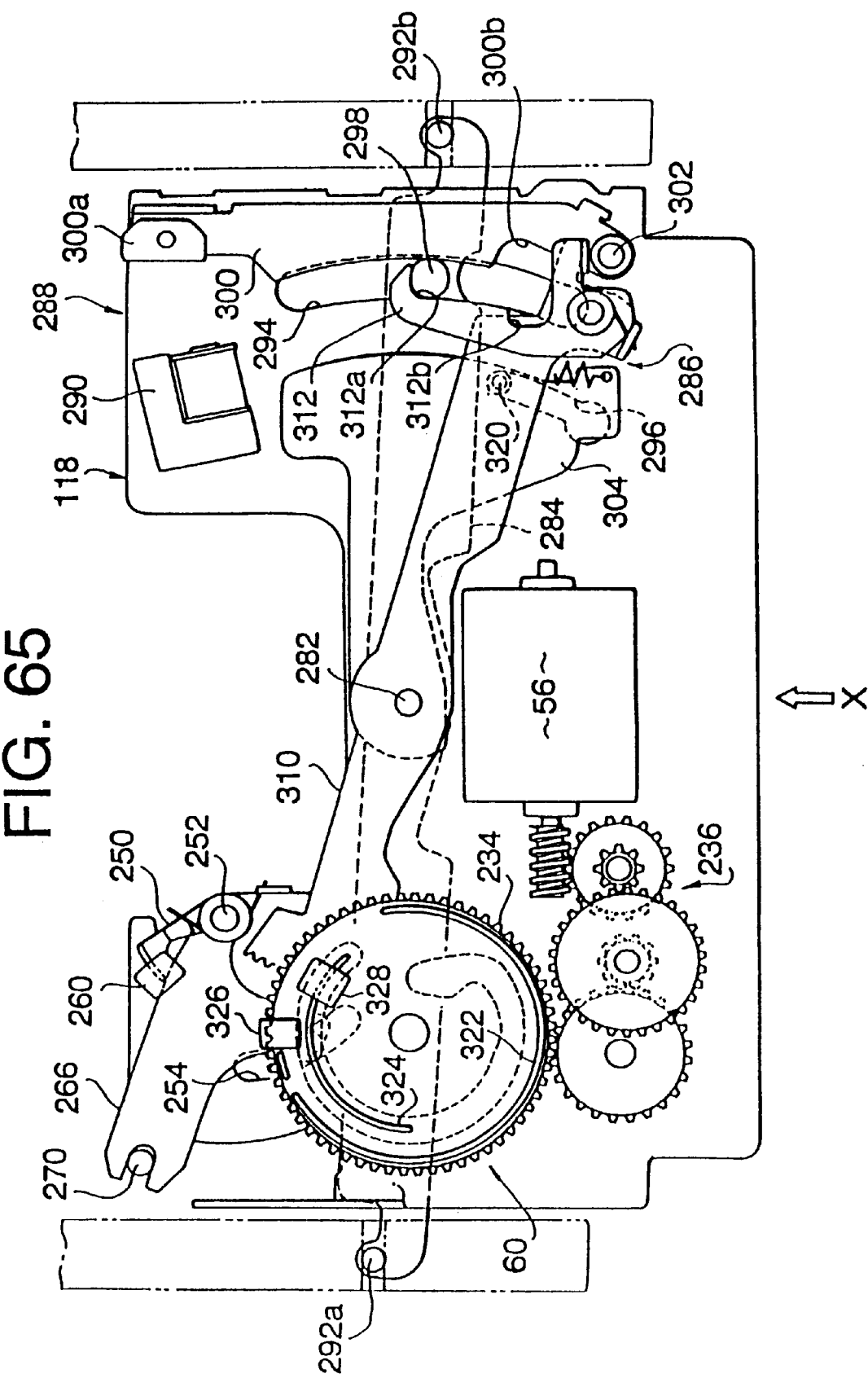

DISK LOADING SYSTEM FOR A MAGNETO-OPTICAL DISK DRIVE

This is a division of Application Ser. No. 08/337,228, filed on Nov. 4, 1994, now U.S. Pat. No. 5/768,241, the contents of which are herein incorporated by reference in its entirety.

BACKGROUND OF THE INVENTION

The present invention relates to magneto-optical disk drives, and specifically to systems for the mechanical operation of a disk drive. Conventional systems for governing the operation of a magneto-optical (MO) disk drive, including systems for the insertion of disk-bearing cartridges, applying a magnetic head, and allowing access to the interior of the disk drive, require many sensors and switches and complicated control circuits and routines. These systems are typically difficult to synchronize, and difficult to immobilize during transportation of the disk drive. If a mechanism such as a spring-loaded cartridge insertion and ejection mechanism is used, the operation is typizilfy unstable and may jar the precision alignment of the internal reading are writing mechanisms. When moving parts are moved into position, misalignment and unstable positioning is an additional problem.

Furthermore, although shutters covering a cartridge insertion slot are well-known, where, the body of an inserted disk cartridge is used to partially block dust or dirt from the MO disk drive interior, such shutters are unable to completely block the cartridge insertion slot, leaving the disk cartridge and sensitive optical components of the disk drive exposed to dust and dirt.

SUMMARY OF THE INVENTION

It is therefore an object of the invention to provide an improved shutter operating mechanism that enables a shutter plate to be easily moved in synchronization with cartridge loading operations into a closed position when a disk drive holds a disk cartridge and is empty of a disk cartridge, and into a fully retracted position when a cartridge is being inserted.

It is another object of the present invention to provide a disk cartridge loading system for a disk drive that draws a cartridge into a cartridge holder and moves the cartridge holder into a reading/writing position, using very few sensors and parts and in a single, smooth motion.

It is another object of the present invention to provide a timing control system for a disk drive that is capable of moving both a disk cartridge holder and a magnetic head between various operating positions using a simple control with few sensors and few parts.

It is yet another object of the present invention to provide a vertical positioning system and a horizontal positioning system for a magnetic head base which will securely hold the magnetic head base in a stable position against reference surfaces.

It is yet another object of the present invention to provide a magnetic head carriage locking mechanism which can hold a magnetic head carriage in a secure position when the magnetic head base is away from a writing position.

It is a further object of the present invention to provide a control process and apparatus to pre-align a magnetic head and an optical head before the heads are synchronized to each other.

According to one aspect of the present invention, a shutter operating mechanism (for a shutter for a disk cartridge insertion opening of a disk drive) includes a shutter plate, which has a closed position and a retracted position. The closed position fully closes the cartridge insertion opening, and the retracted position is completely retracted from a loading path of an inserted cartridge. The shutter operating mechanism further includes a moving mechanism for the shutter plate, which has distinct first, second, and third positions. When the moving mechanism moves to the first position, the shutter plate moves to the closed position, when the moving mechanism moves to the second position, the shutter plate moves to the retracted position, and when the moving mechanism moves to the third position, the shutter plate moves to the closed position.

According to another aspect of the present invention, a disk cartridge loading system includes a disk cartridge holder, a drawing mechanism, a draw-in sensor, a loading sensor, and a controller. The drawing mechanism engages a disk cartridge that has been partially inserted into the disk drive, to fully draw the disk cartridge into the disk drive and accommodate the disk cartridge in a disk cartridge holder. A holder moving mechanism moves the disk cartridge holder to a loading position, so that at least one of a data reading operation and a data writing operation can be performed. A draw-in sensor produces a first signal upon the detection of the partial insertion of the disk cartridge, while a loading sensor produces a second signal when the disk cartridge is located at the loading position. A control unit controls the drawing mechanism and the holder moving mechanism, based on the first signal and the second signal.

According to yet another aspect of the present invention, a timing control system for a magneto-optical disk drive includes a magnetic head base supporting a linearly movable magnetic head (the magnetic head base being movable between at least two magnetic head base positions), a disk cartridge holder for holding a magneto-optical disk (the disk cartridge holder movable between at least two disk cartridge holder positions), a first guiding mechanism (for guiding the magnetic head base to move between the magnetic head base positions when the first guiding mechanism is driven), a second guiding mechanism (for guiding the disk cartridge holder to move between the disk cartridge holder positions when the second guiding mechanism is driven), a motor, a plurality of sensors, and a timing control member driven by the motor (the timing control member unitarily including (a) a driving mechanism for driving the first and second guiding mechanisms, and (b) a plurality of activators to activate the sensors). The motor drives the timing control member in response to the actuation of the sensors by the activators of the timing control member, and the driving mechanism of the timing control member further drives the first and second guiding mechanism to move the disk cartridge holder and the magnetic head base.

According to another aspect of the present invention, a vertical positioning system for a magnetic head base of a magneto-optical disk drive (the magnetic head base supporting a linearly movable magnetic head) includes a housing, a vertical reference surface member provided to the housing, a positioning member provided to the magnetic head base, a guiding member contacting the positioning member for moving the magnetic head base towards the vertical reference surface member, and a resilient biasing member provided to the guiding member to bias the magnetic head base towards the vertical reference surface member. The guiding member moves the positioning member of the magnetic head base towards the vertical reference surface until the positioning member contacts the vertical reference surface member, whereupon the resilient biasing member contacts the positioning mechanism and the guiding mechanism releases the positioning mechanism. The positioning member is held against the vertical reference surface by the resilient bias of the biasing member.

According to another aspect of the present invention, a horizontal positioning system for a magnetic head base of a magneto-optical disk drive (the magnetic head base supporting a linearly movably magnetic head) includes a mechanism for restricting motion of the magnetic head base to have a single rotational degree of freedom in a horizontal plane when the magnetic head base is in a writing position; and a mechanism of resiliently holding the magnetic head against a remote surface from the restricting mechanism when the magnetic head is in the writing position.

According to a further aspect of the present invention, a horizontal positioning system for a magnetic head base of a magneto-optical disk drive (the magnetic head base supporting a linearly movable magnetic head) includes a sliding fit pin provided to the magnetic head base, a sliding fit socket provided to a housing of the disk drive and horizontally aligned to slidably engage the sliding fit pin in a writing position of the magnetic head base, a loose fit pin provided to the magnetic head base, a loose fit socket provided to the housing of the disk drive and horizontally aligned to engage the loose fit pin with a predetermined clearance in the writing position of the magnetic head base, and a resilient biasing mechanism provided to the magnetic head base (the biasing mechanism actuated when the magnetic head base is in a writing position). The engagement of the sliding fit pin and sliding fit socket restricts the movement of the magnetic head base to a rotational motion in a plane. The biasing mechanism resiliently pushes the loose fit pin against a wall of the loose fit socket when actuated, removing the clearance and immobilizing the magnetic head base in a horizontal plane.

According to a further aspect of the present invention, a magnetic head carriage locking system for a magneto-optical drive includes a disk drive housing, a magnetic head base supporting a linear motor (the linear motor further supporting a magnetic head carriage, and the magnetic head carriage further supporting a magnetic head), an engaging member provided to the magnetic head carriage, and a resilient locking mechanism provided to the housing of the disk drive. The resilient locking member engages the engaging member, resiliently locking the magnetic head carriage against movement when the magnetic head carriage is away from a writing position. Preferably, the magnetic head carriage locking mechanism further includes a controller, and the engaging member is provided to an outermost portion of the magnetic head carriage (the outermost portion with reference to a motor hub of a spindle motor of the disk drive). In this case, the controller controls the linear motor to move the disk magnetic head carriage to the outermost position when the magnetic head base is away from a writing position.

According to a further aspect of the present invention, a control process for synchronizing the movements of a magnetic head and an optical head of a magneto-optical disk drive includes the steps of moving the magnetic head to an outermost position with reference to a magneto-optical disk housed in the disk drive, moving the optical head to an outermost position with reference to the magneto-optical disk, detecting if a disk type is writable by means of the optical head, determining if the magnetic head is to be applied to the magneto-optical disk based on the detection, and synchronizing linear positions of the magnetic head and the optical head if the magnetic head is to be applied to the magneto-optical disk.

According to a further aspect of the present invention, a control system for synchronizing the movements of a magnetic head and an optical had of a magneto-optical disk drive includes a controller, a magnetic head carriage (the magnetic head carriage linearly movable and supporting the magnet head, the magnetic head carriage movable between a standby position and a head application position, the standby position being away from a magneto-optical disk held in the drive, and the head application position being proximate to the disk in order for the magnetic head to write to the disk), an optical head carriage (the optical head carriage linearly movable and supporting the optical head, and the optical head able to read at least identification tracks of the disk), and a mechanism for synchronizing linear positions of the magnetic head carriage and the optical head carriage. The magnetic head carriage and the optical head carriage are moved to respective outermost positions of the head carriages when the magnetic head carriage is in the standby position and before the optical head reads the identification tracks of the disk (the outermost positions being with respect to a hub of a magneto-optical disk in the disk drive). The magnetic head carriage is proximate to the outermost position of the magnetic head carriage, and the optical head carriage is at the outermost position of the optical head carriage when the synchronizing mechanism synchronizes the linear positions of the head carriages.

DESCRIPTION OF THE ACCOMPANYING DRAWINGS

Figure 7A:
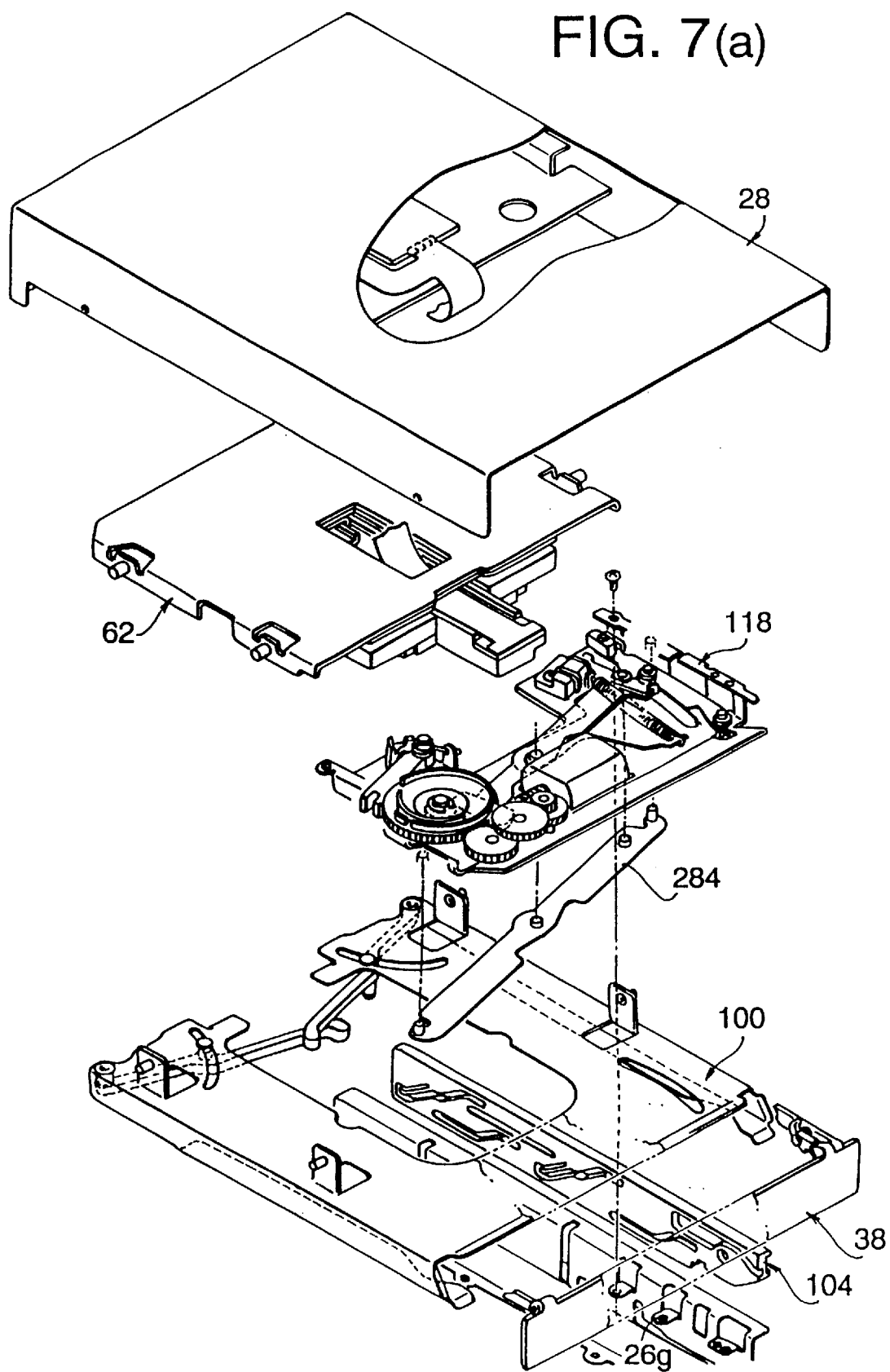
Figure 7B:
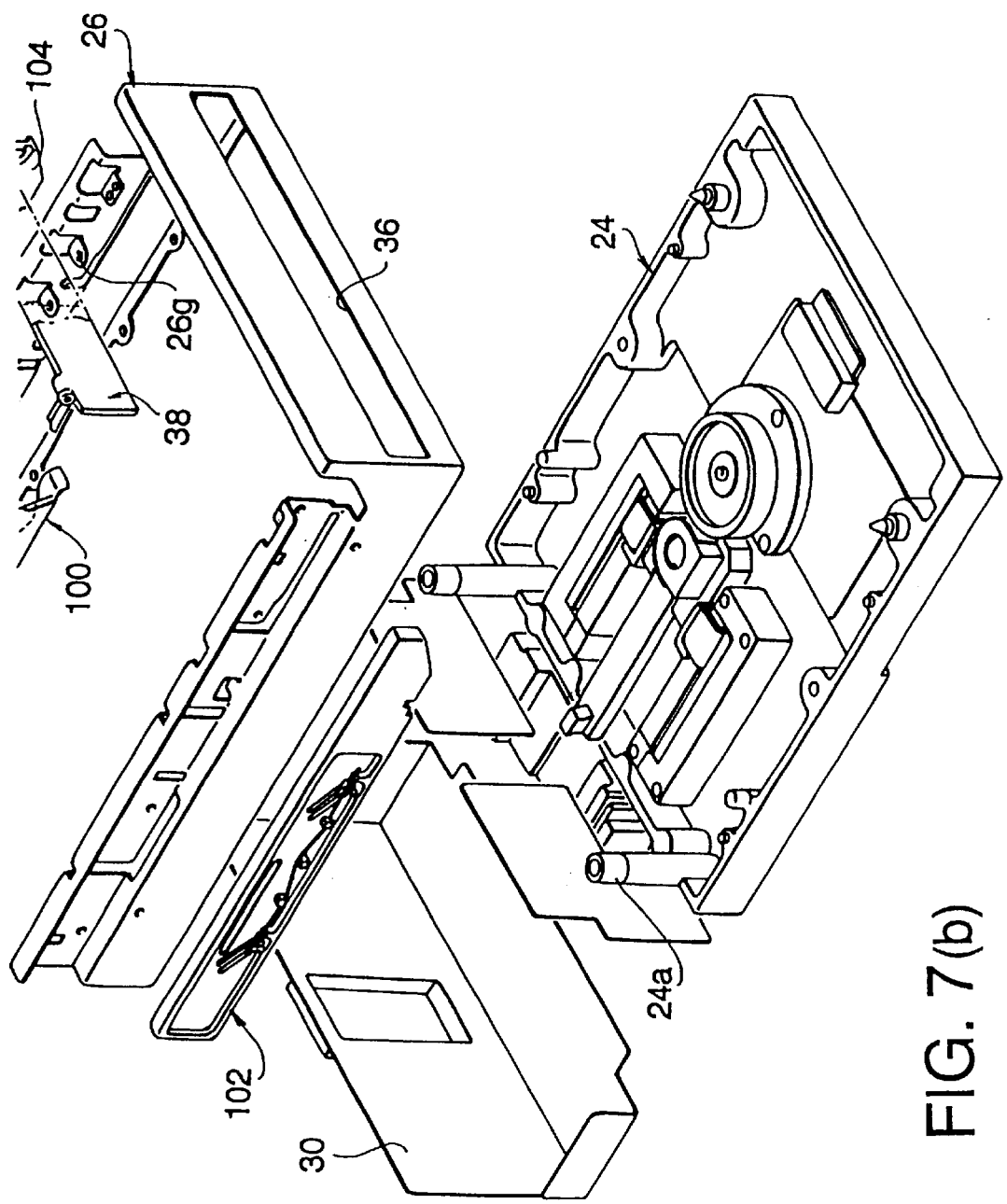
Figure 8:
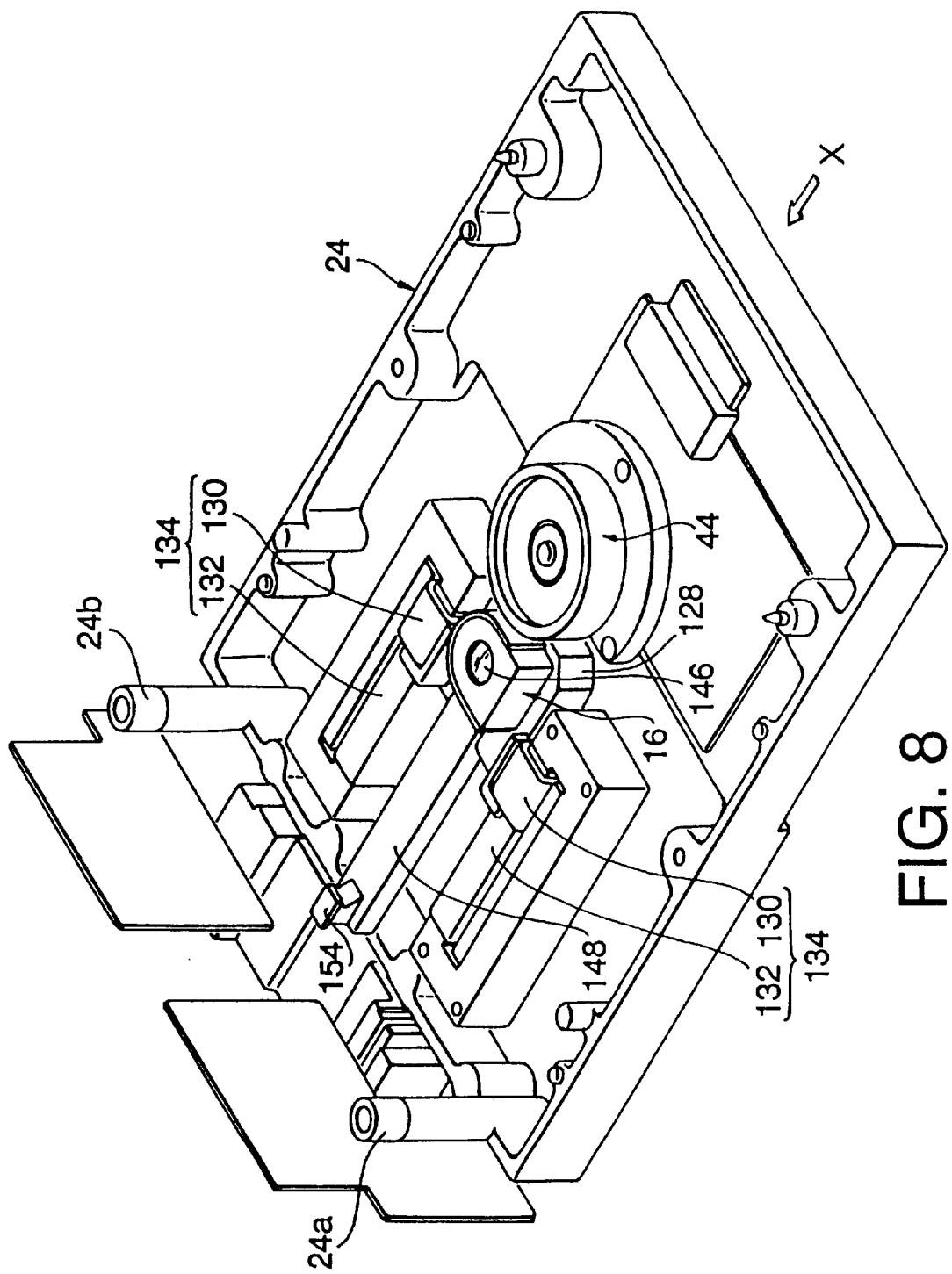
Figure 9:
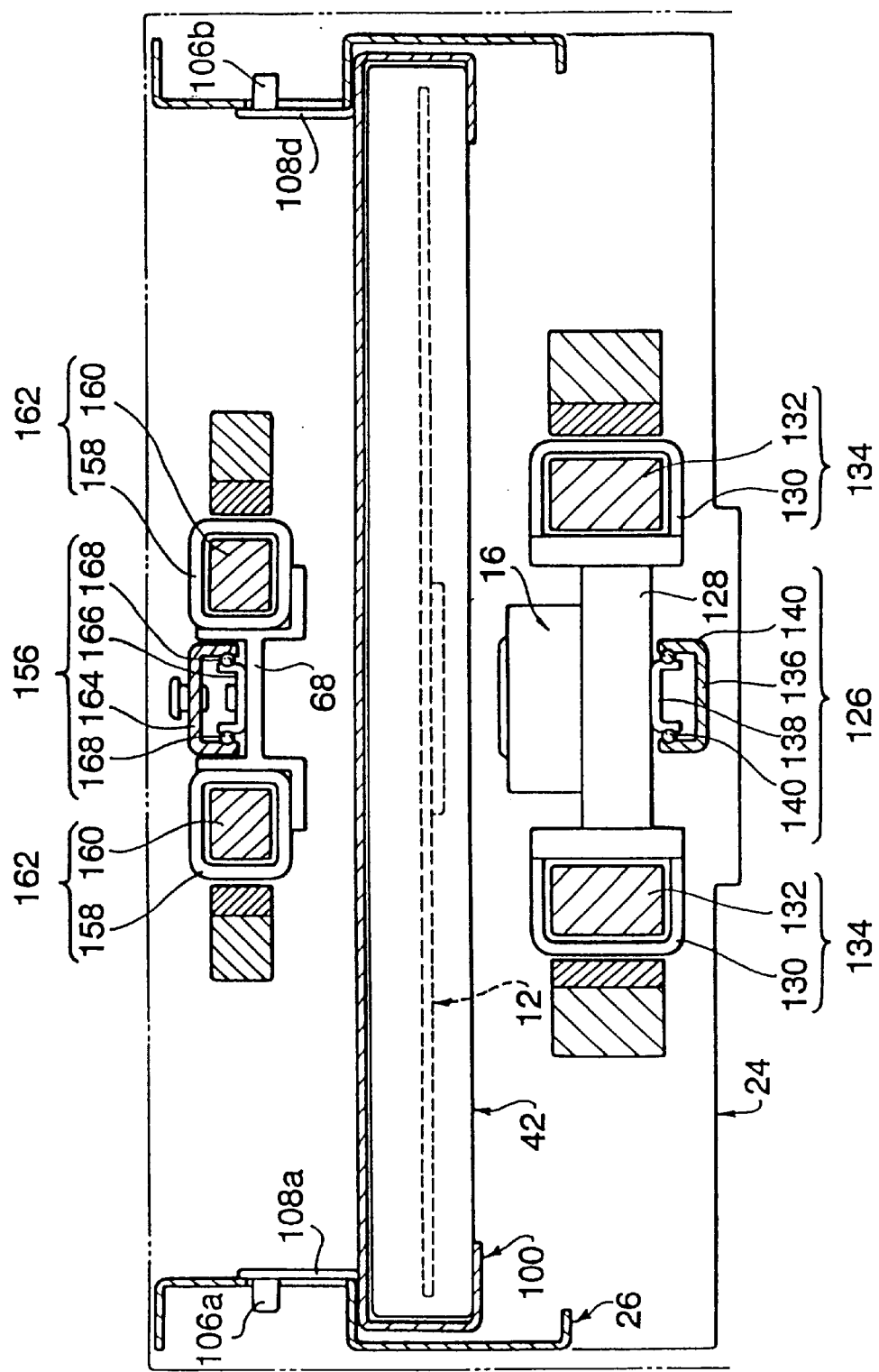
Figure 10:
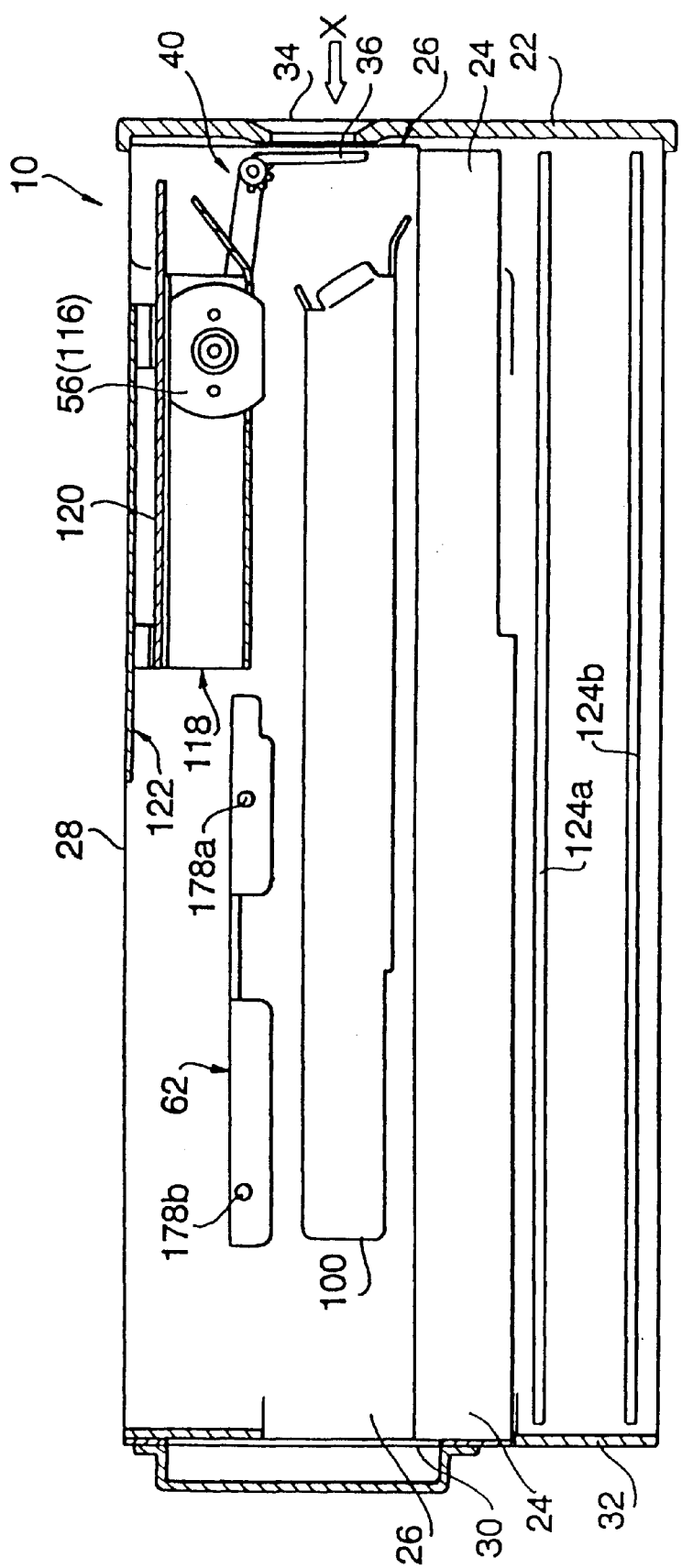
Figure 11:
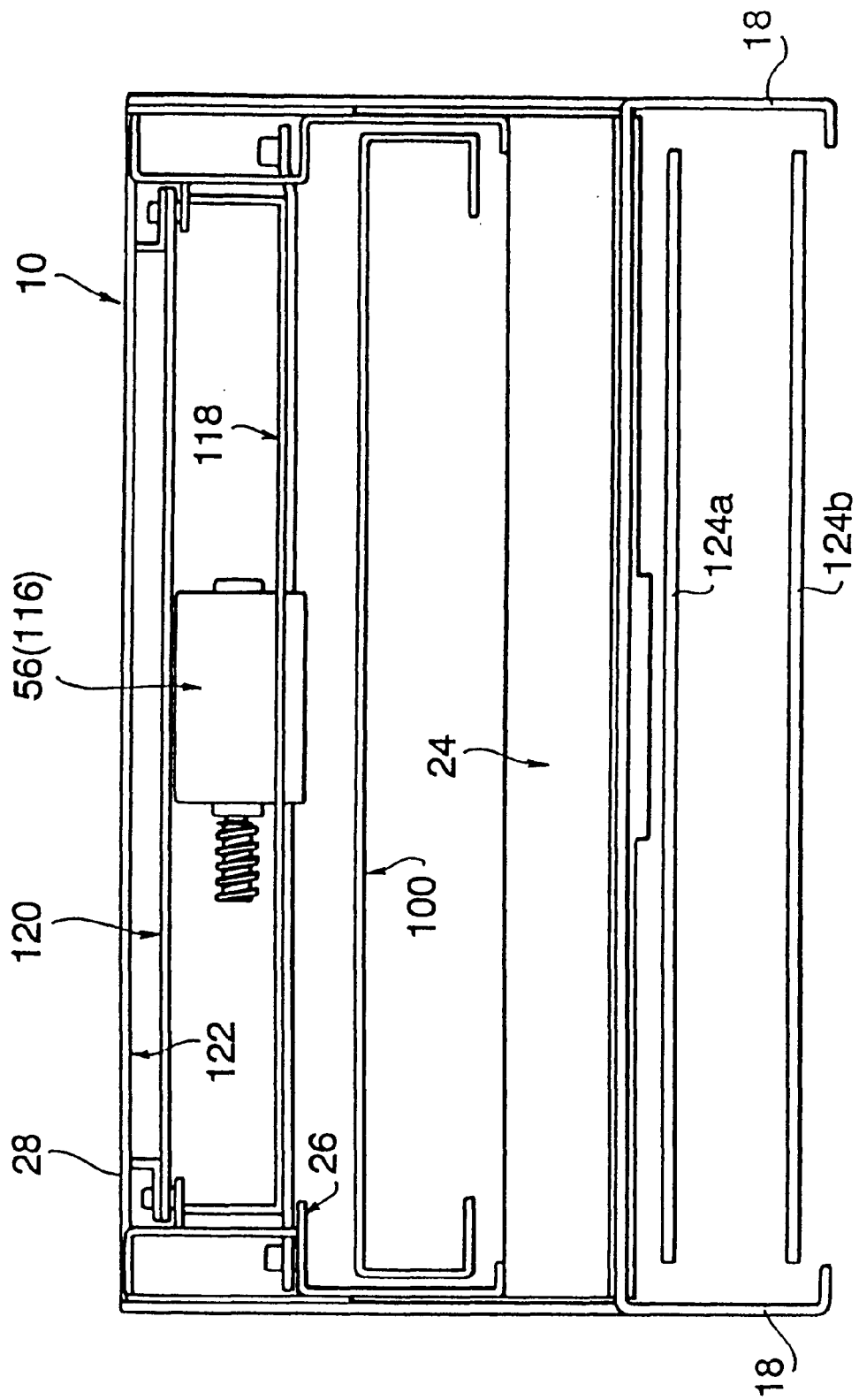
Figure 12:
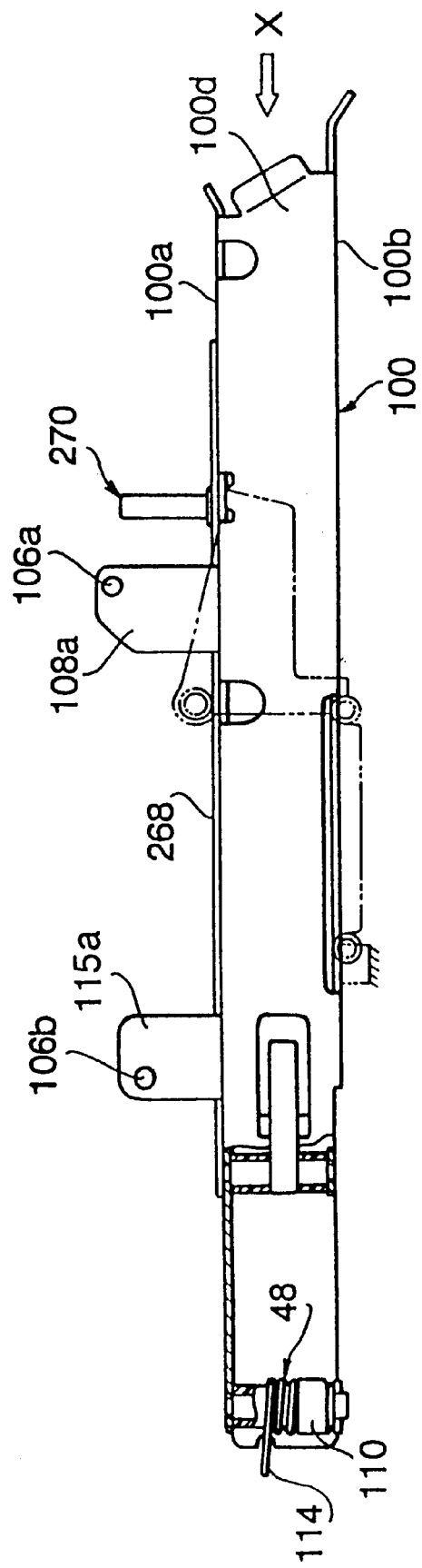
Figure 13:
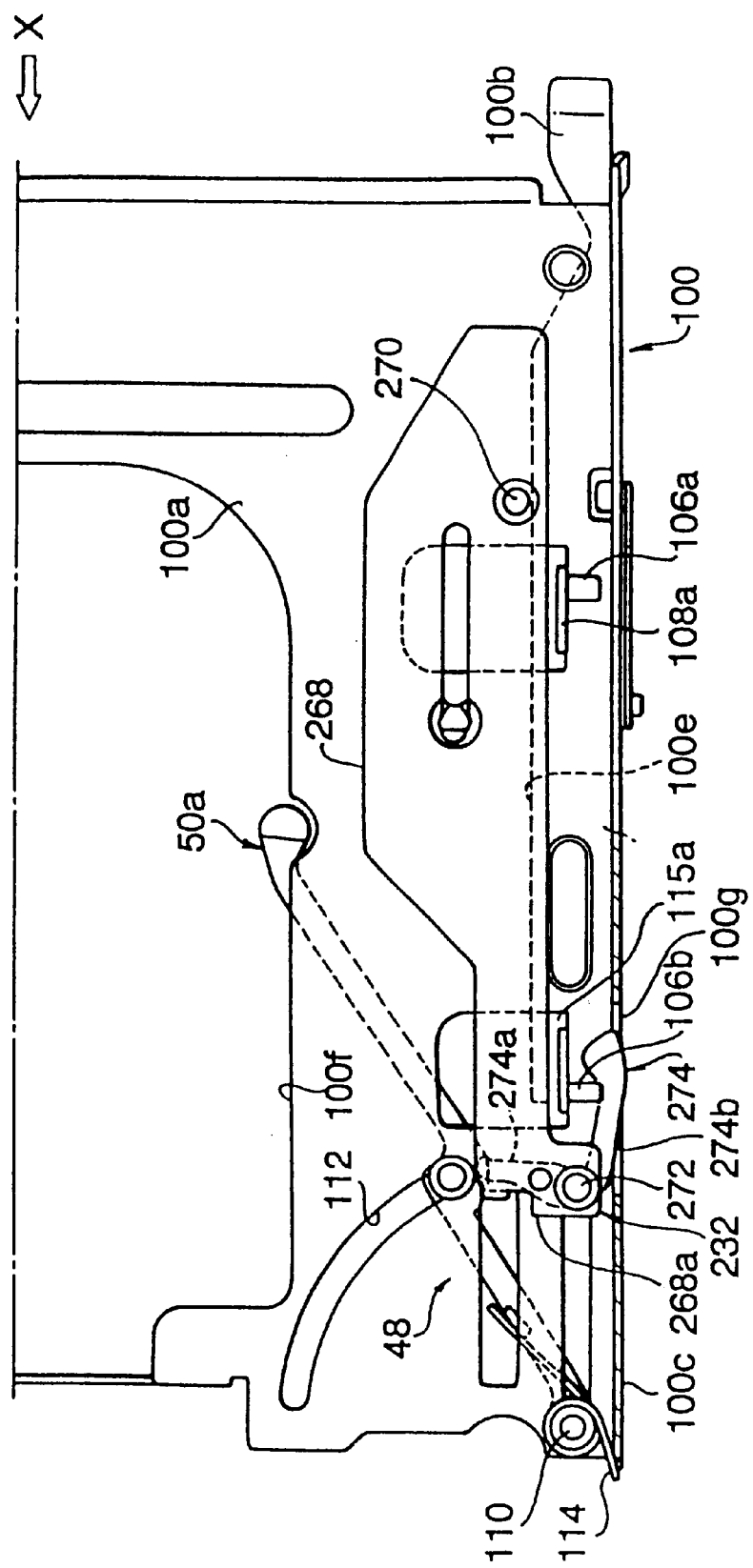
Figure 14:
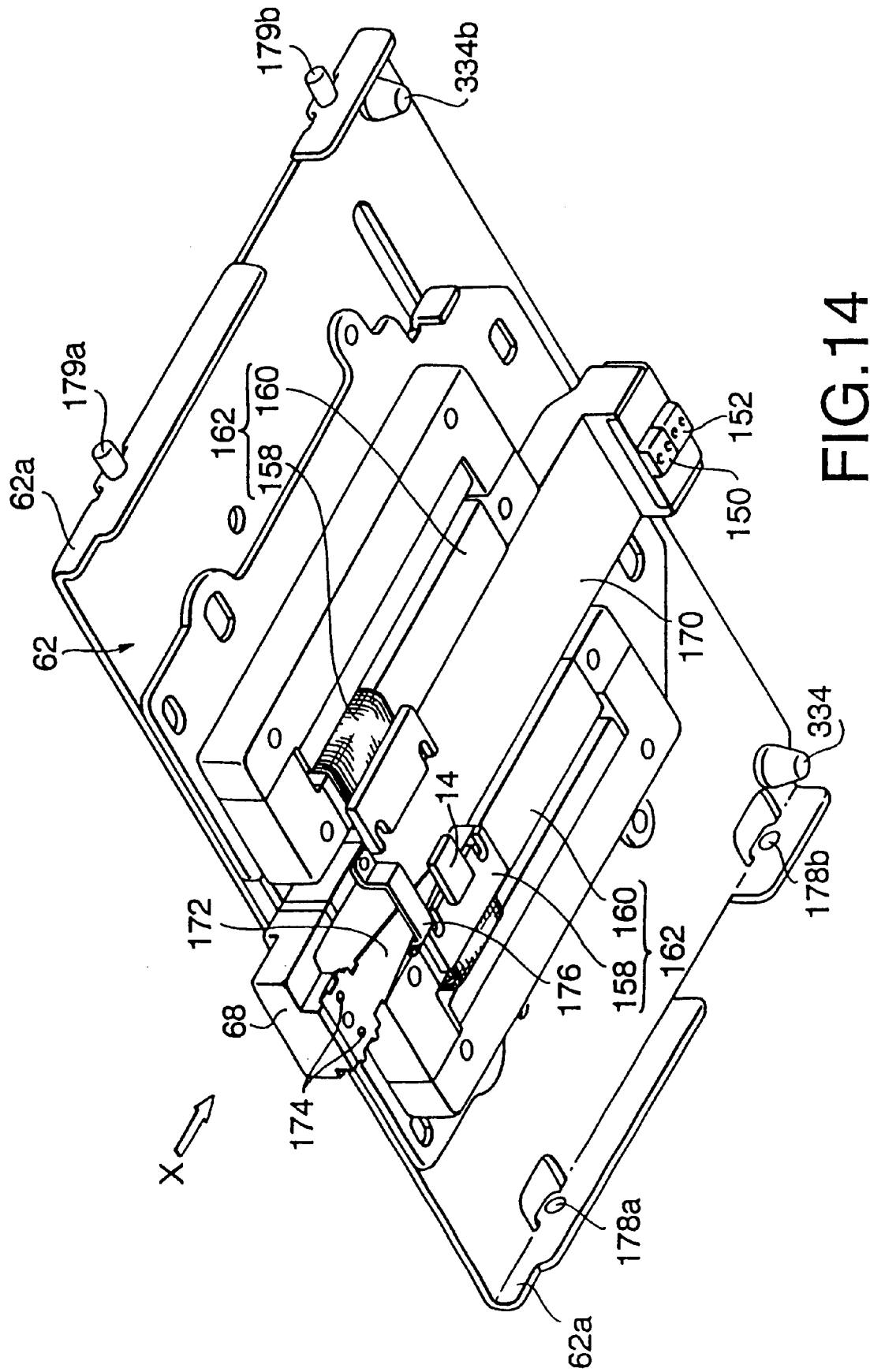
Figure 15:
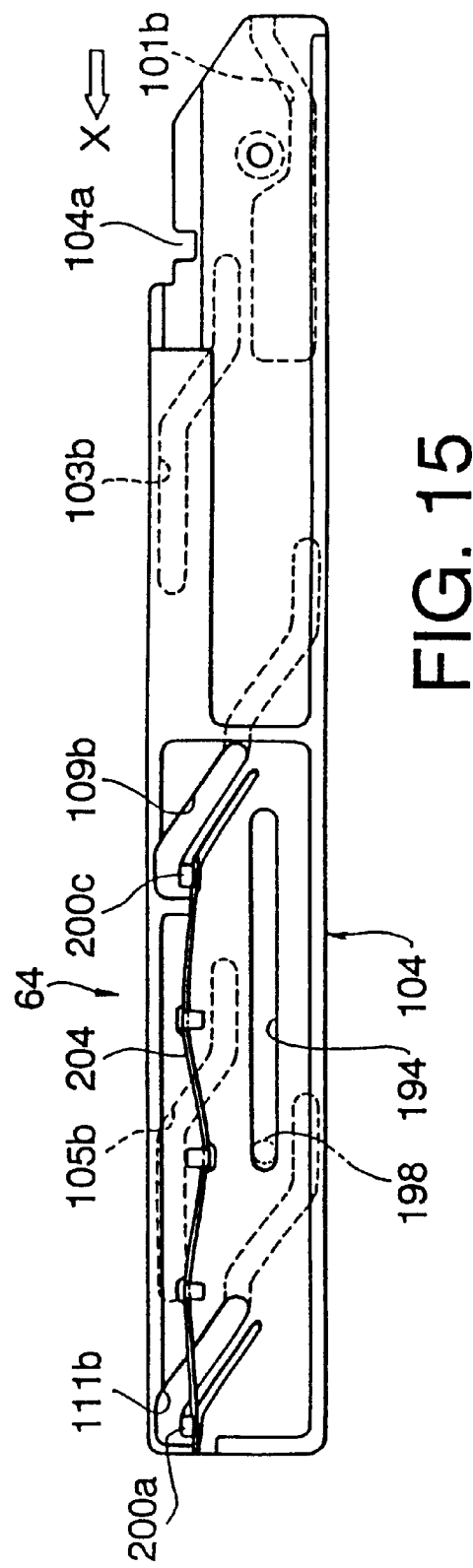
Figure 16:
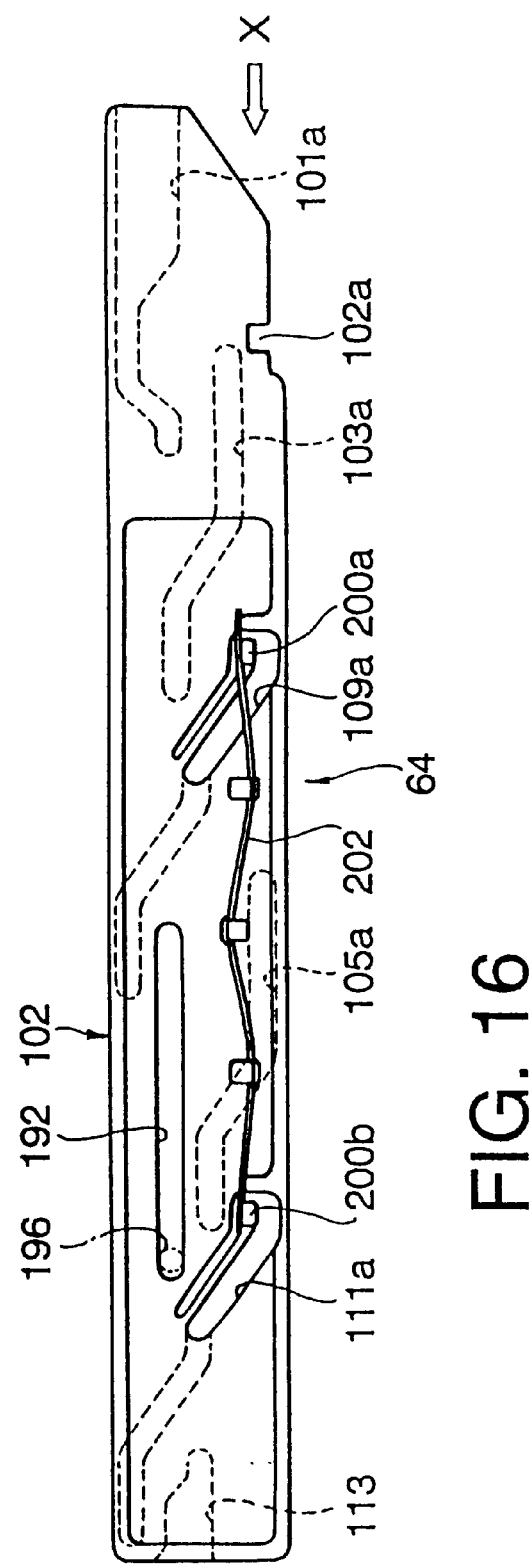
Figure 17:
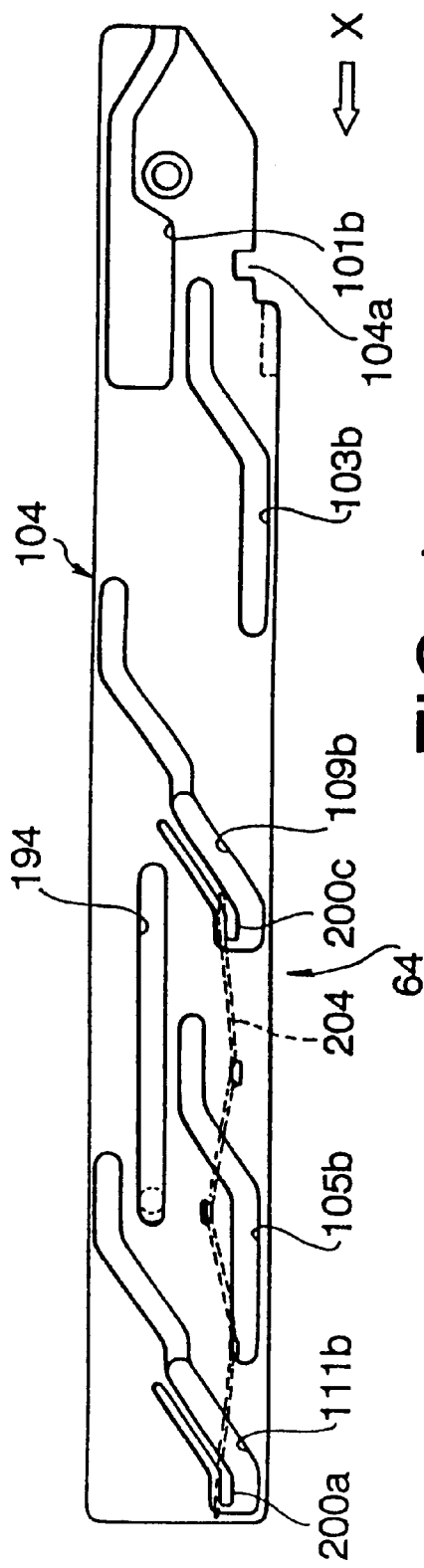
Figure 18:
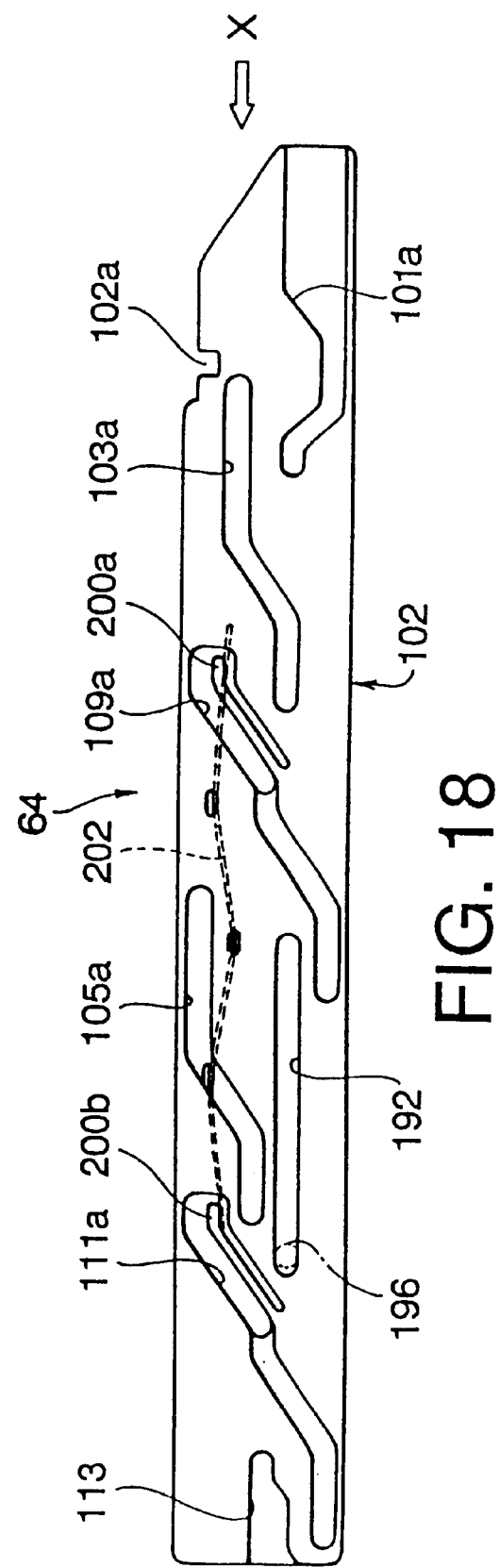
Figure 19:
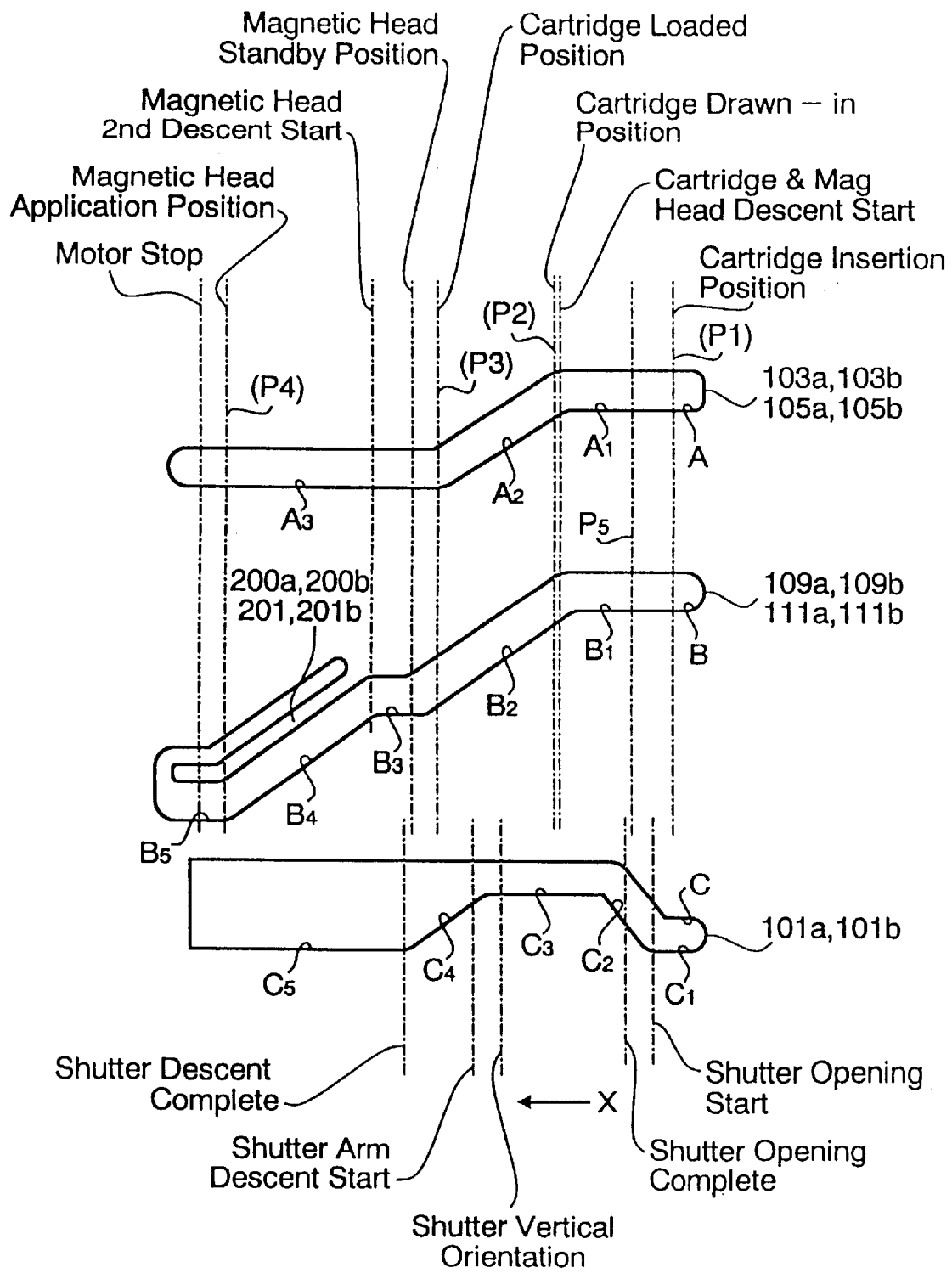
Figure 20:
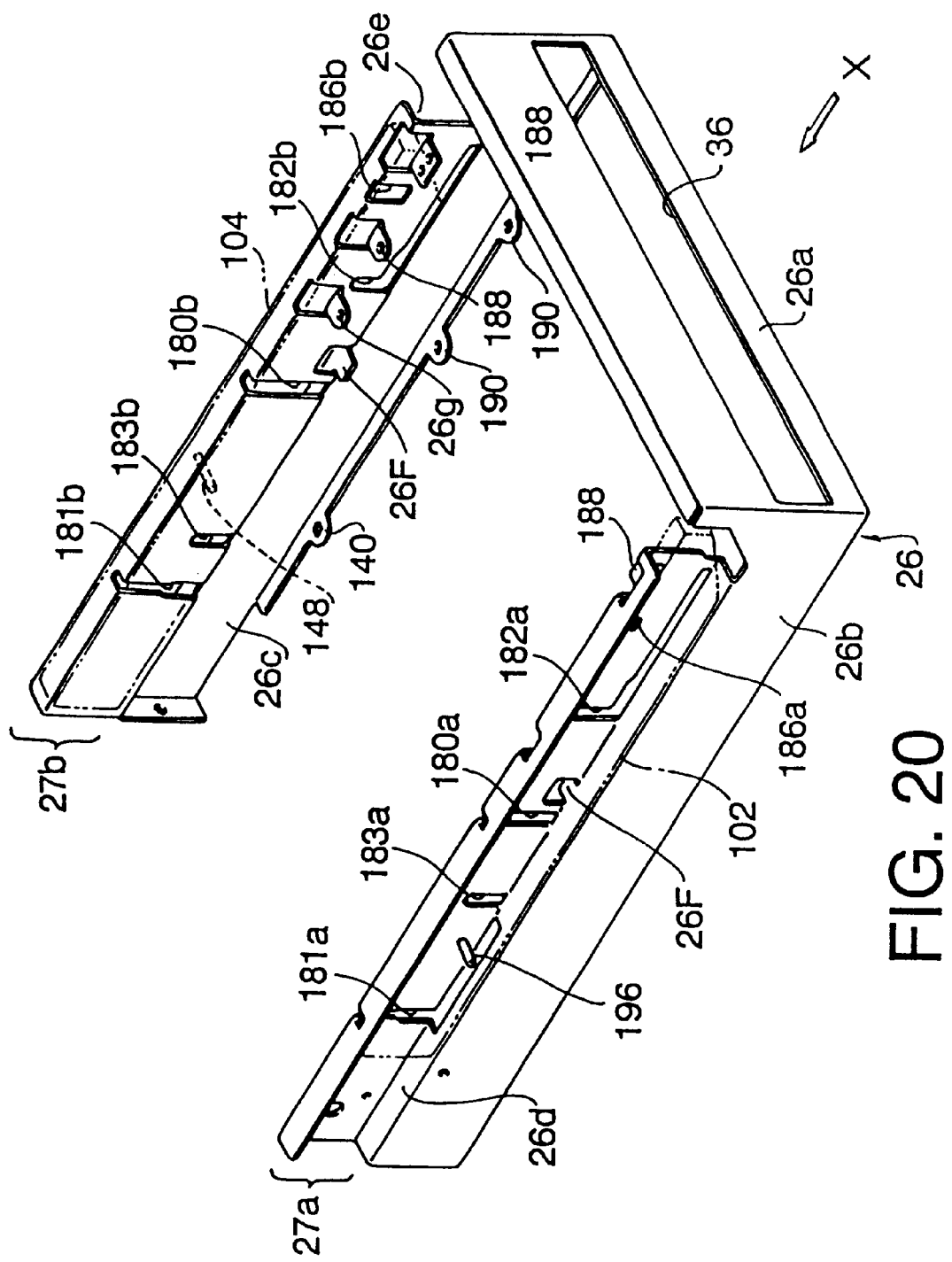
Figure 21:
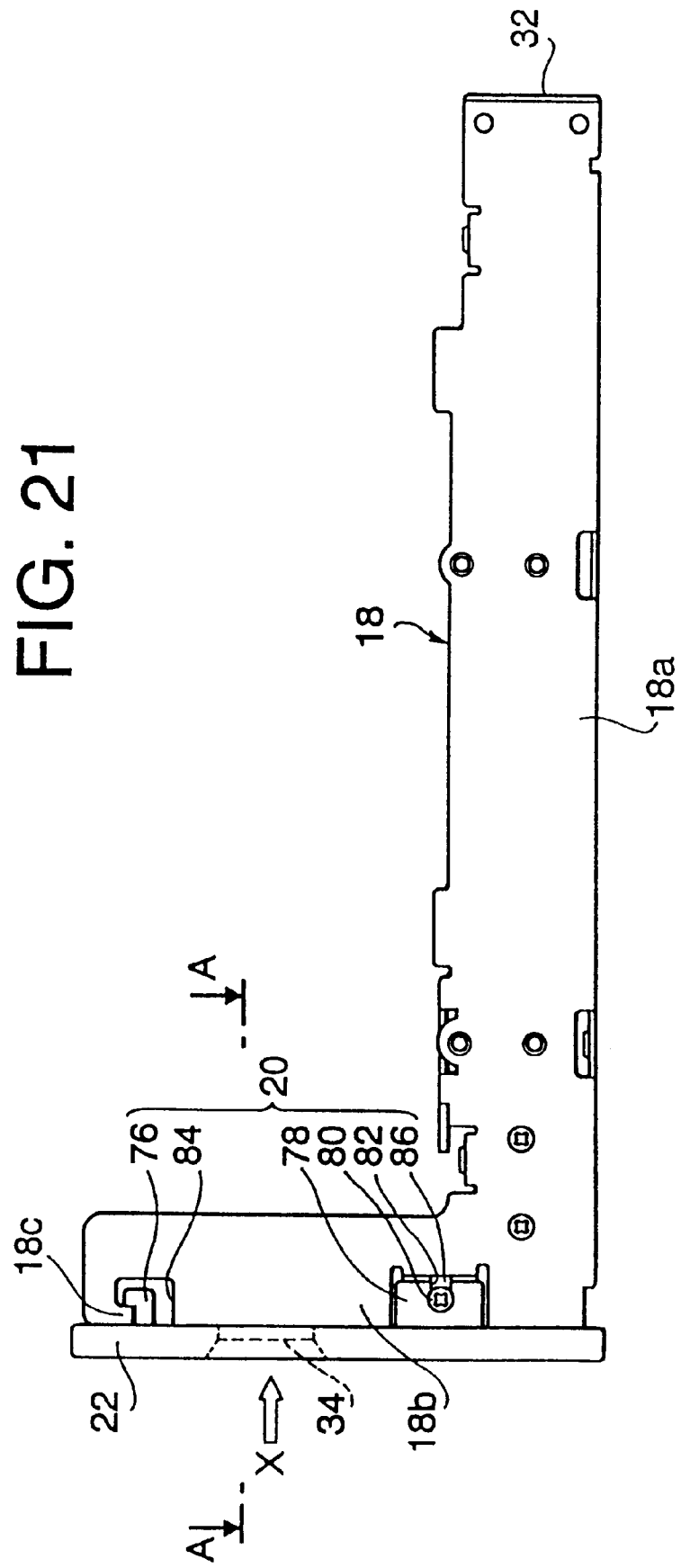
Figure 22:
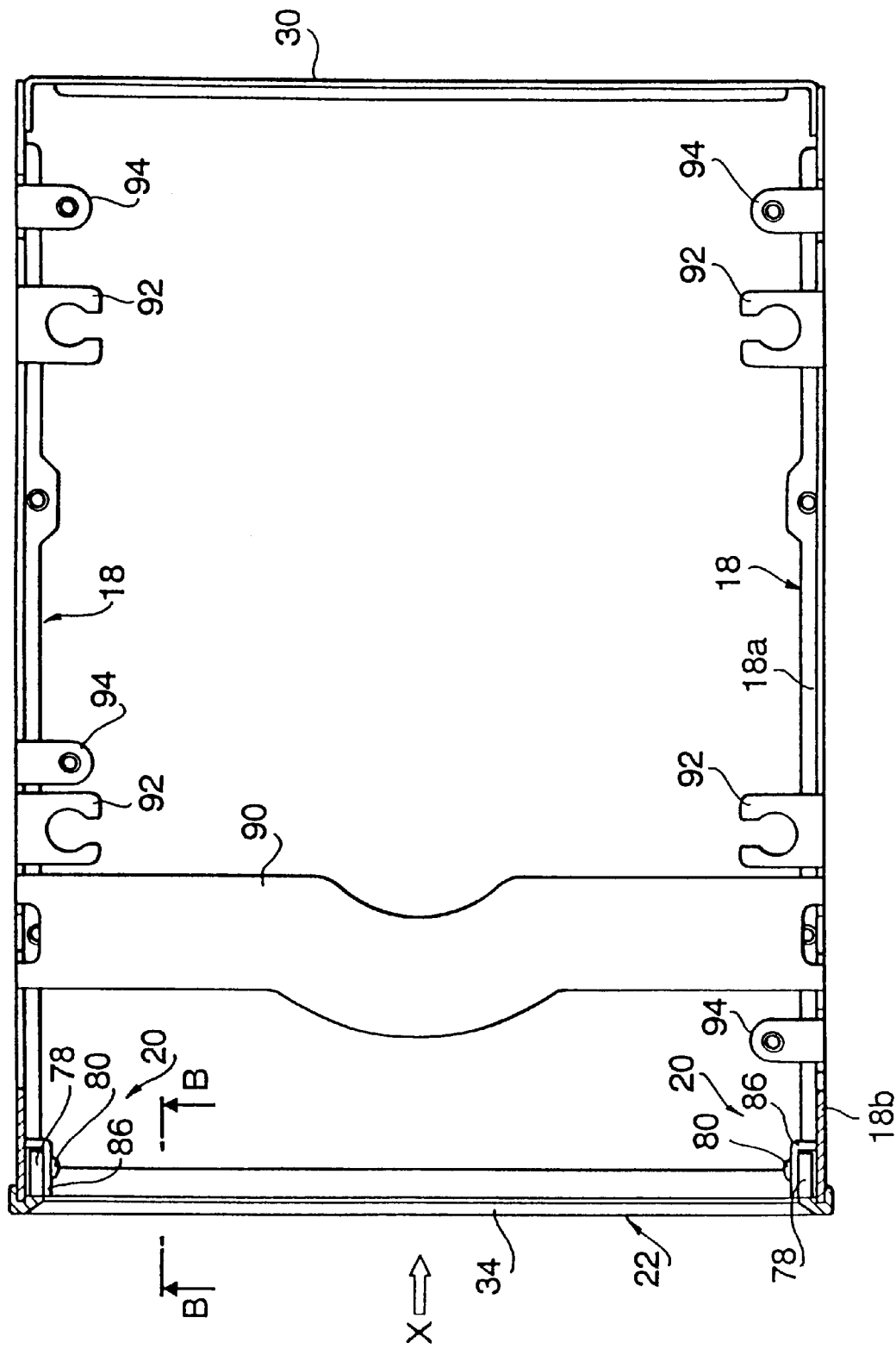
Figure 23:
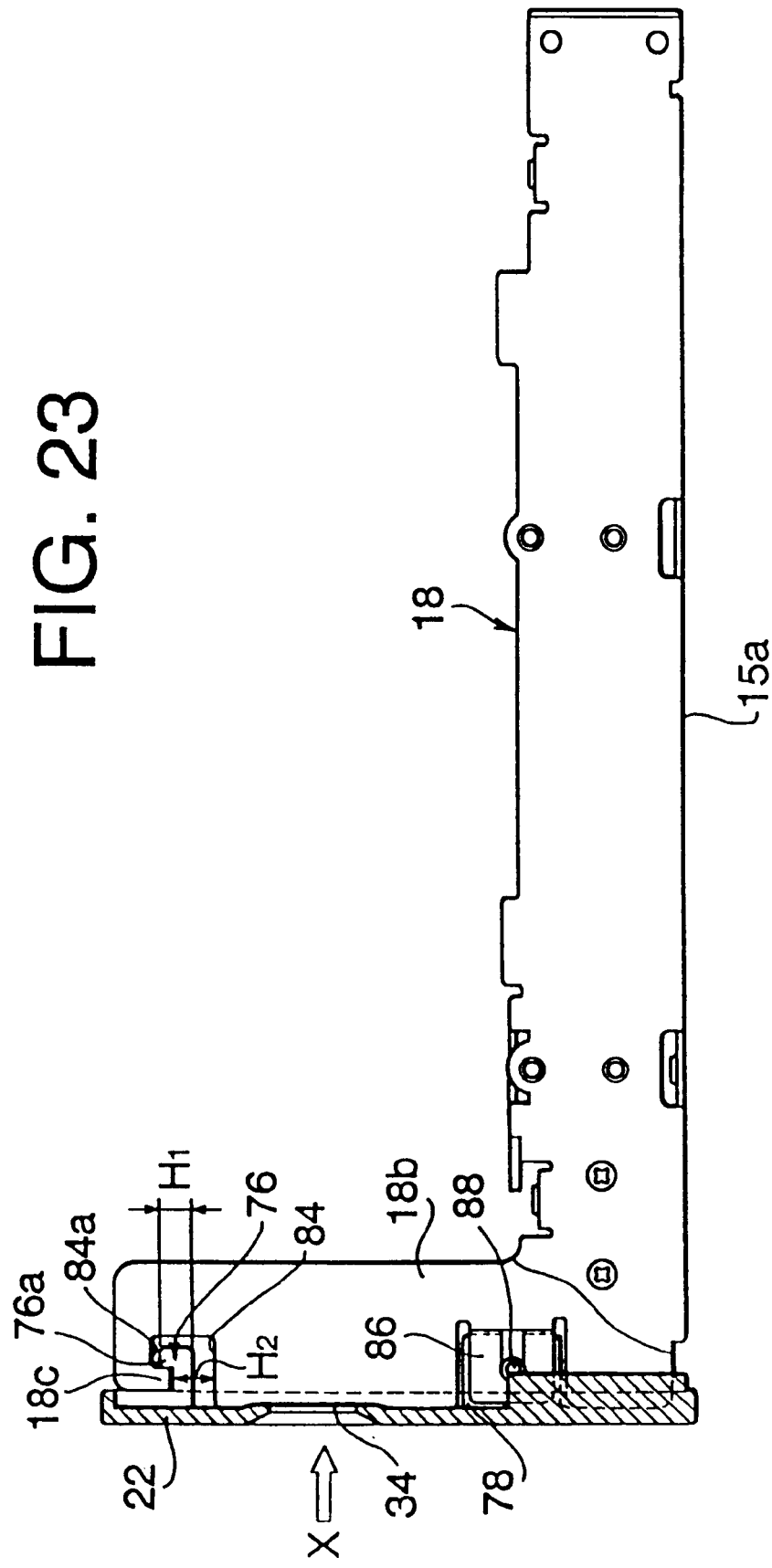
Figure 24:
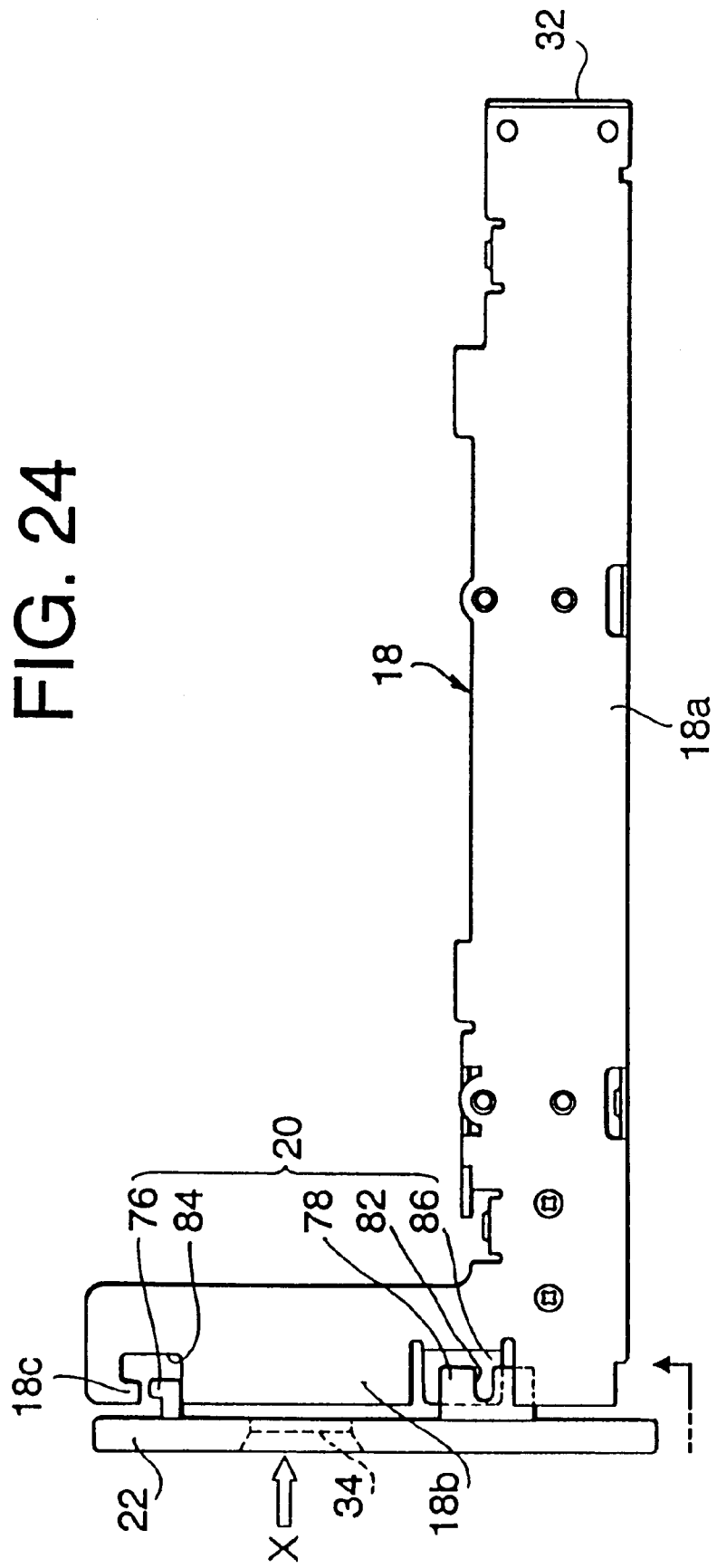
Figure 25:
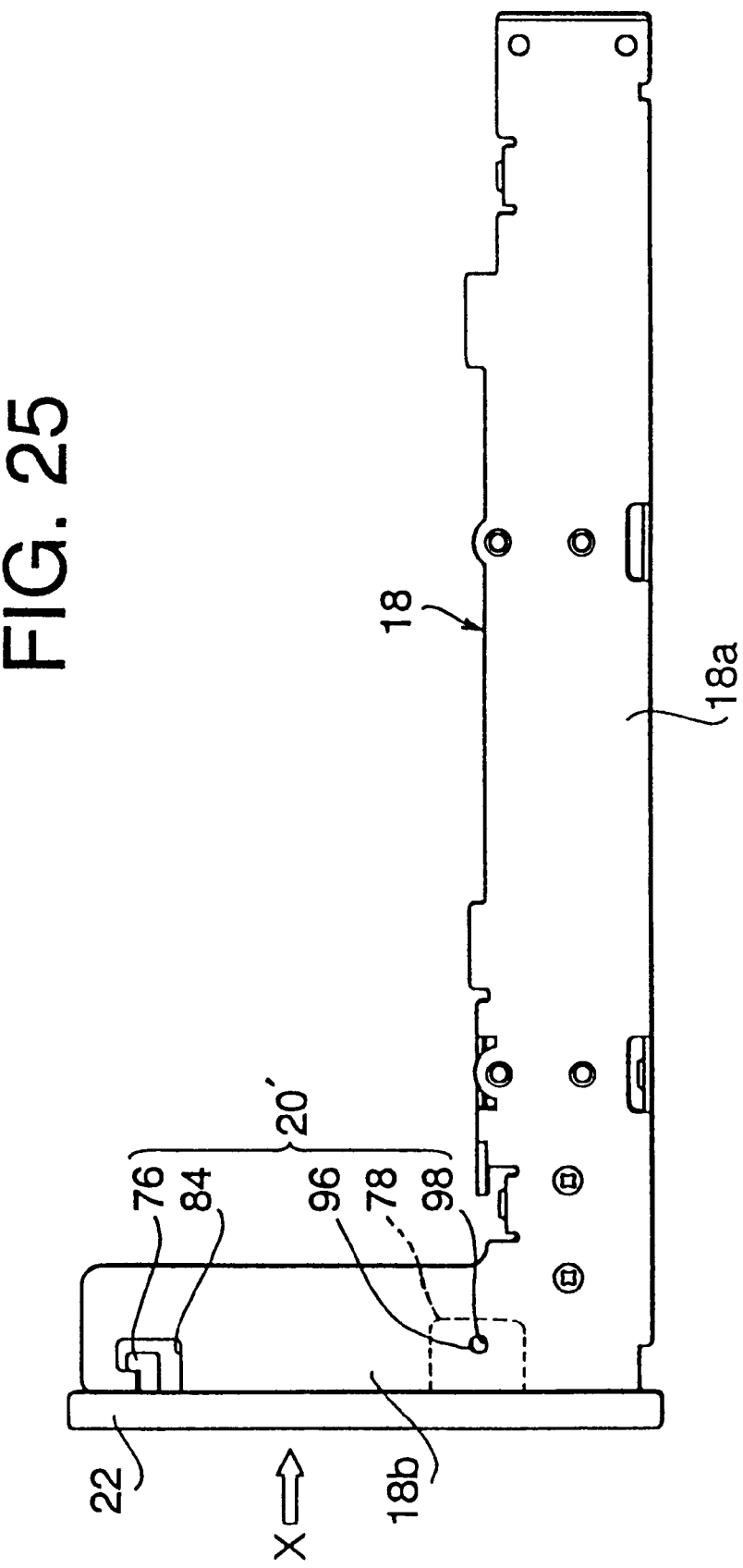
Figure 26:
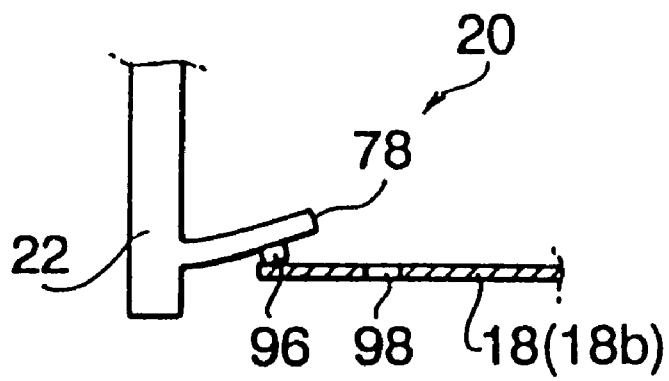
Figure 27:
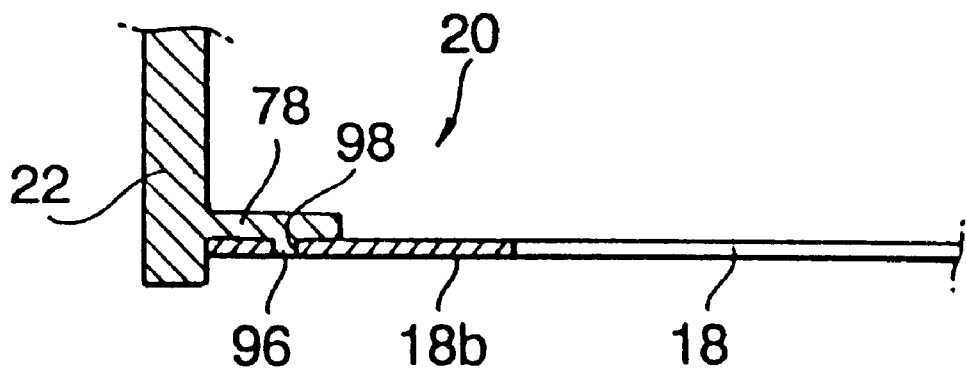
Figure 28:
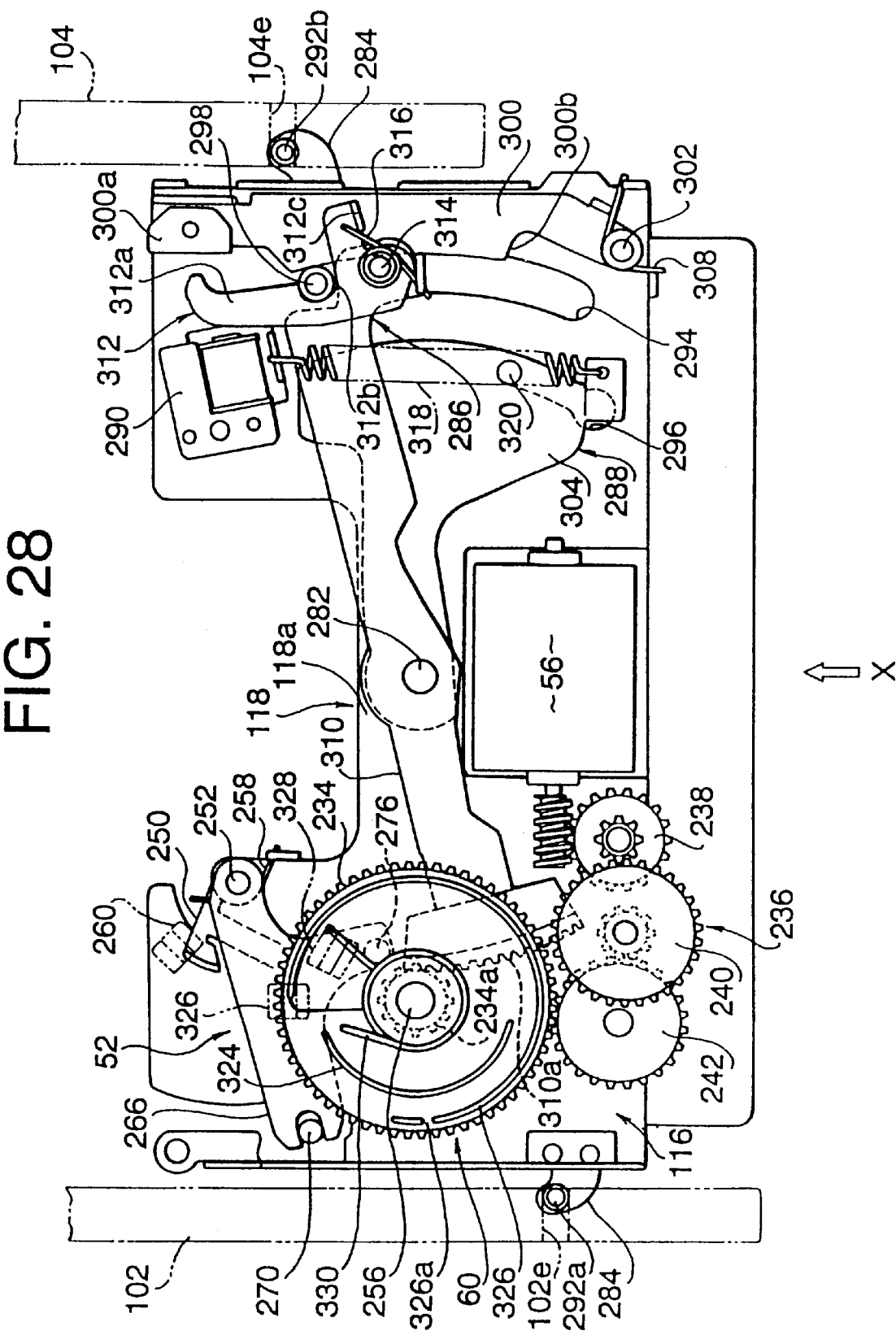
Figure 29:
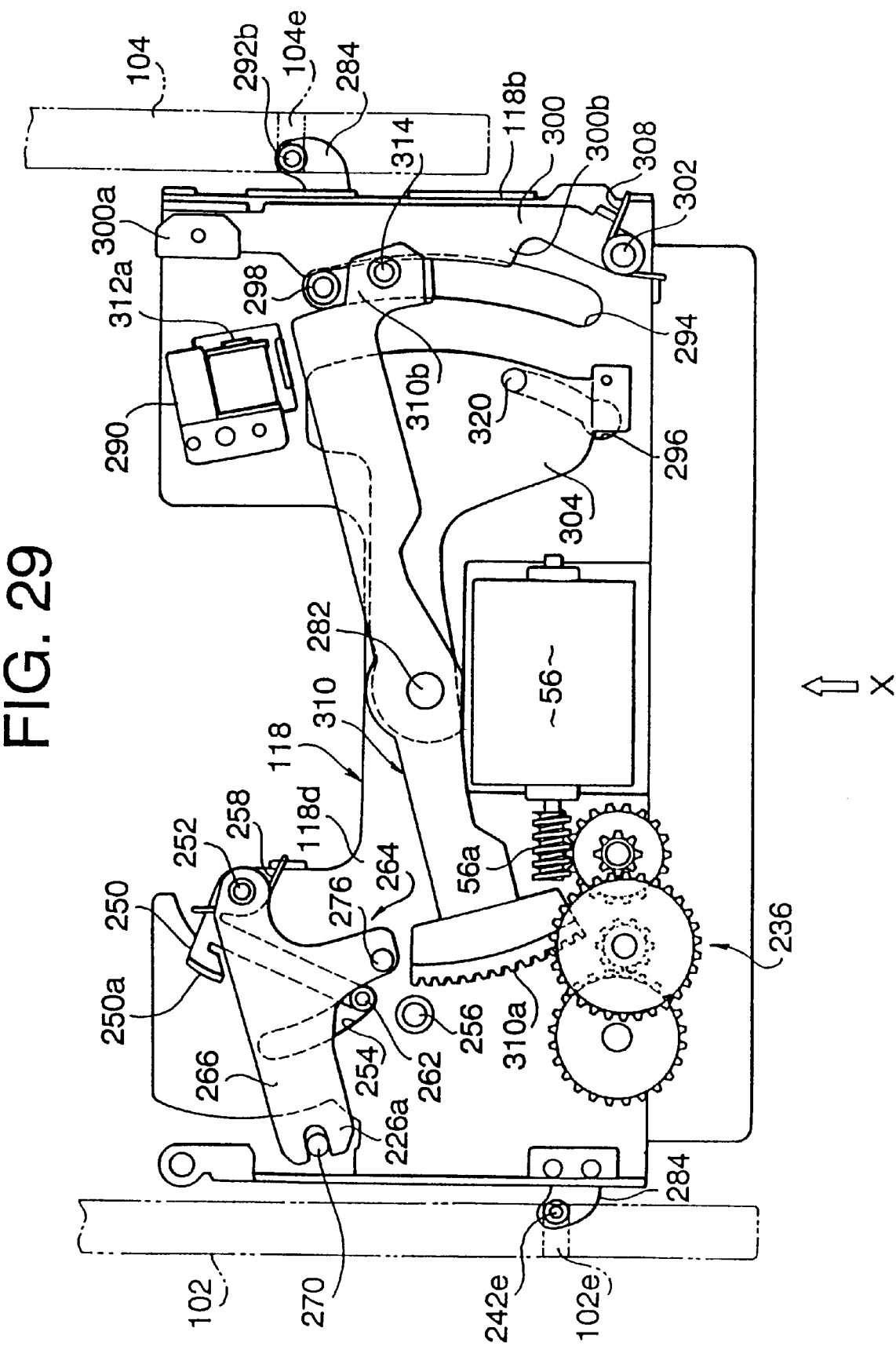
Figure 30:
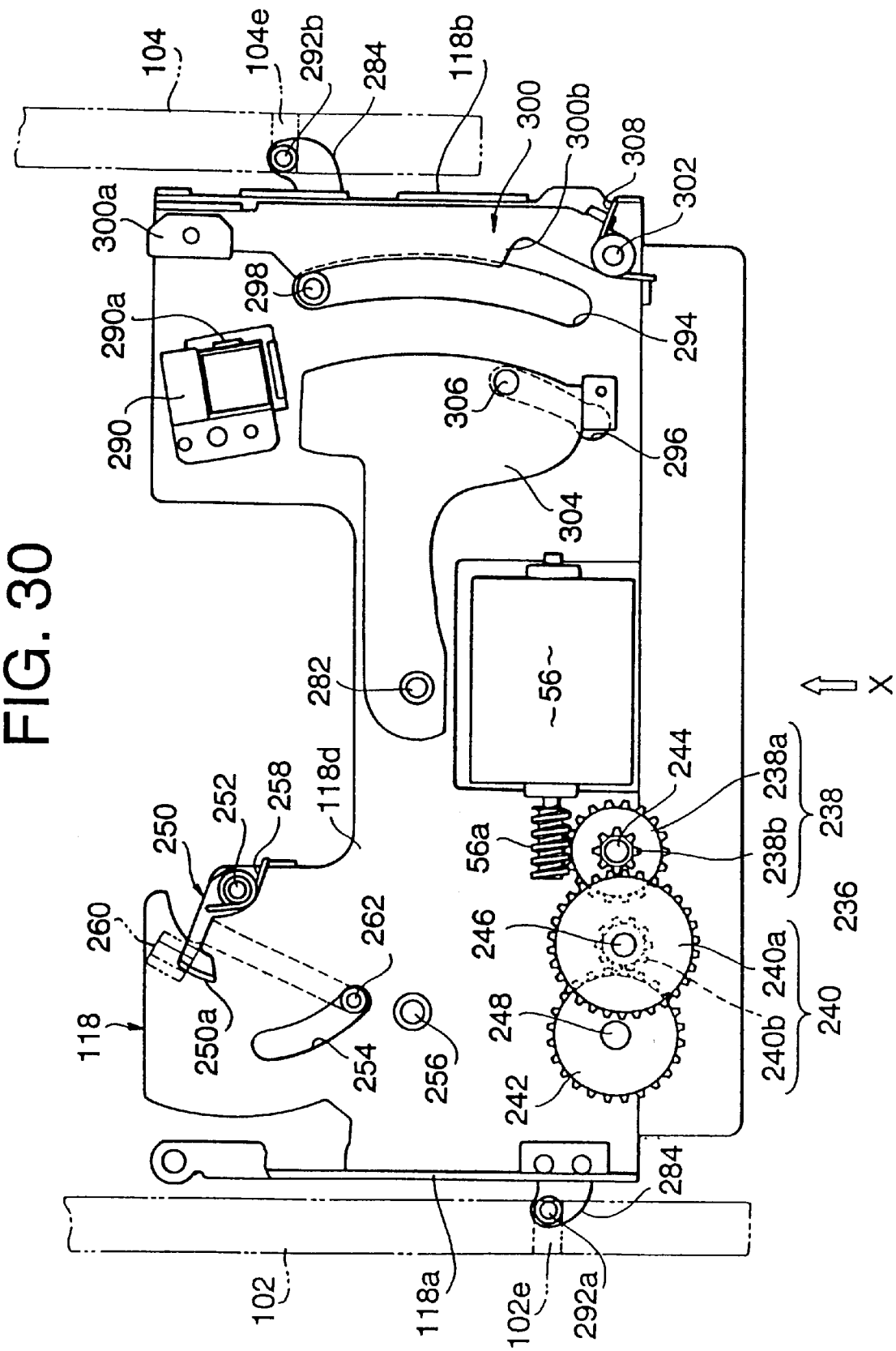
Figure 31:
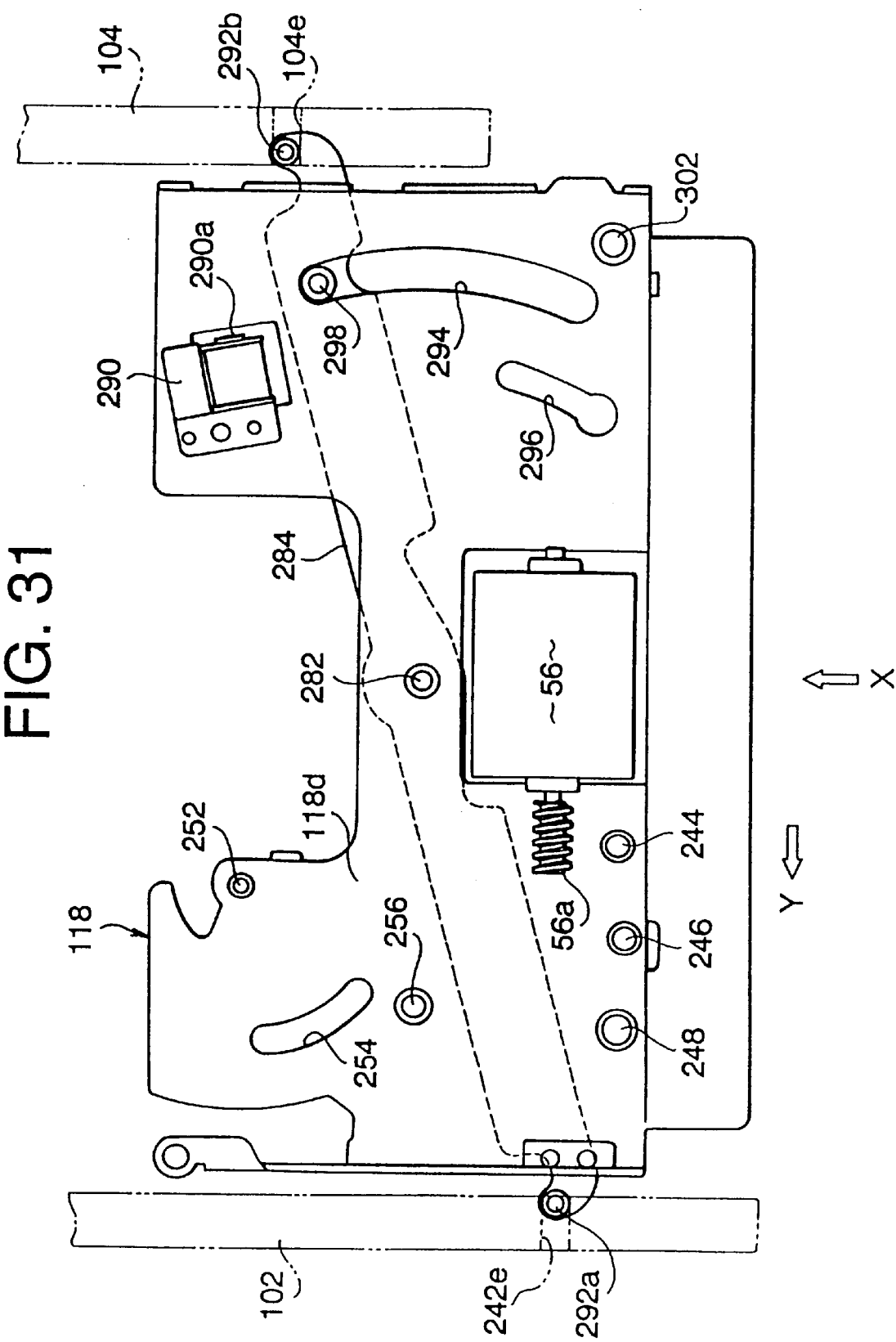
Figure 32:
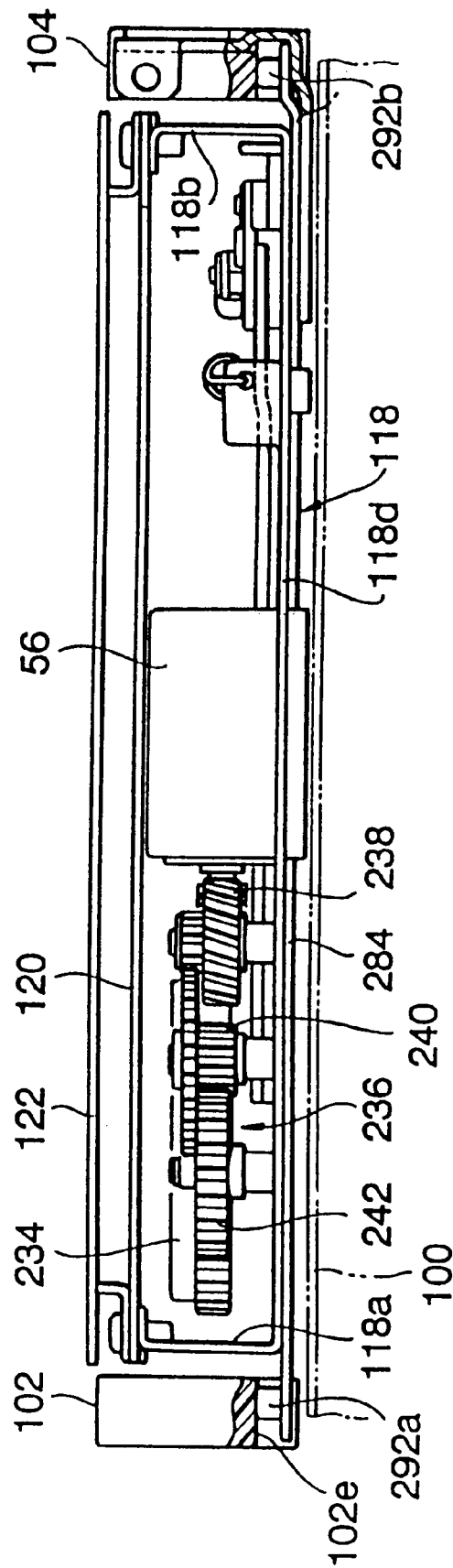
Figure 33:
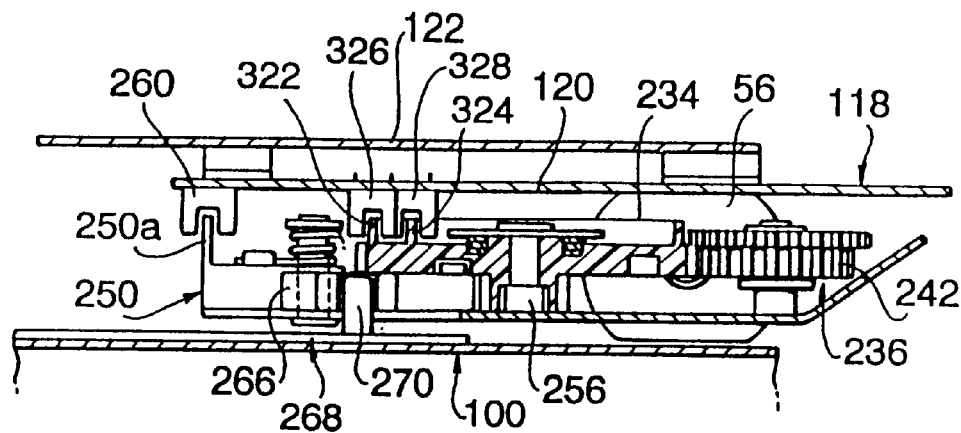
Figure 34:
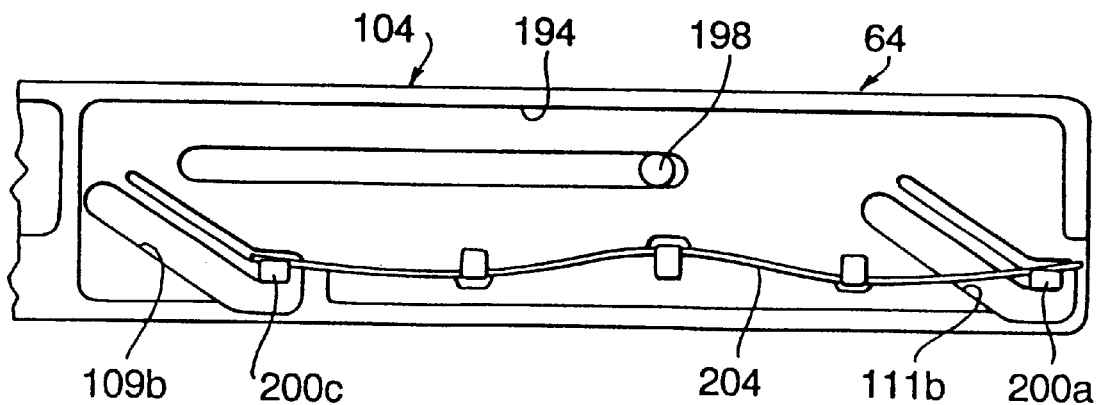
Figure 35:
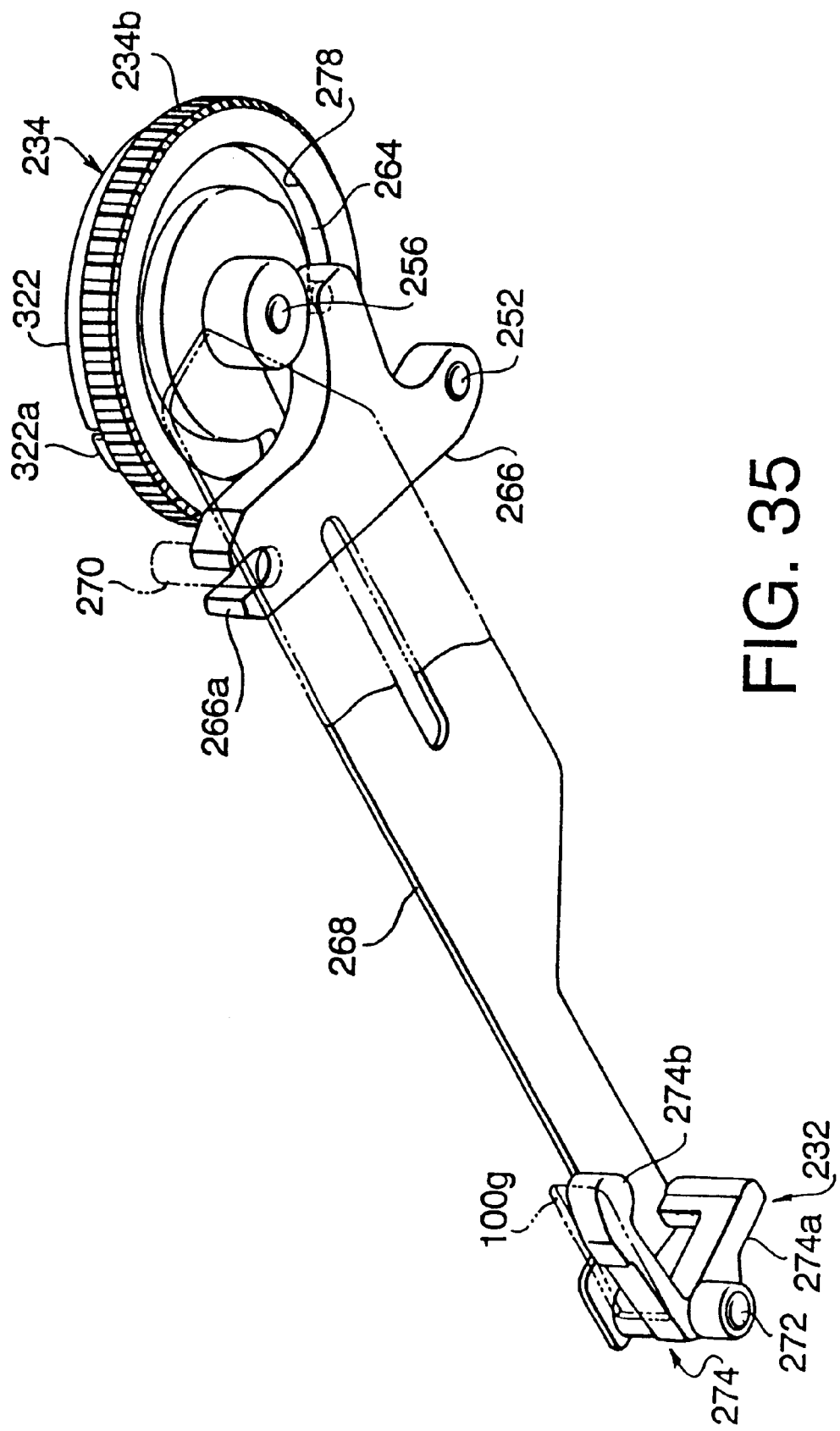
Figure 36:
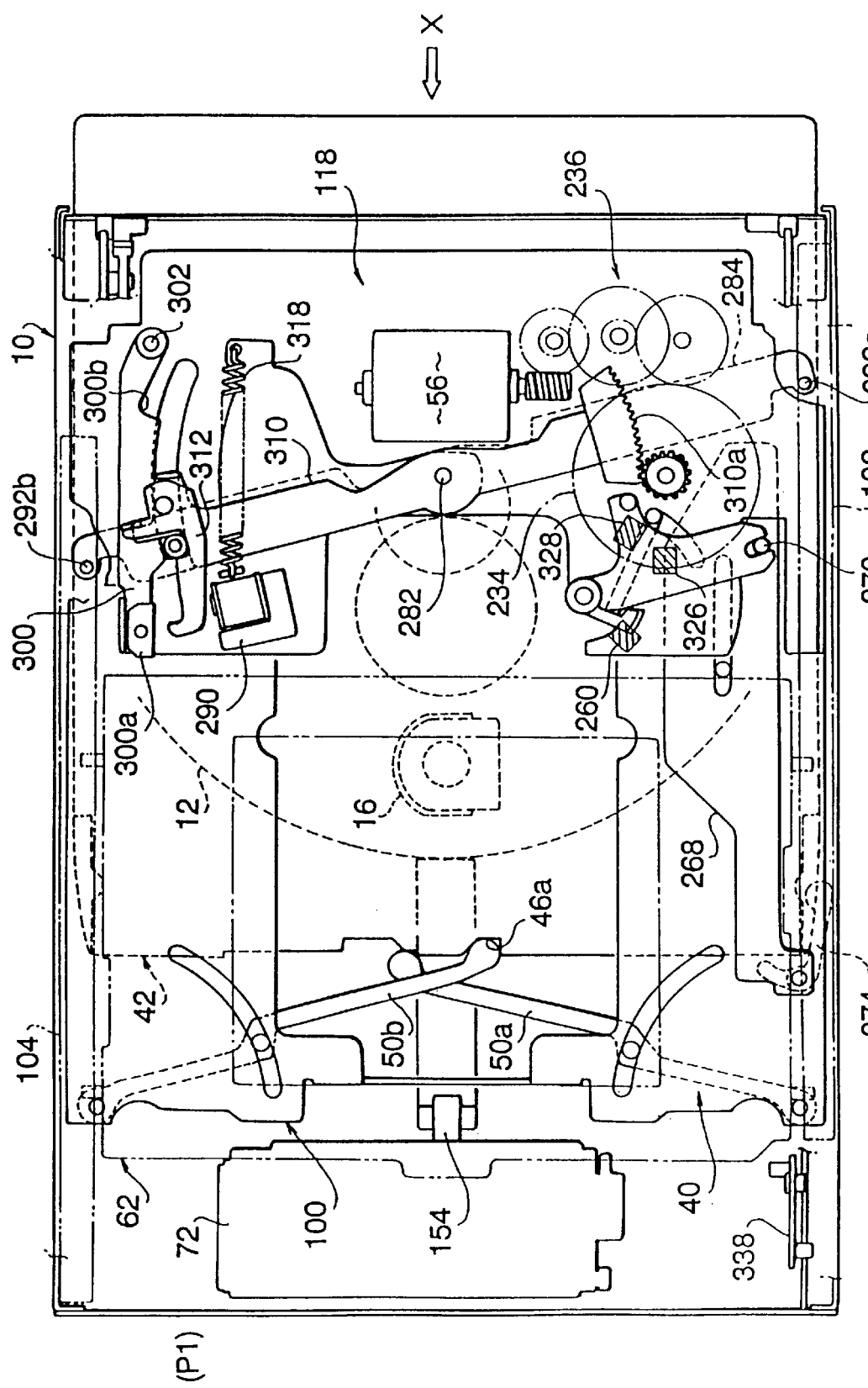
Figure 37:
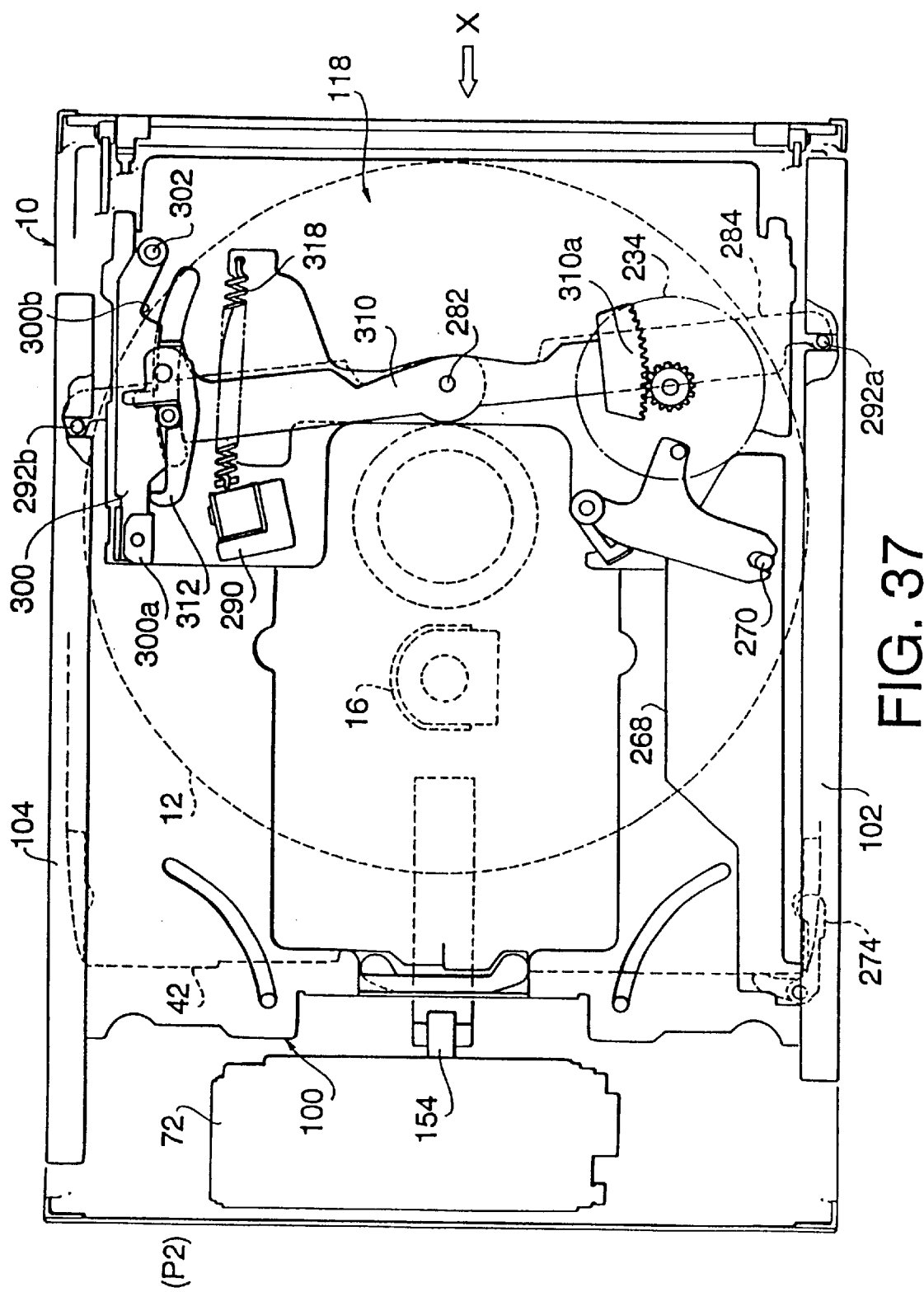
Figure 38:
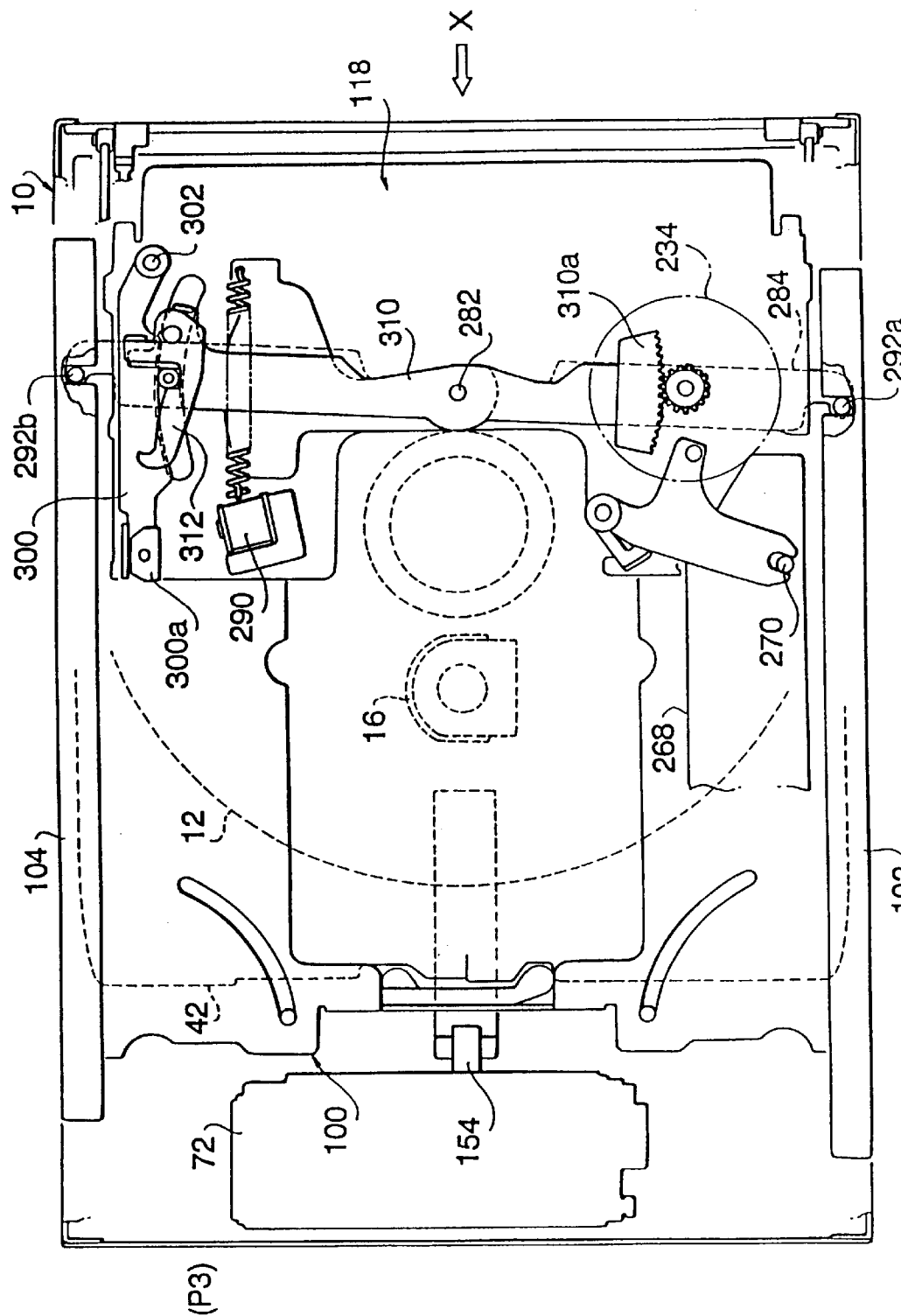
Figure 39:
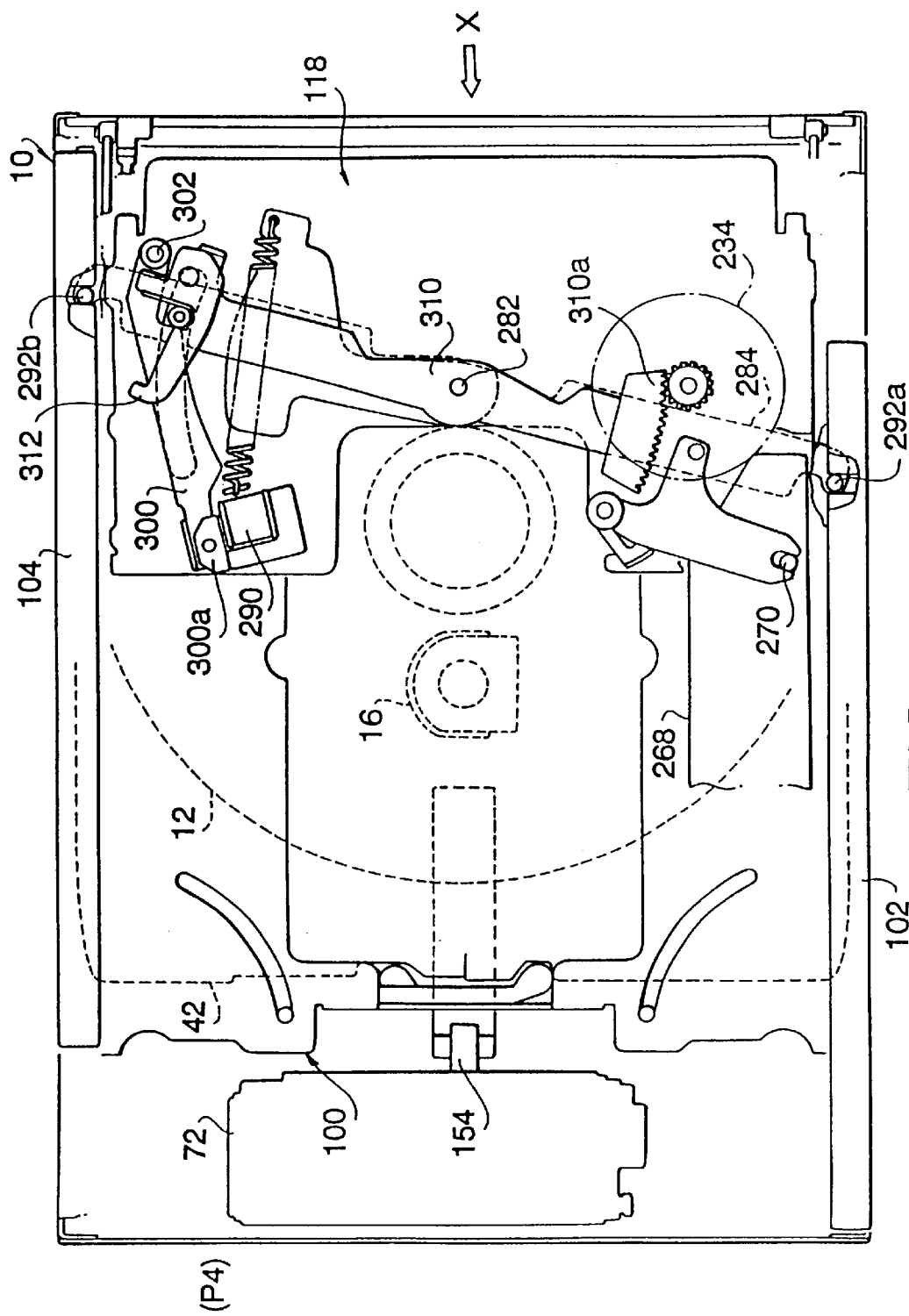
Figure 40:
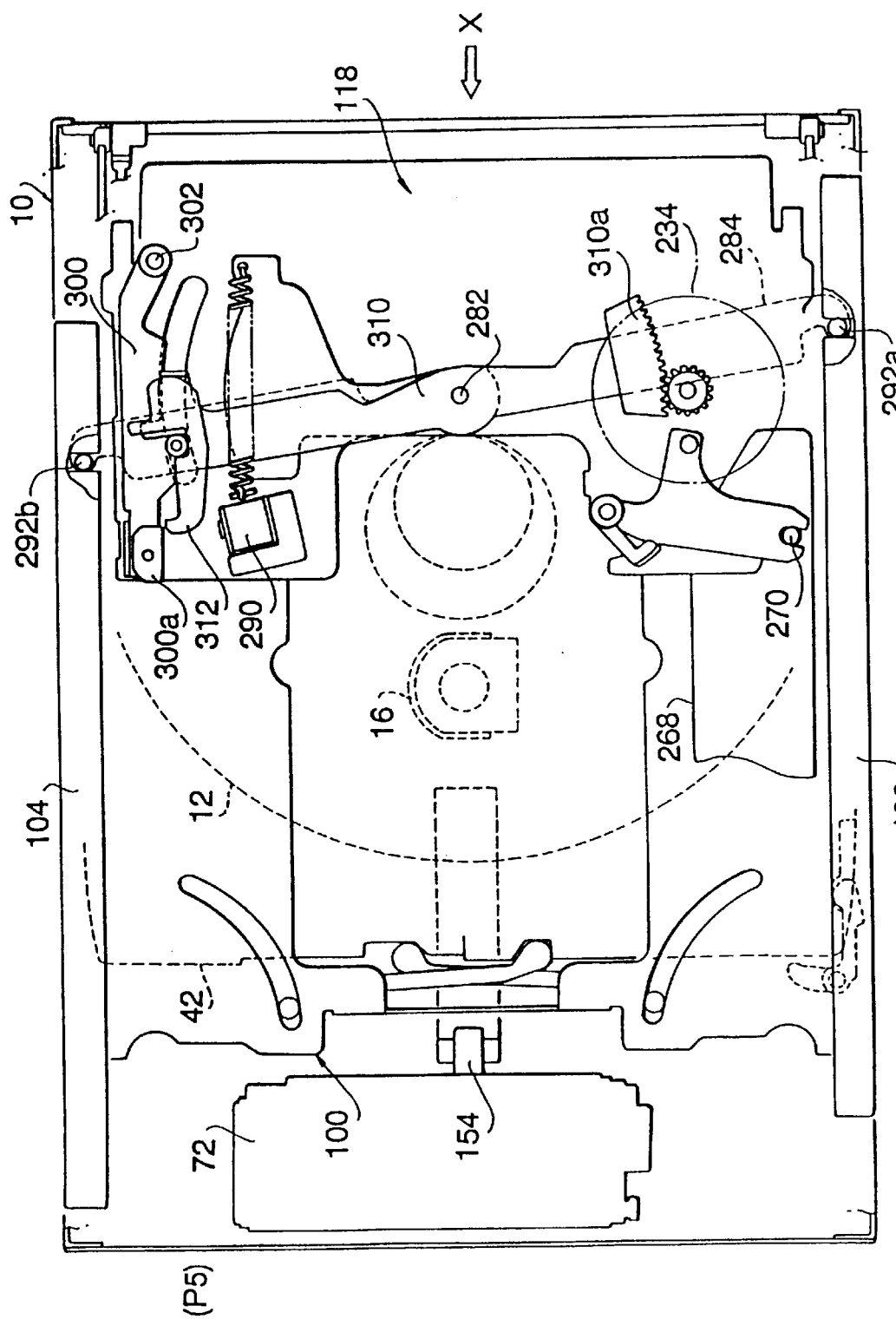
Figure 41:
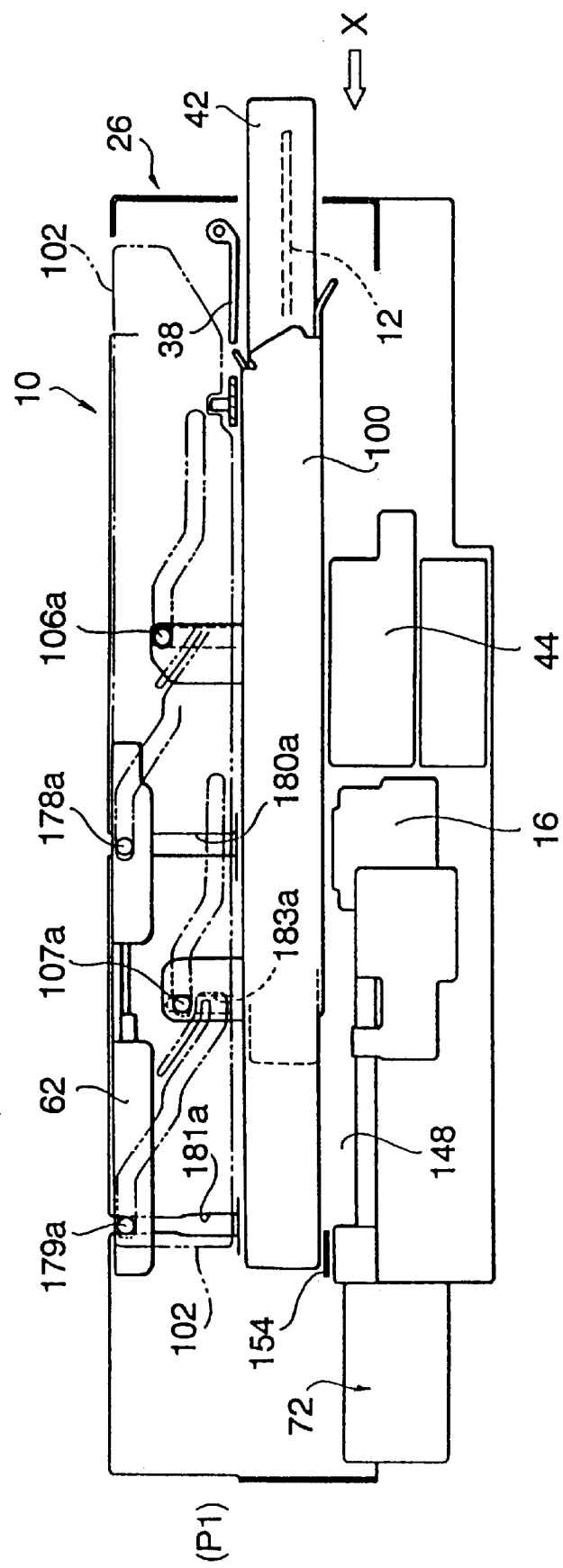
Figure 42:
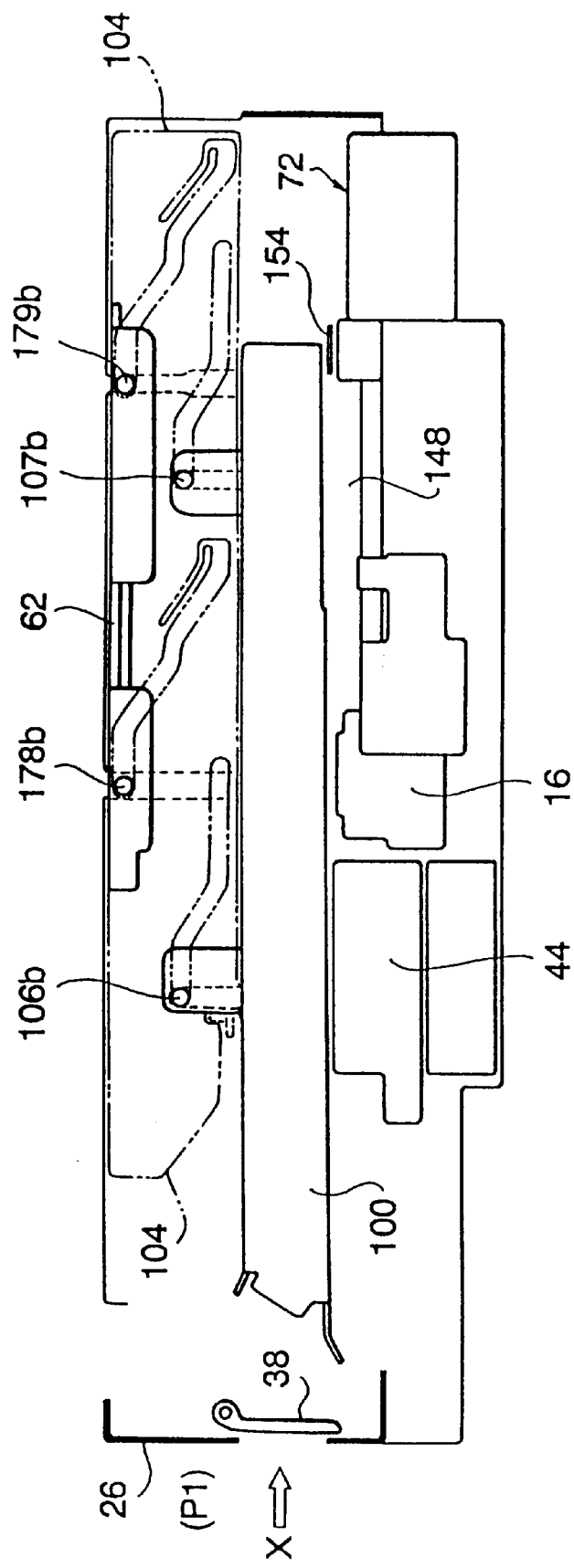
Figure 43:
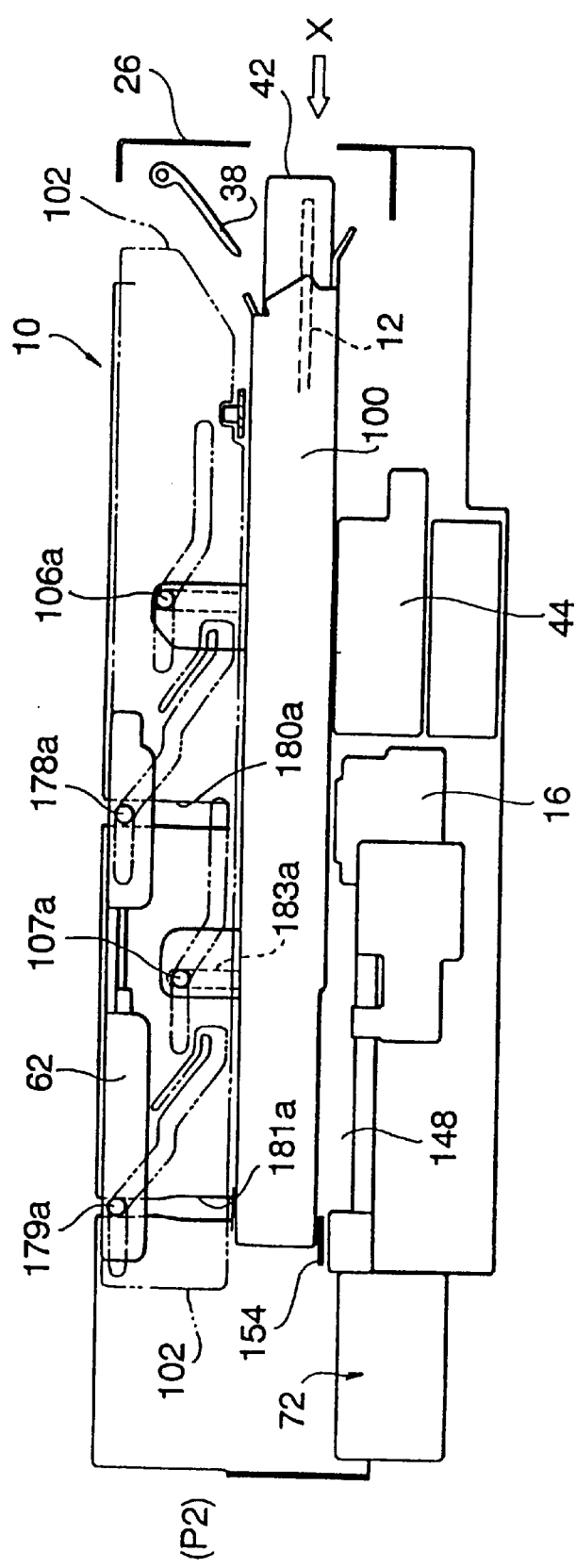
Figure 44:
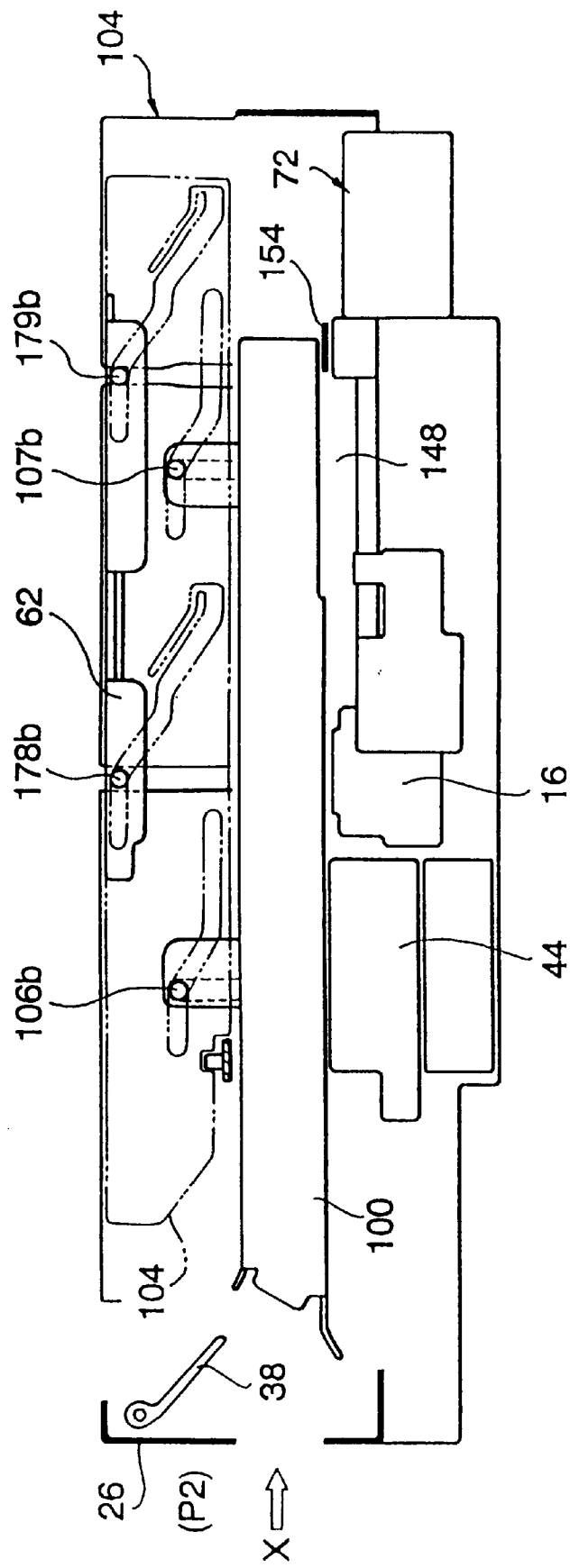
Figure 45:
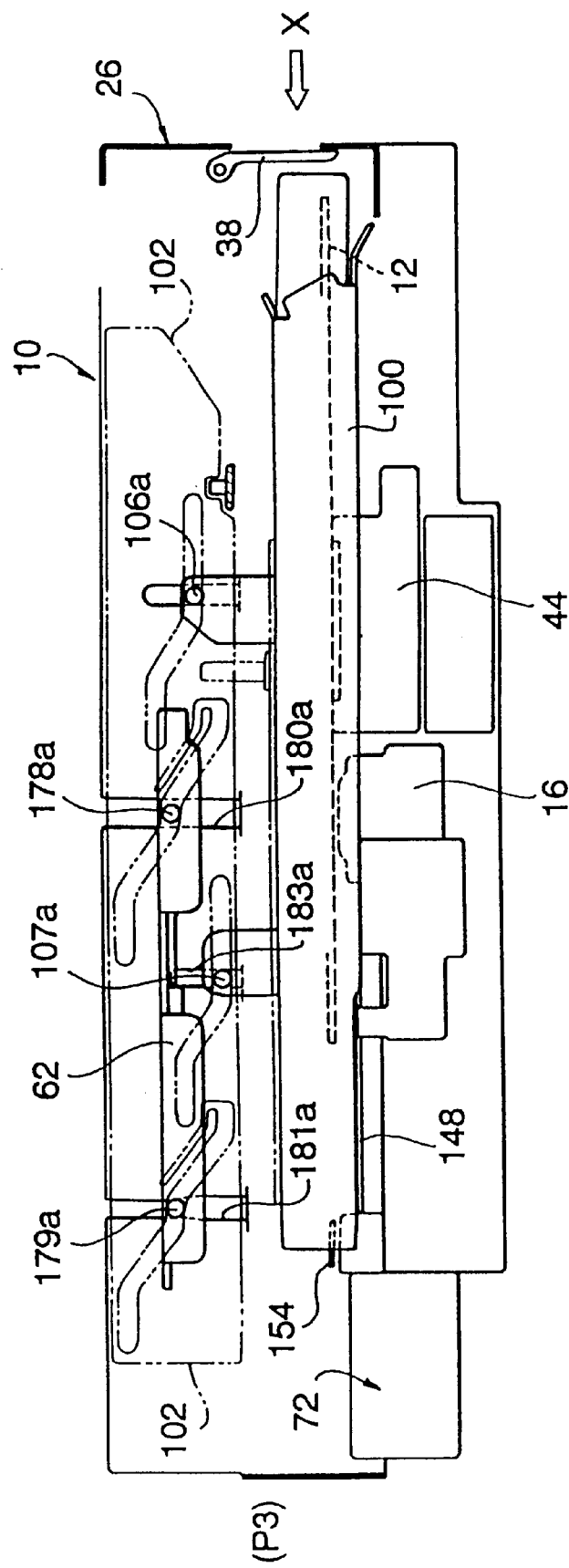
Figure 46:
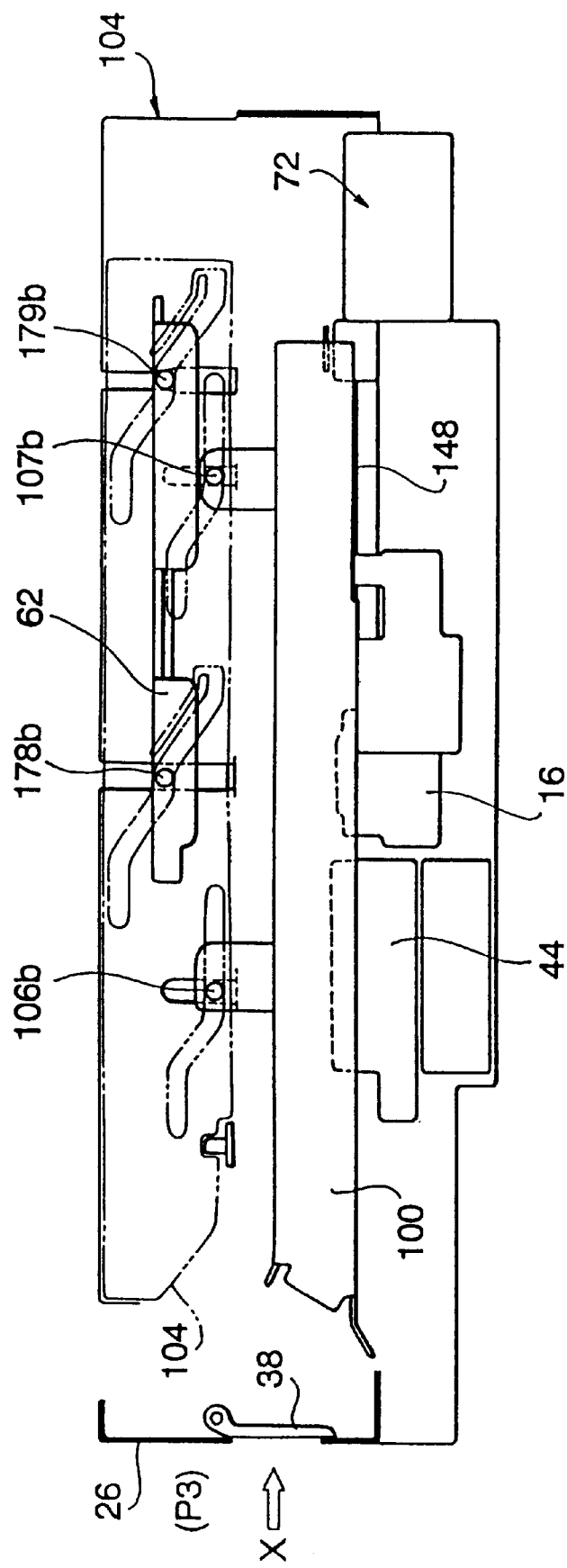
Figure 47:
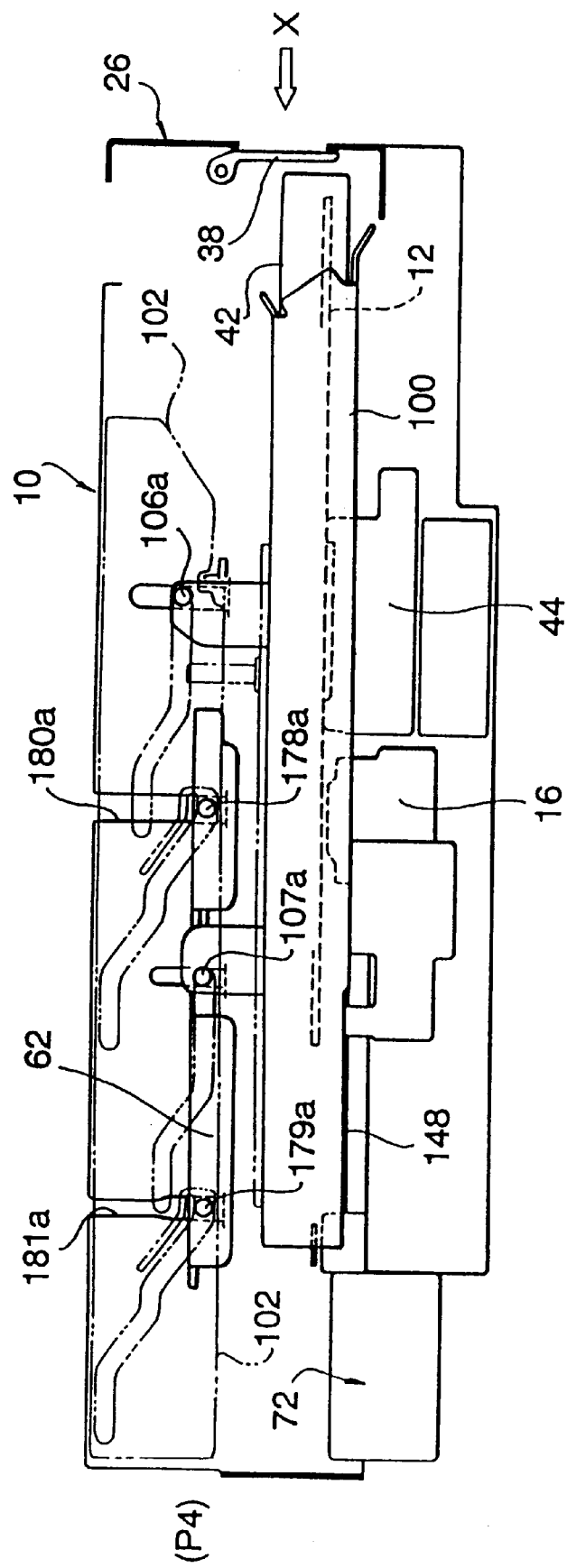
Figure 48:
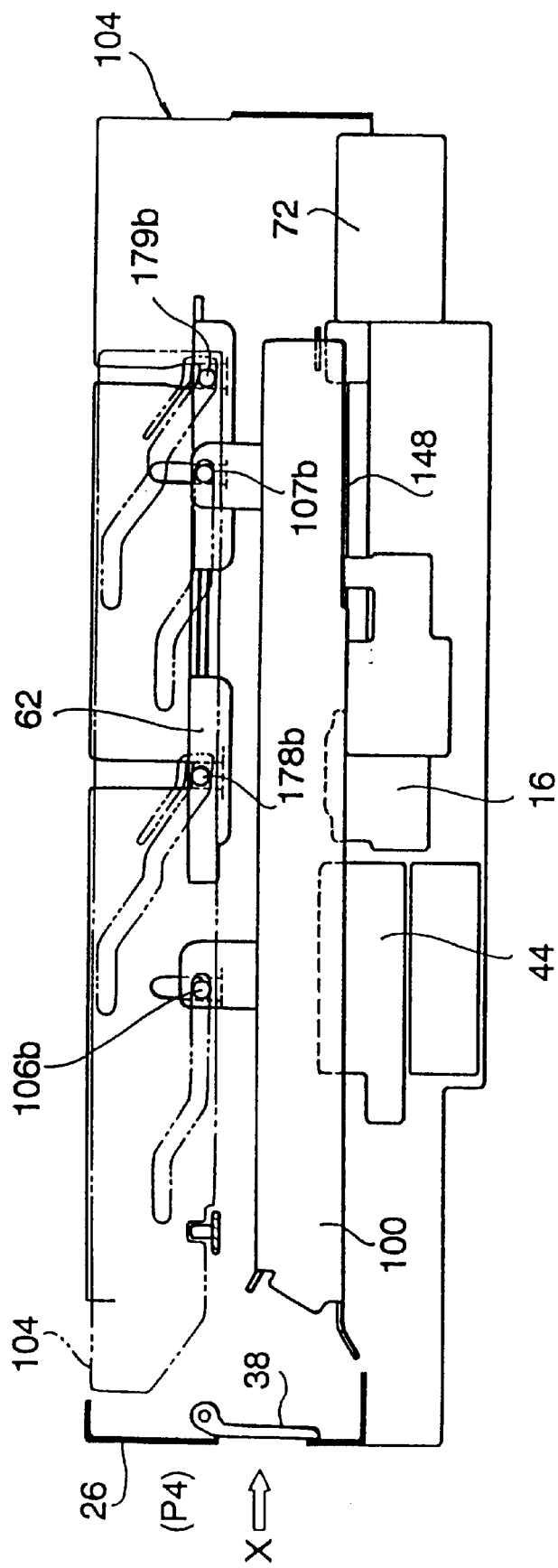
Figure 49:
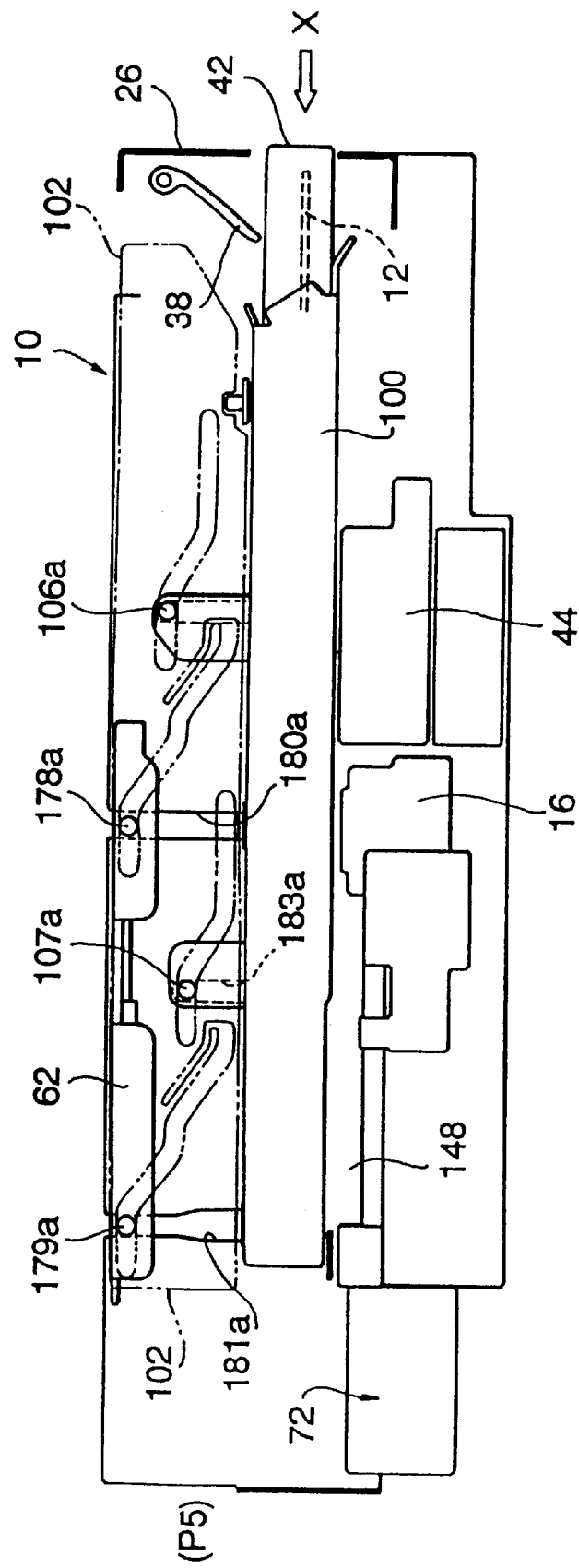
Figure 50:
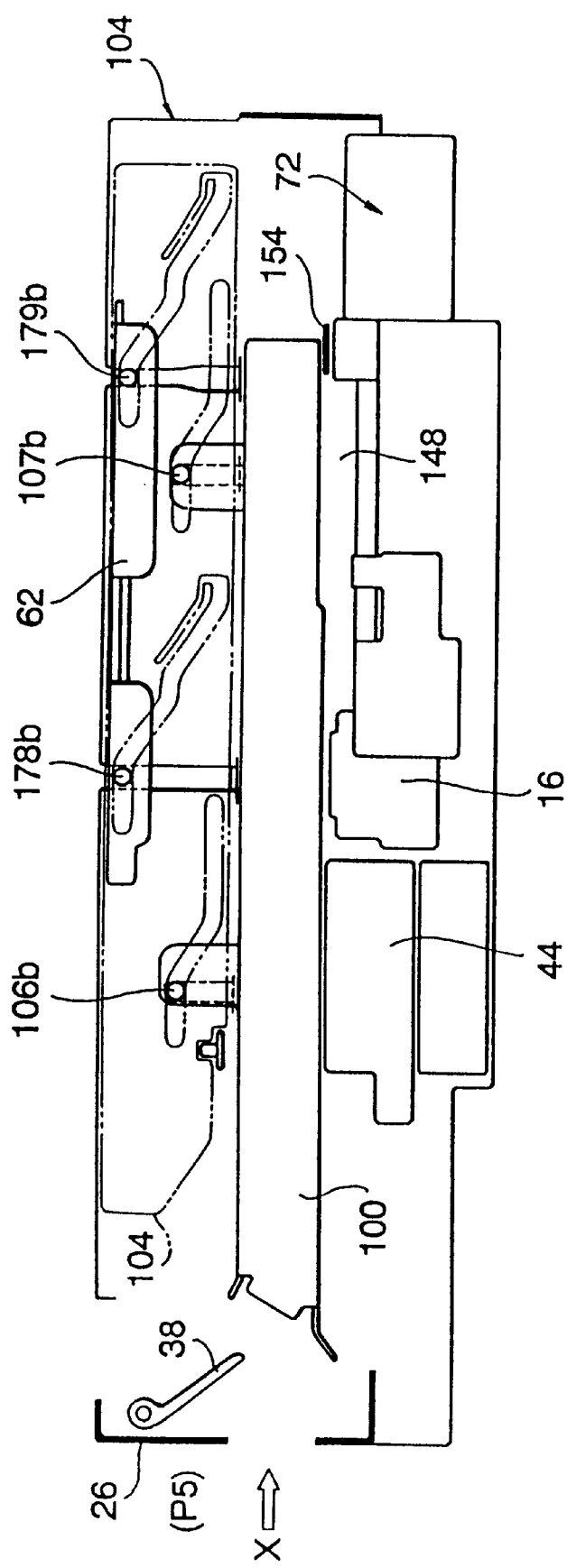
Figure 51:
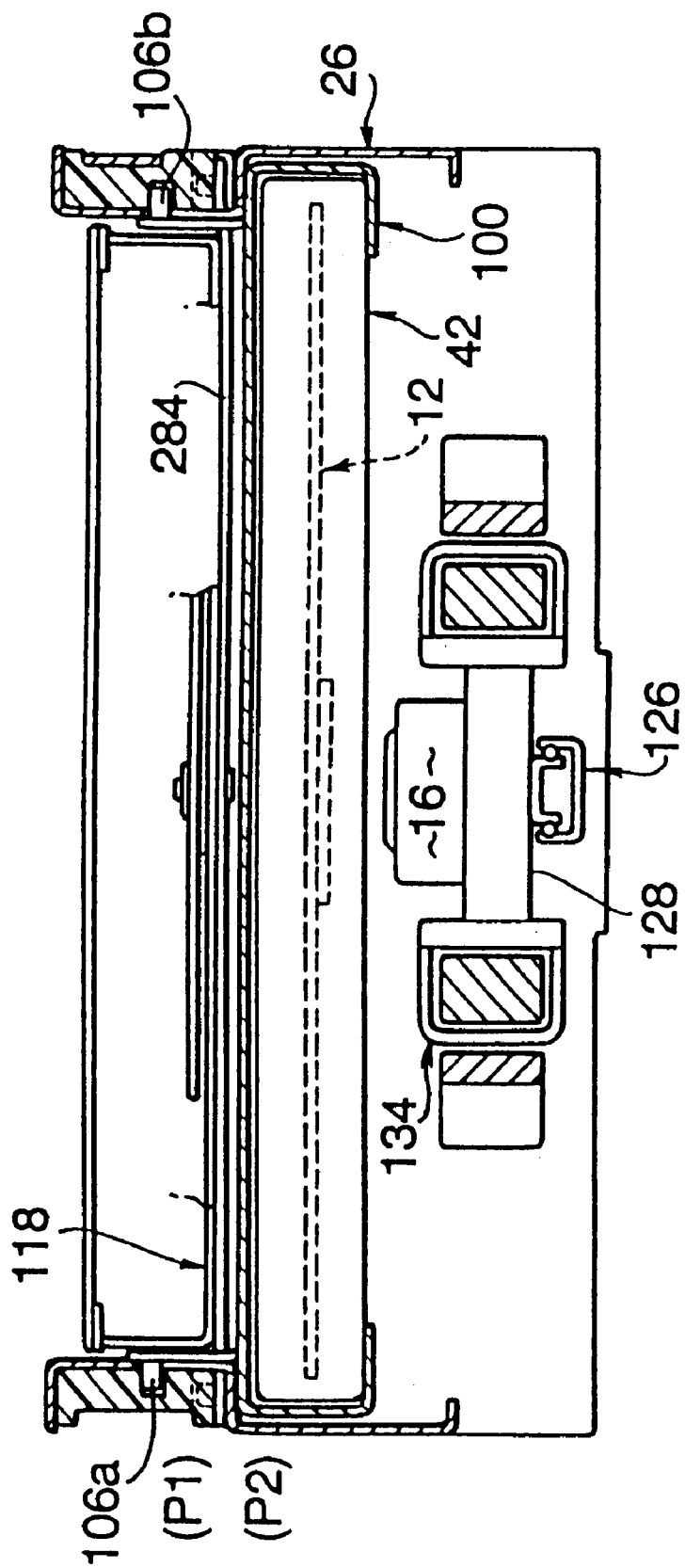
Figure 52:
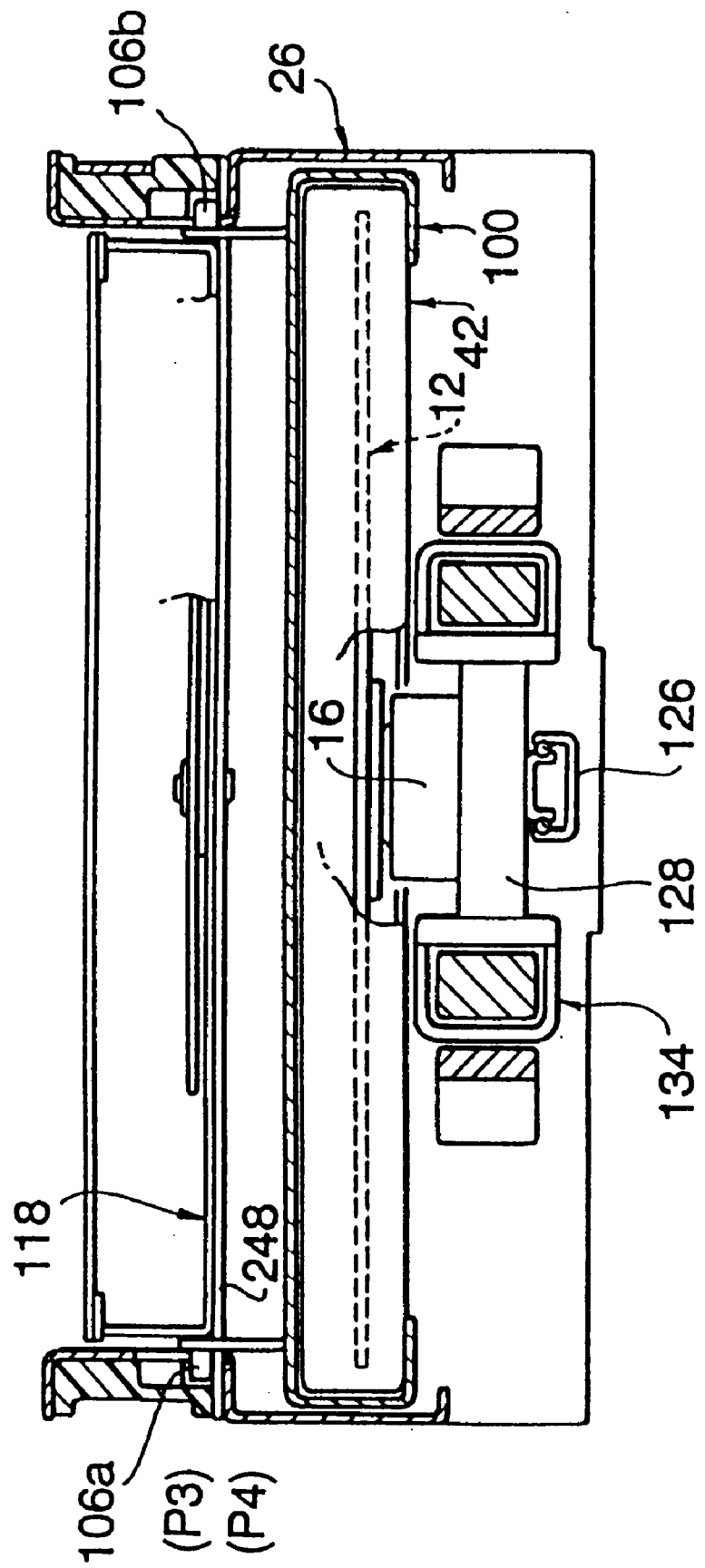
Figure 53:
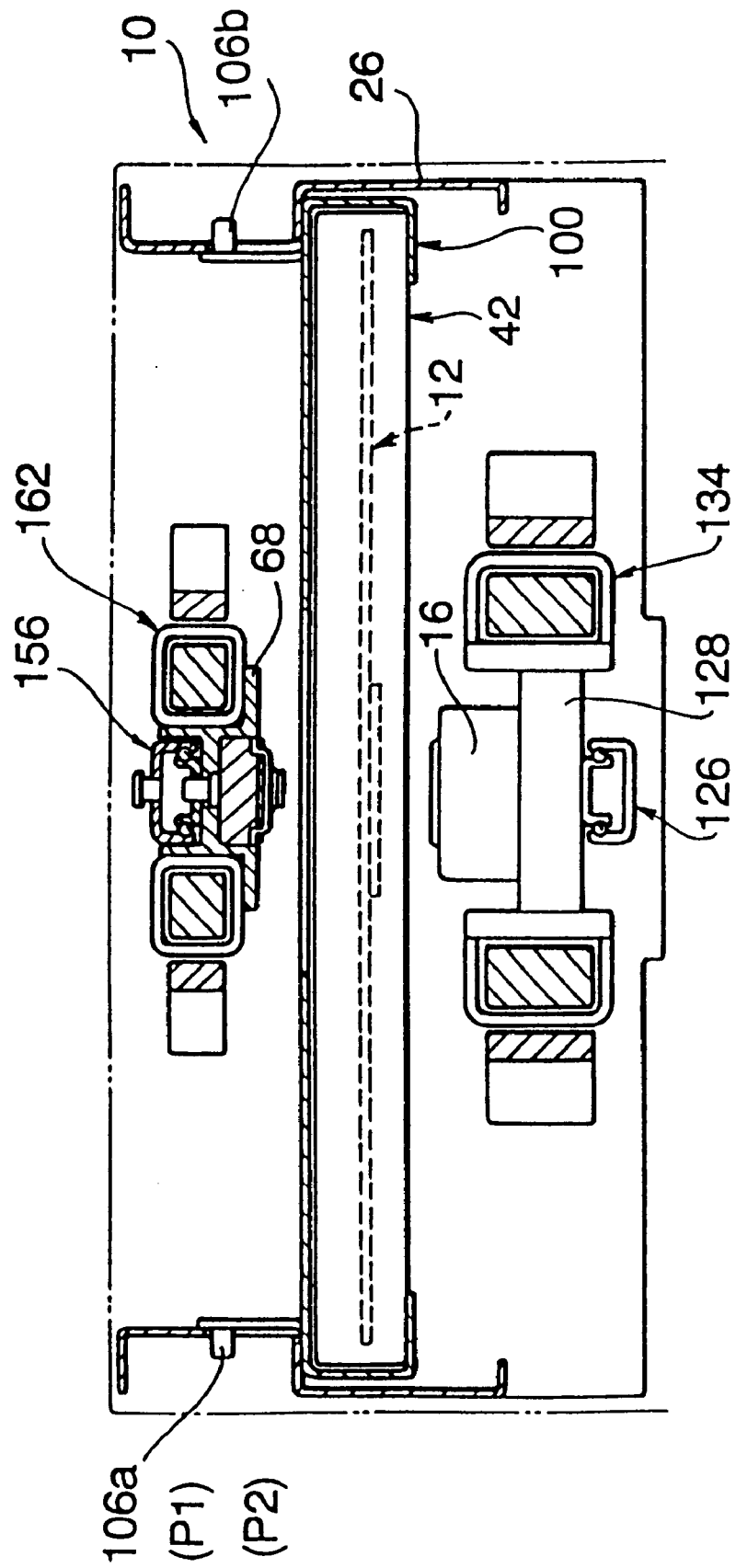
Figure 54:
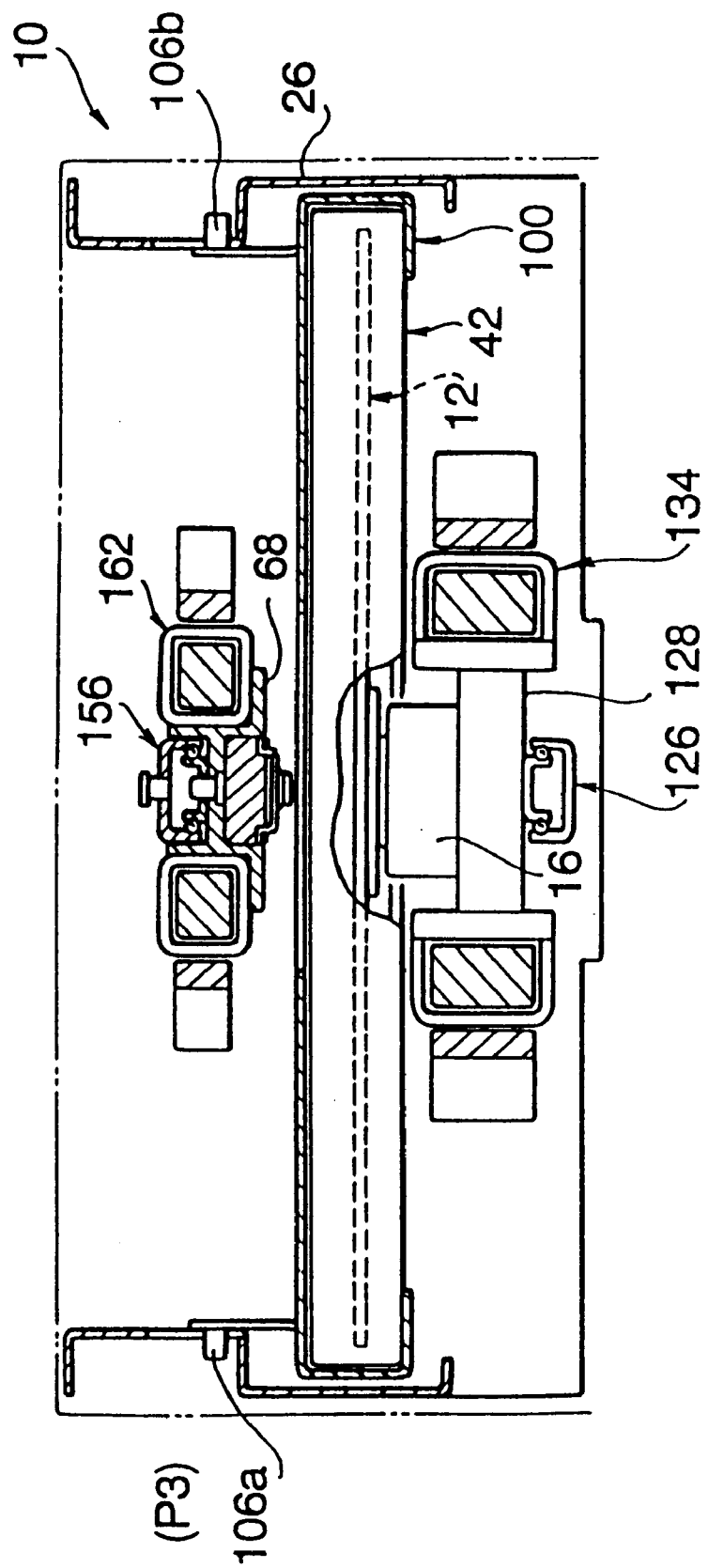
Figure 55:
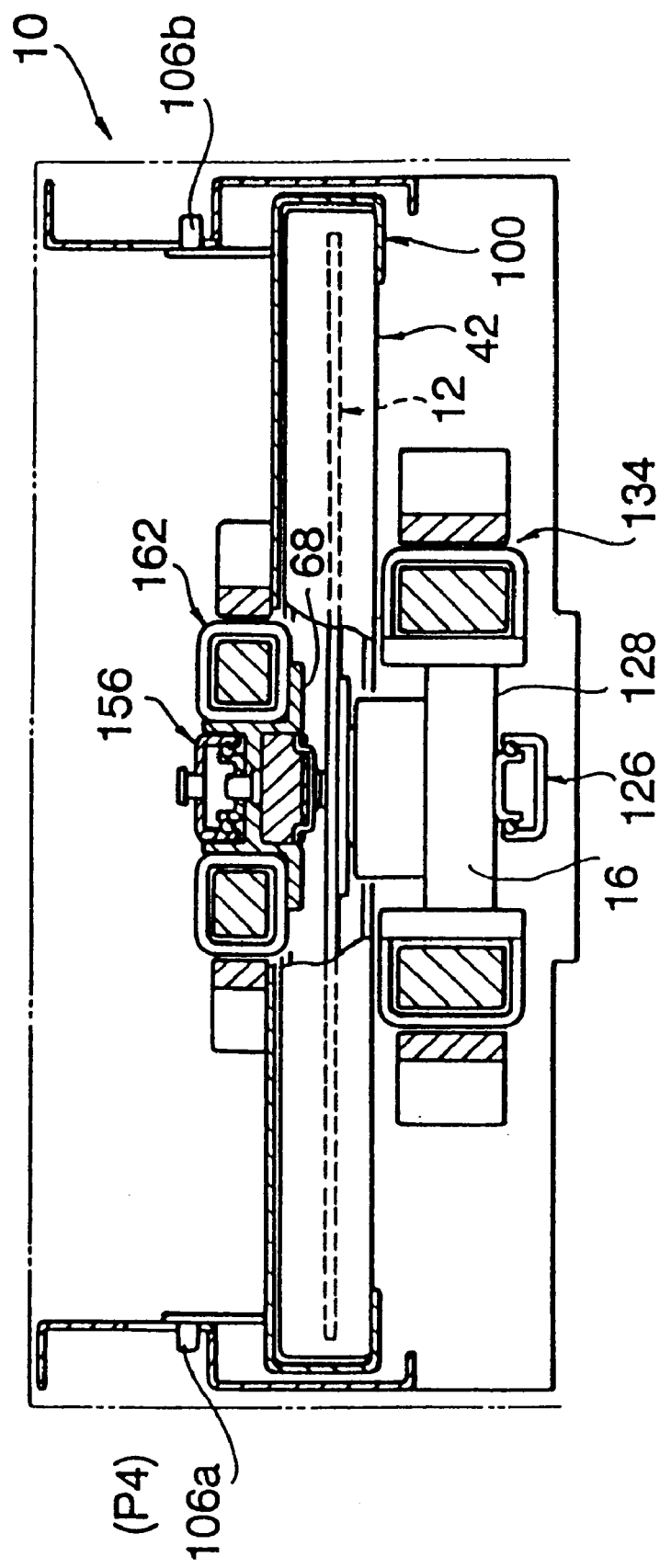
Figure 56:
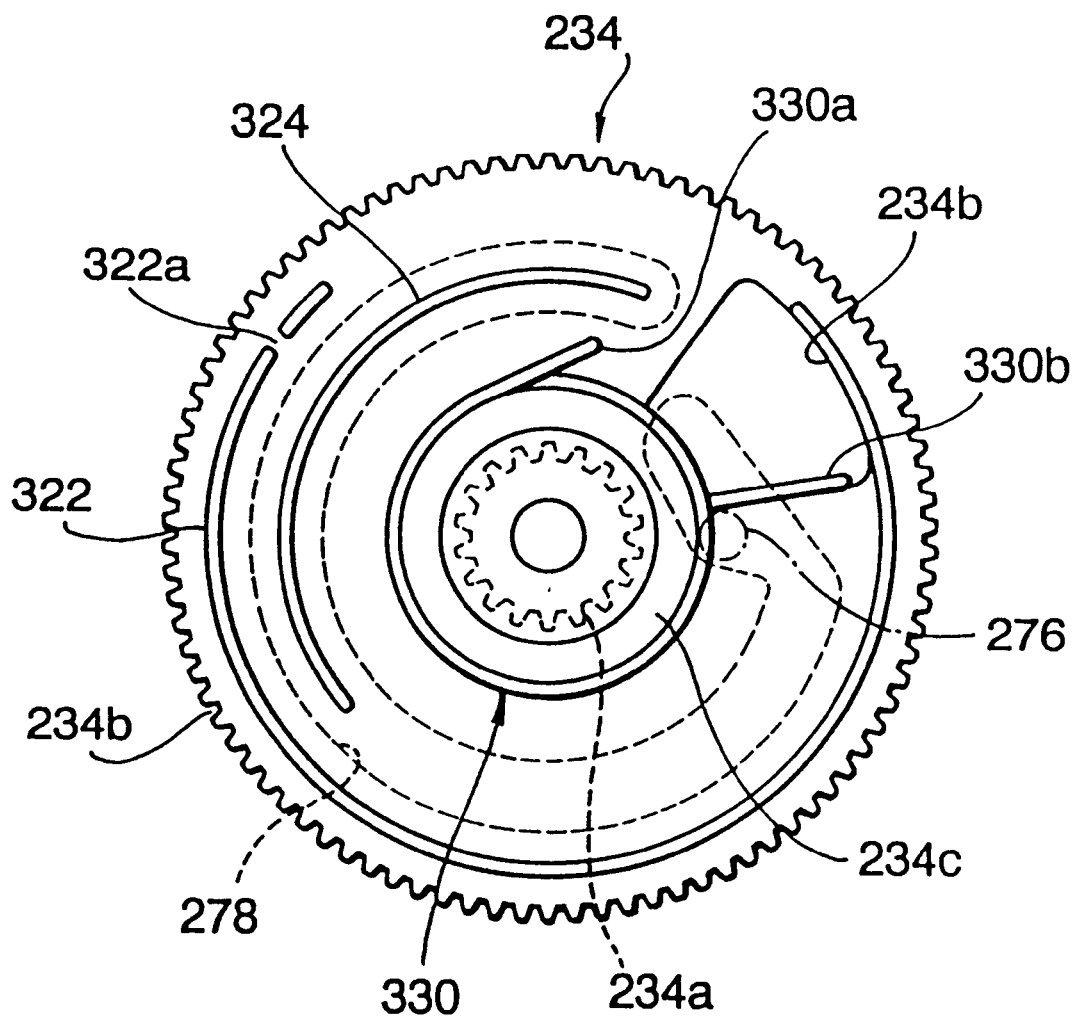
Figure 57:
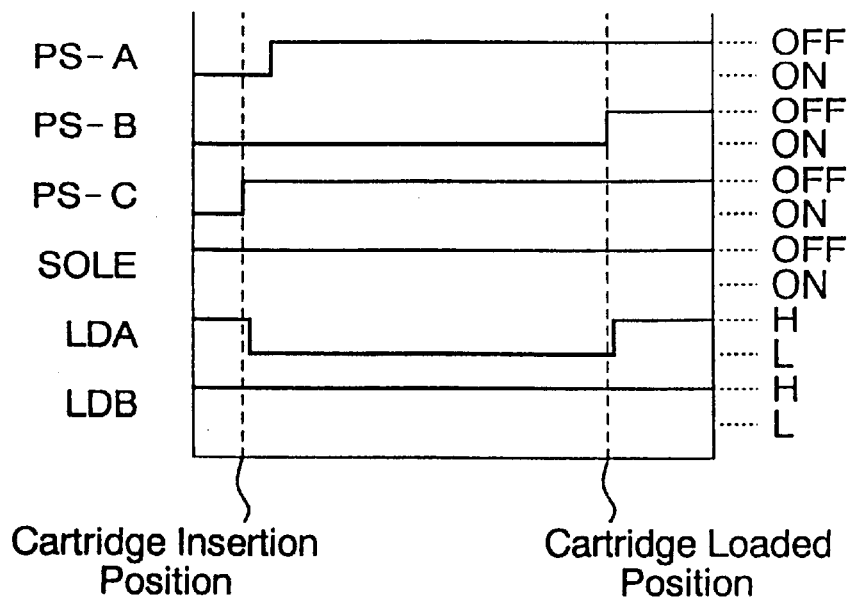
Figure 58:
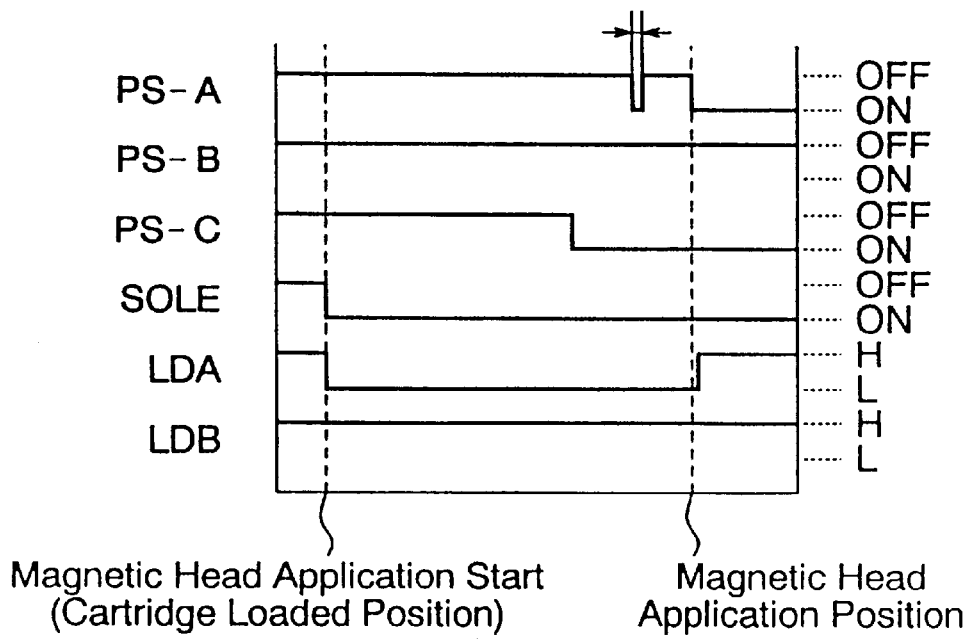
Figure 59:
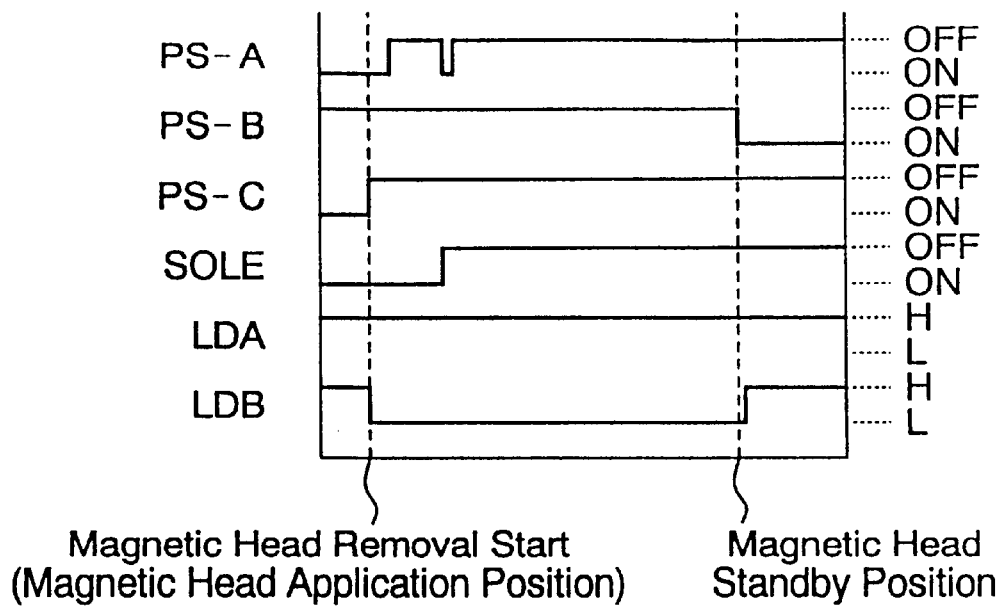
Figure 60:
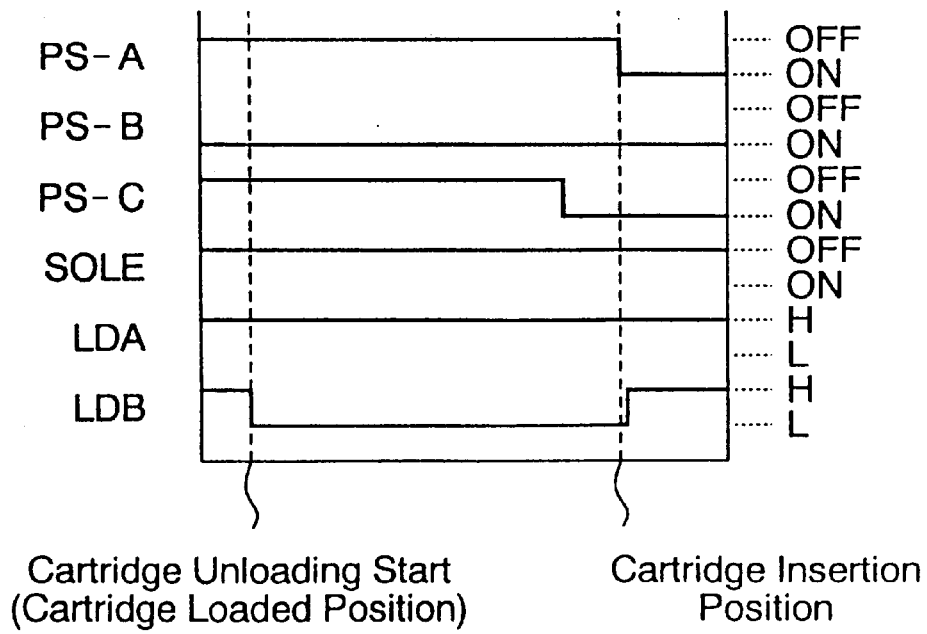
Figure 61:
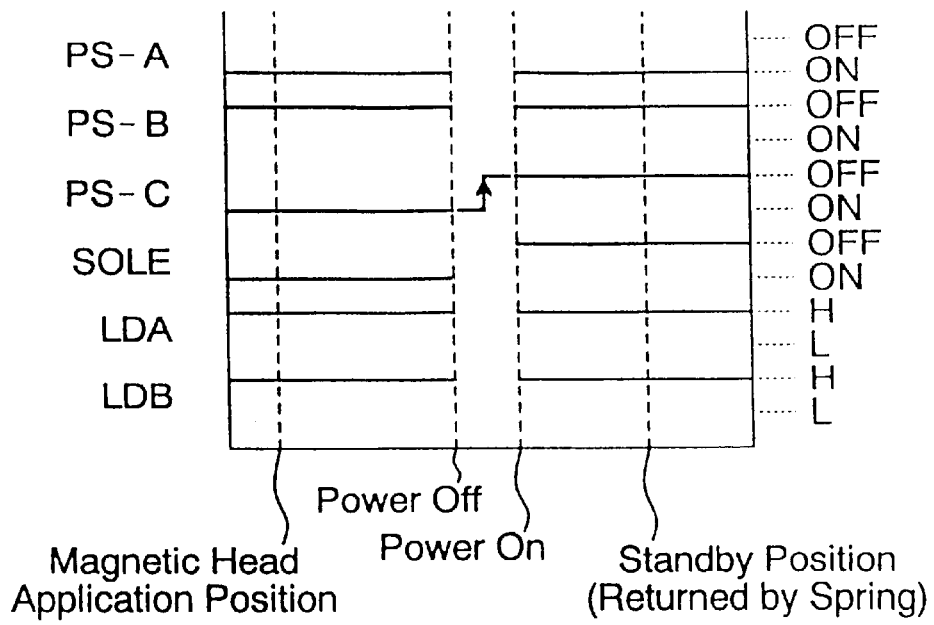
Figure 62:
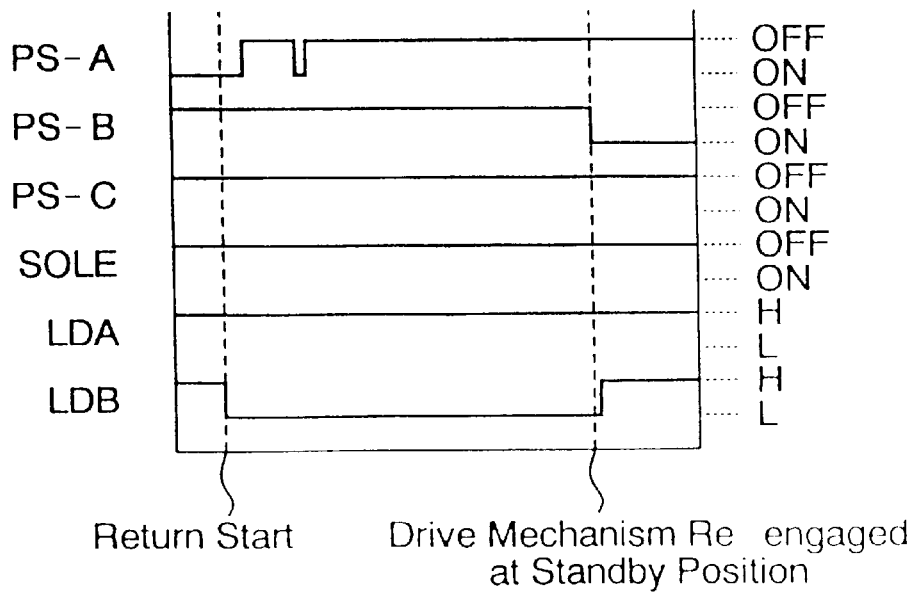
Figure 63:
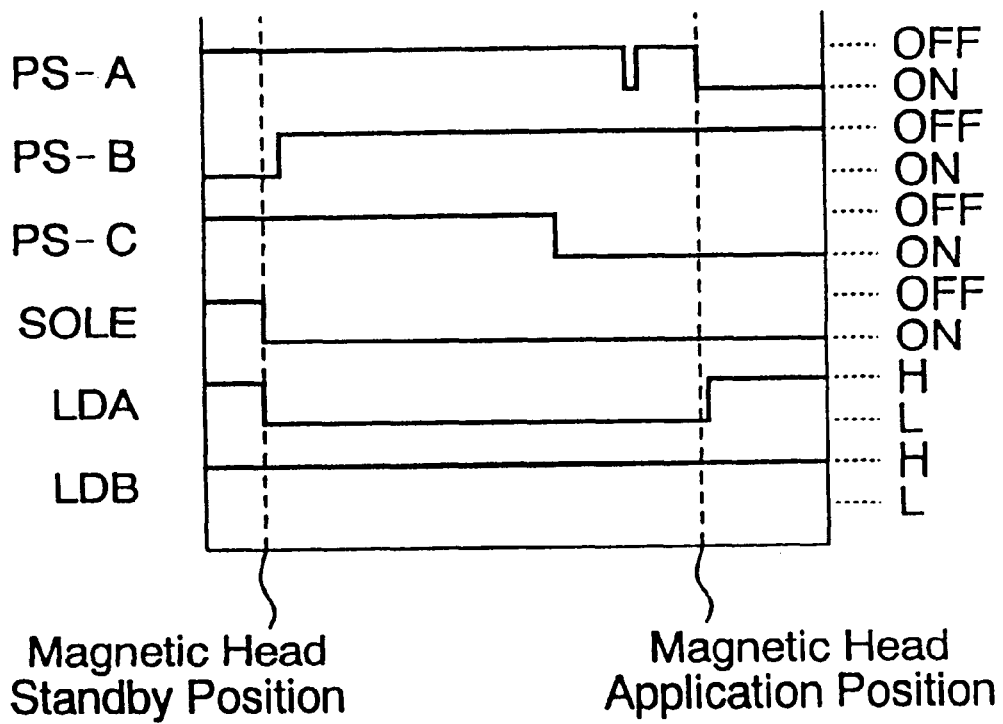
Figure 64A:
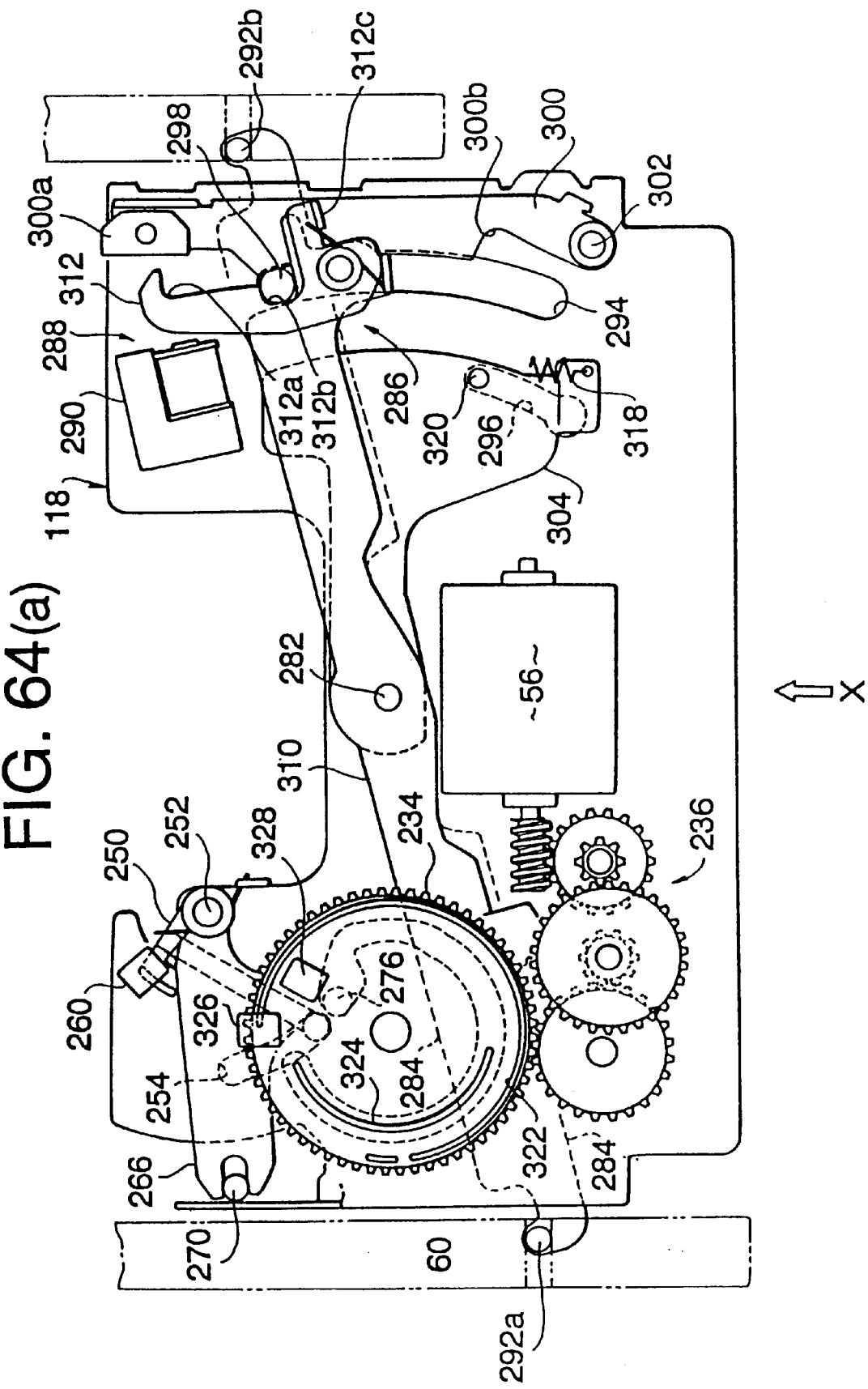
Figure 64B:
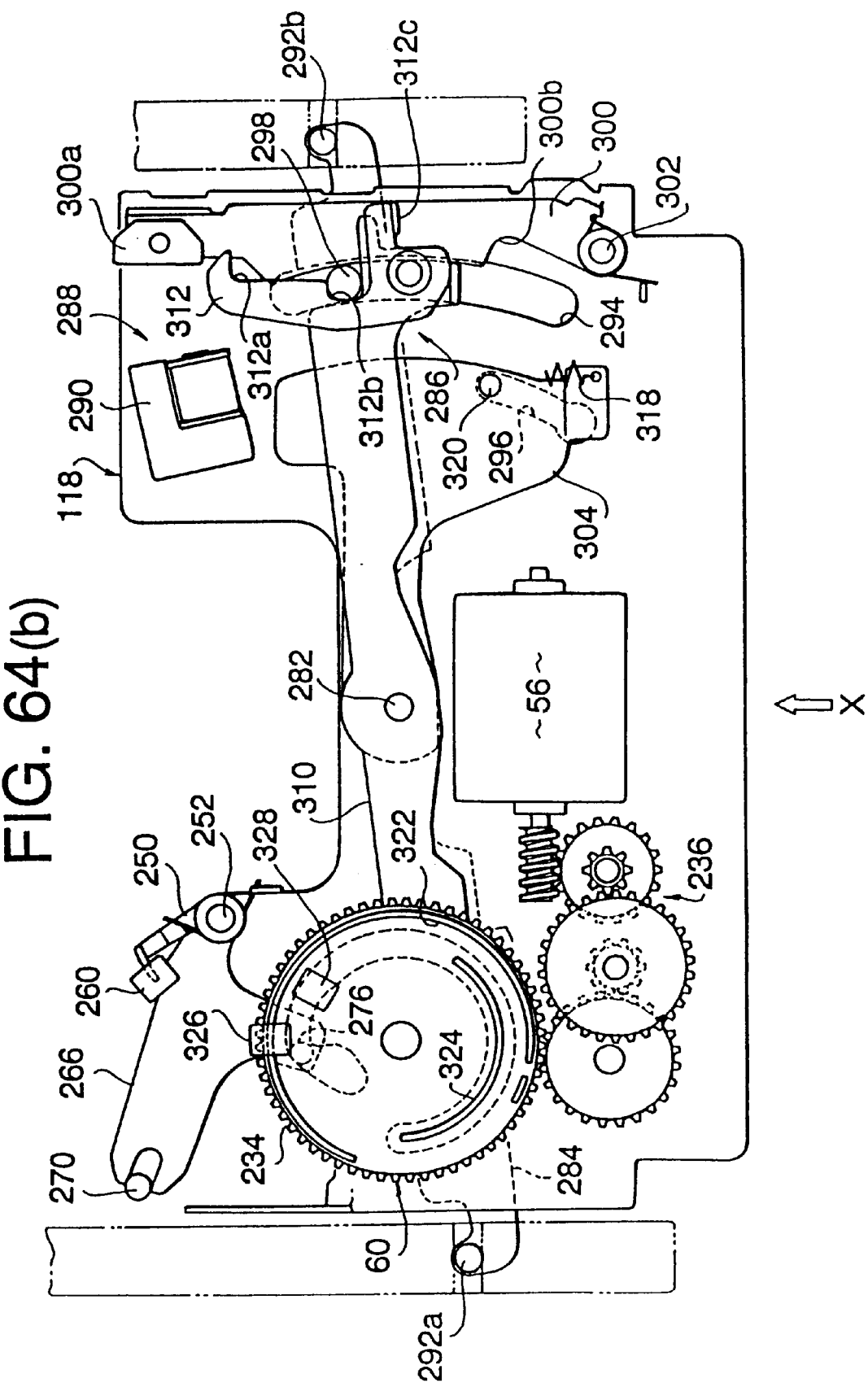
Figure 64D:
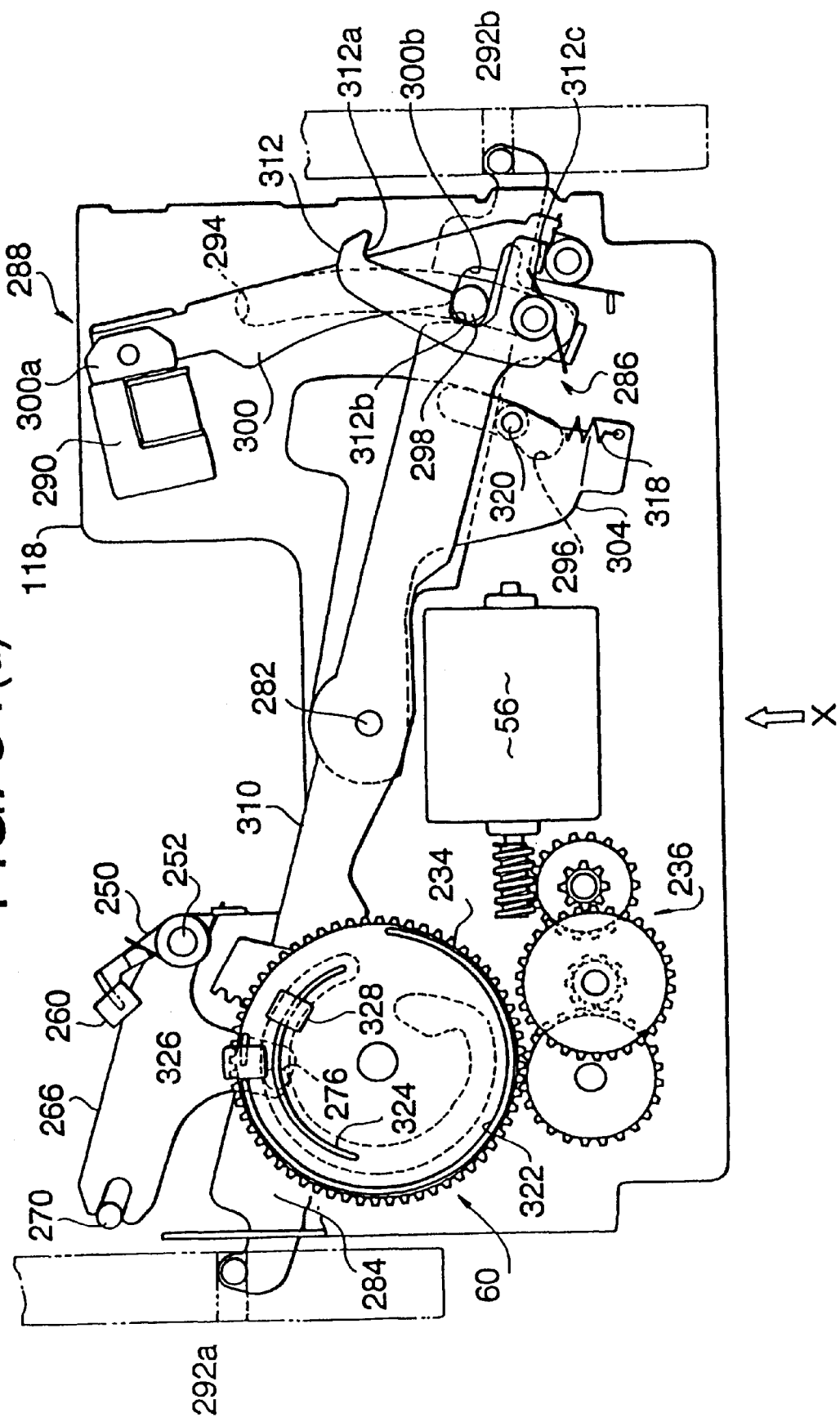
Figure 66:
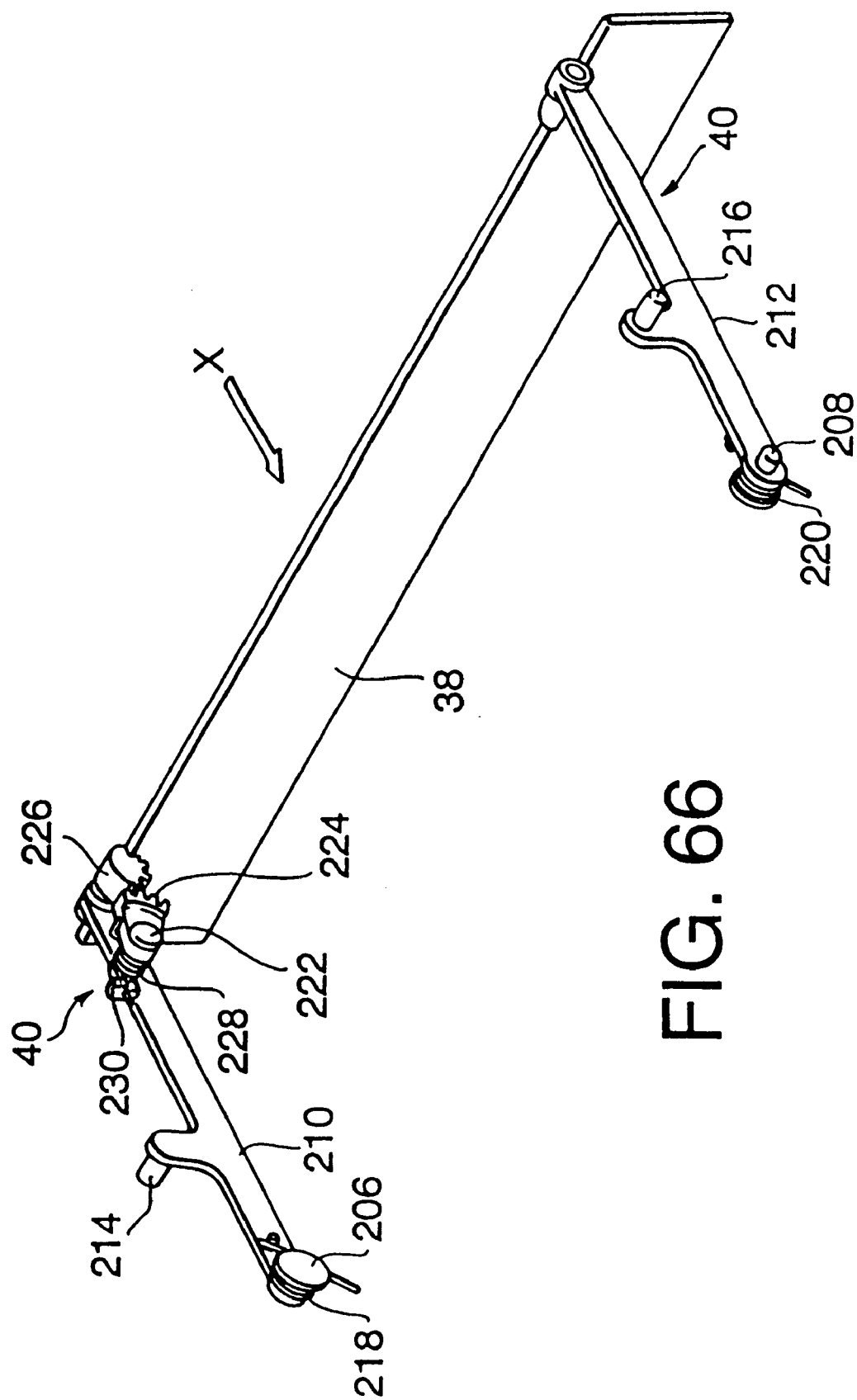
Figure 67:
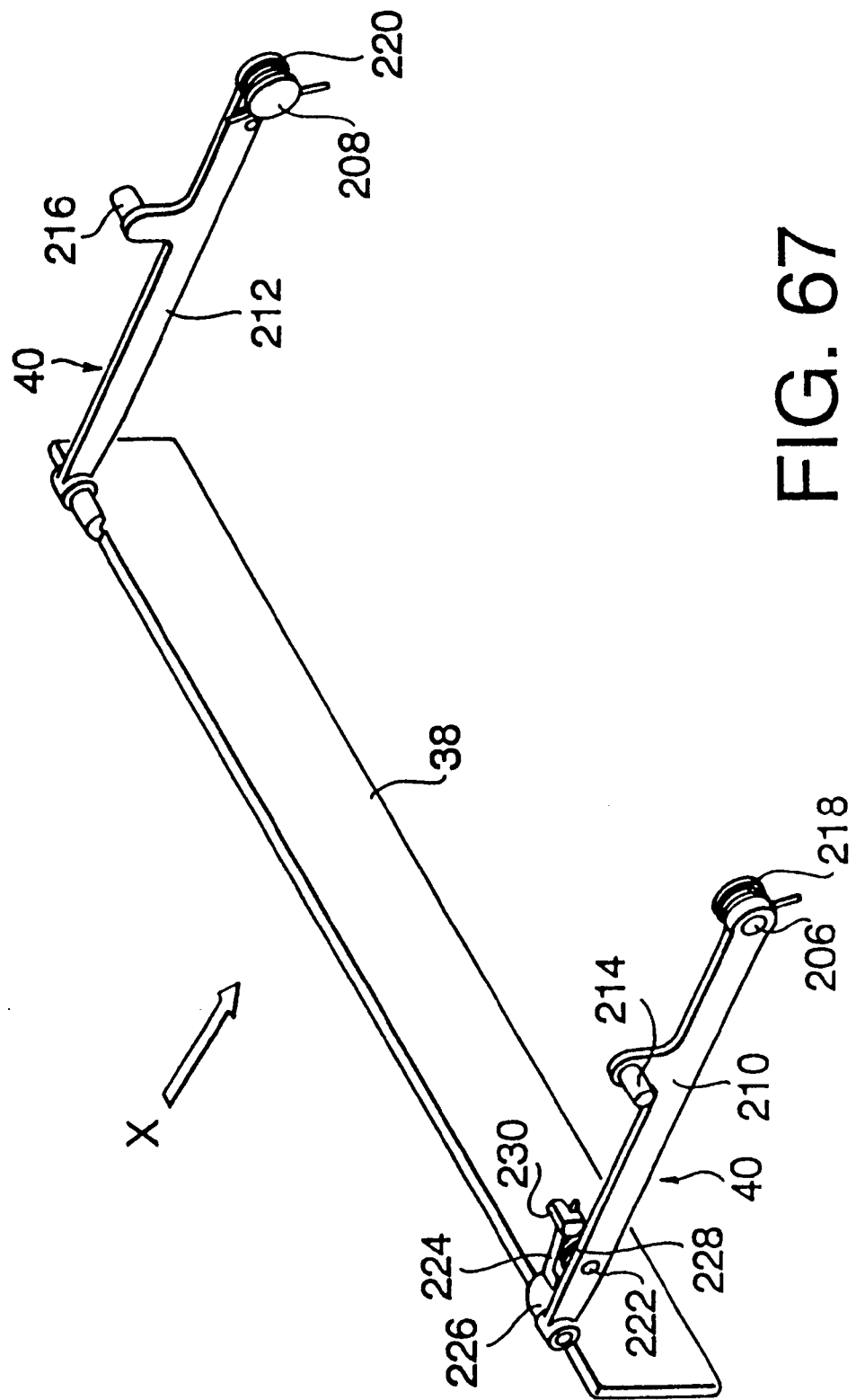
Figure 68:
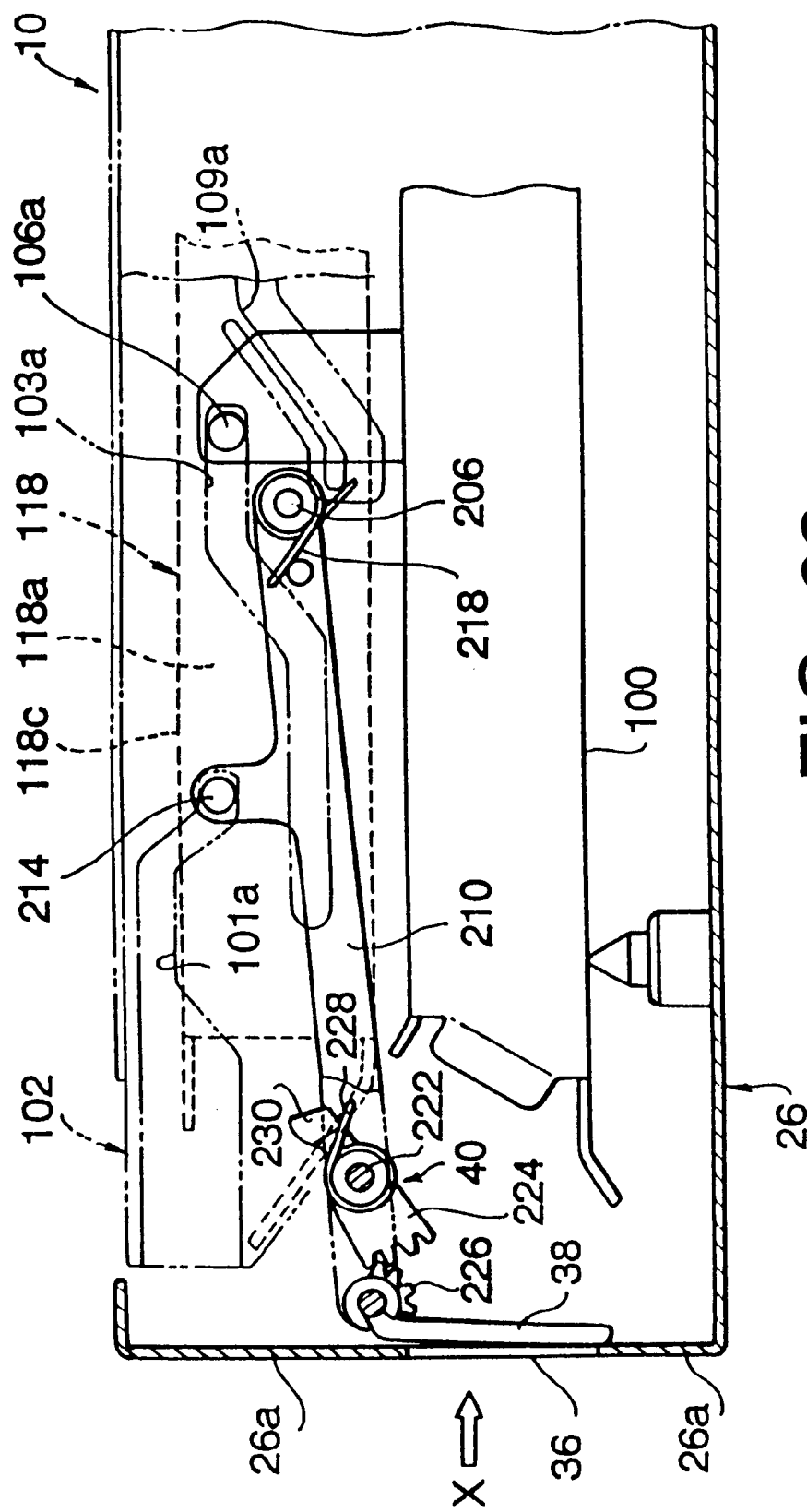
Figure 69:
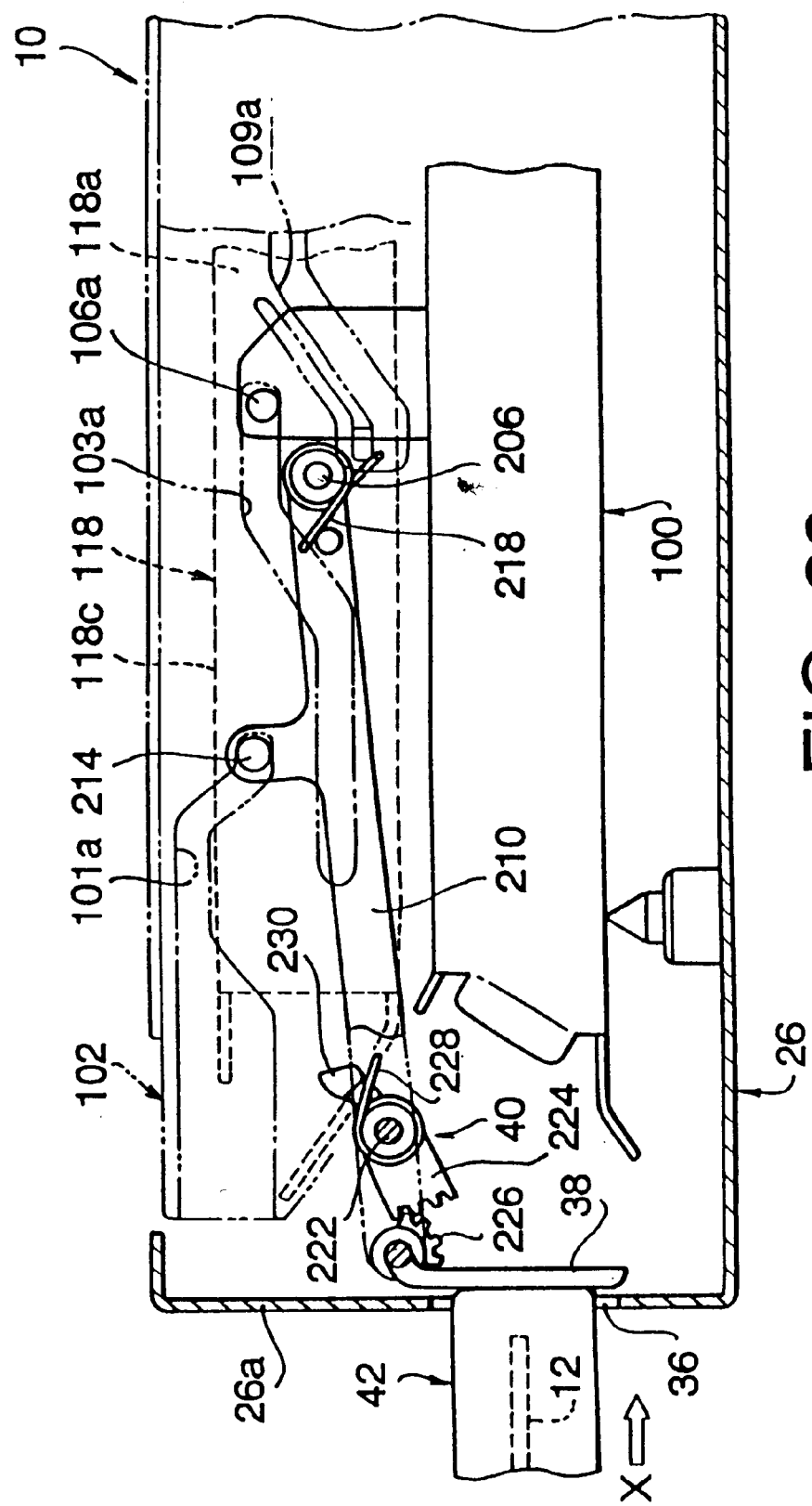
Figure 70:
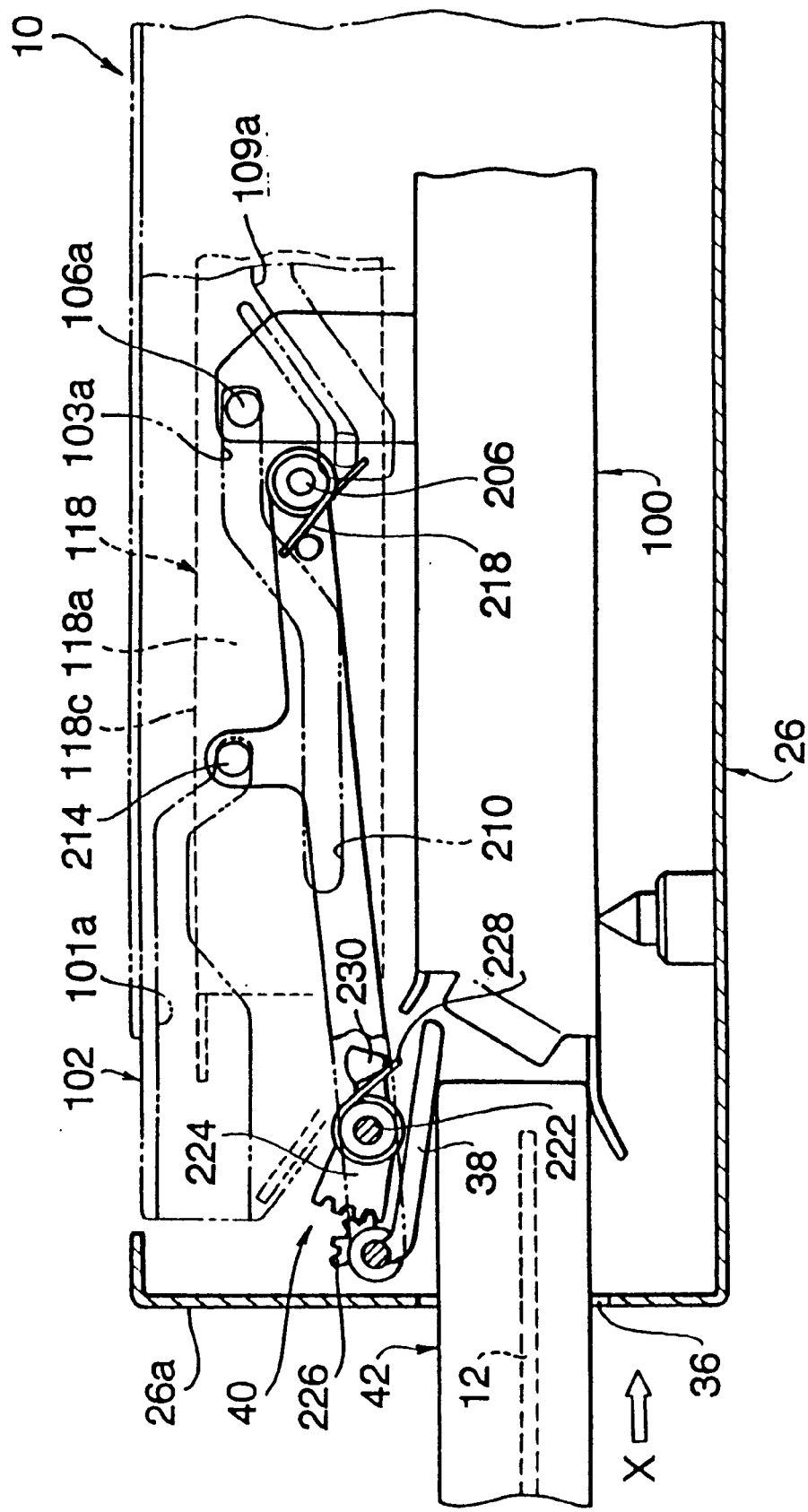
Figure 71:
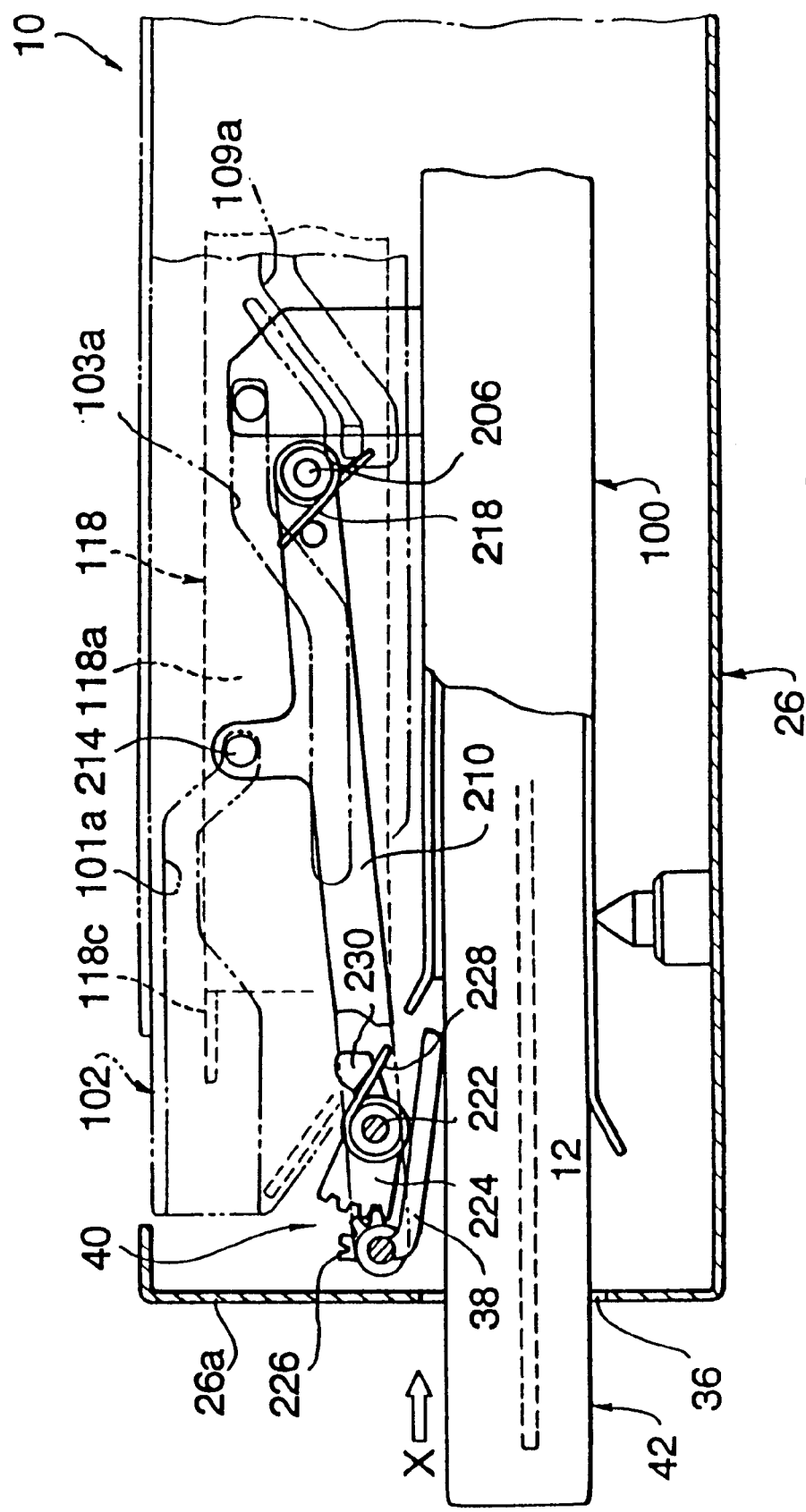
Figure 72:
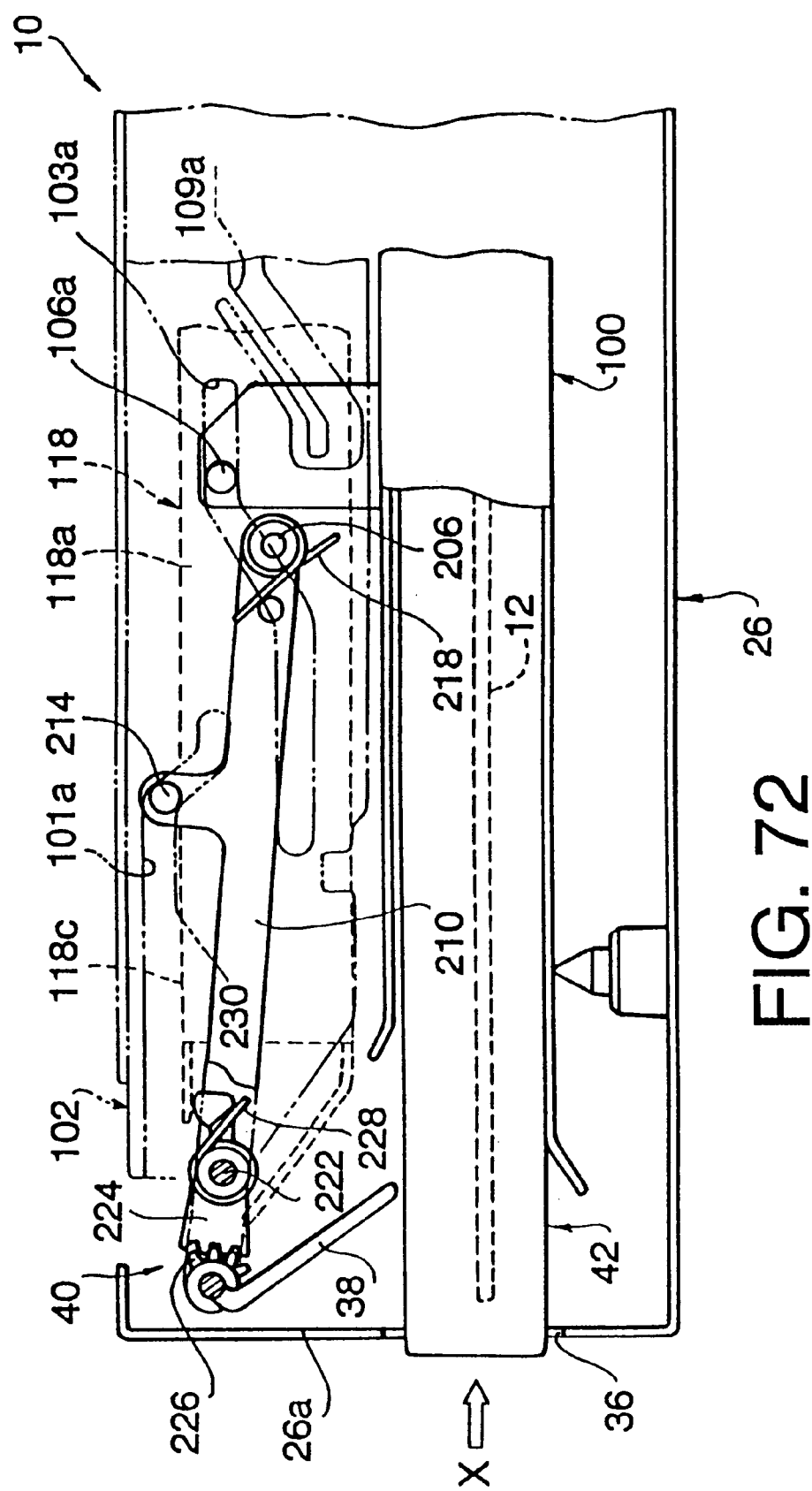
Figure 73:
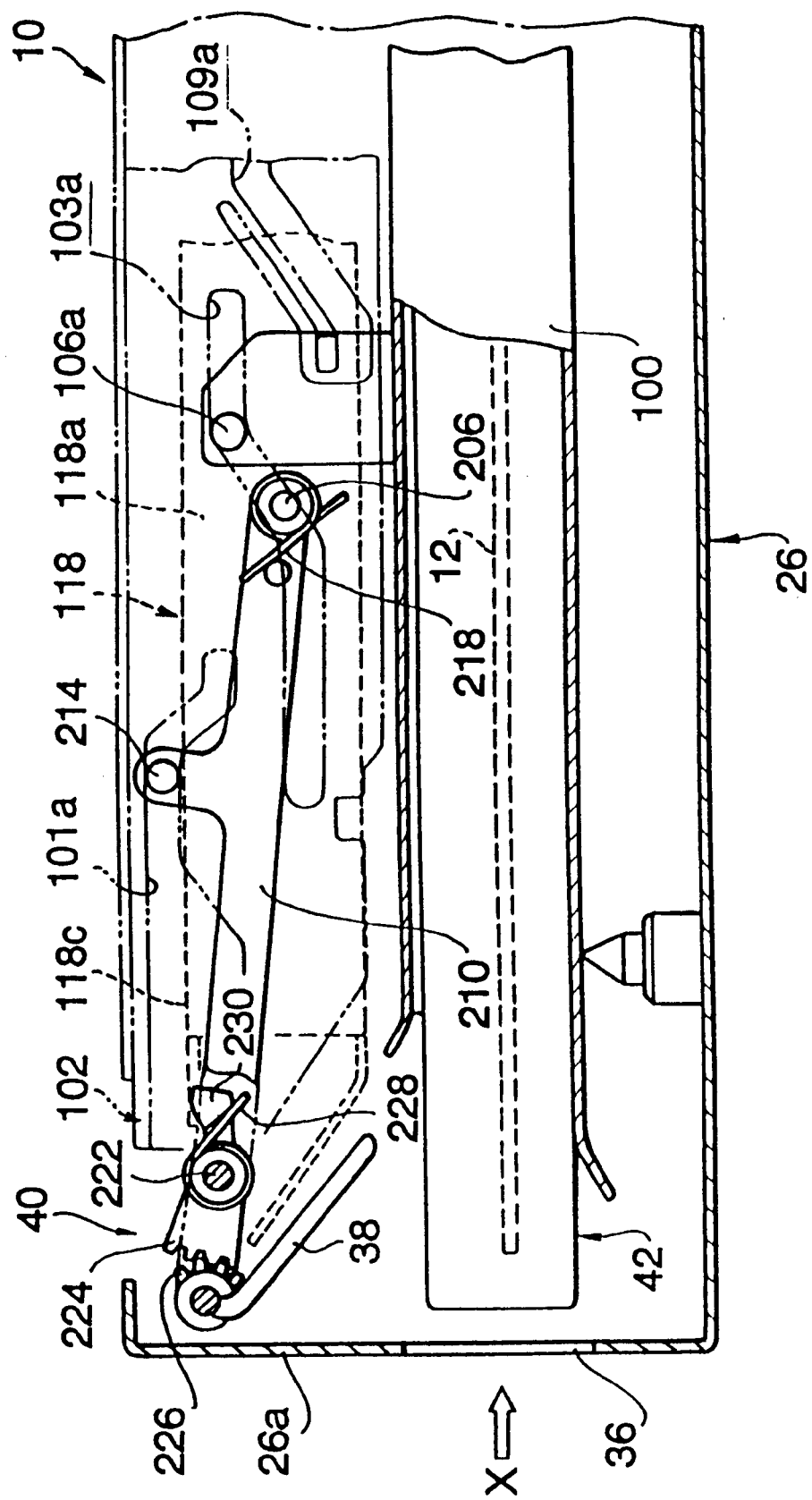
Figure 74:
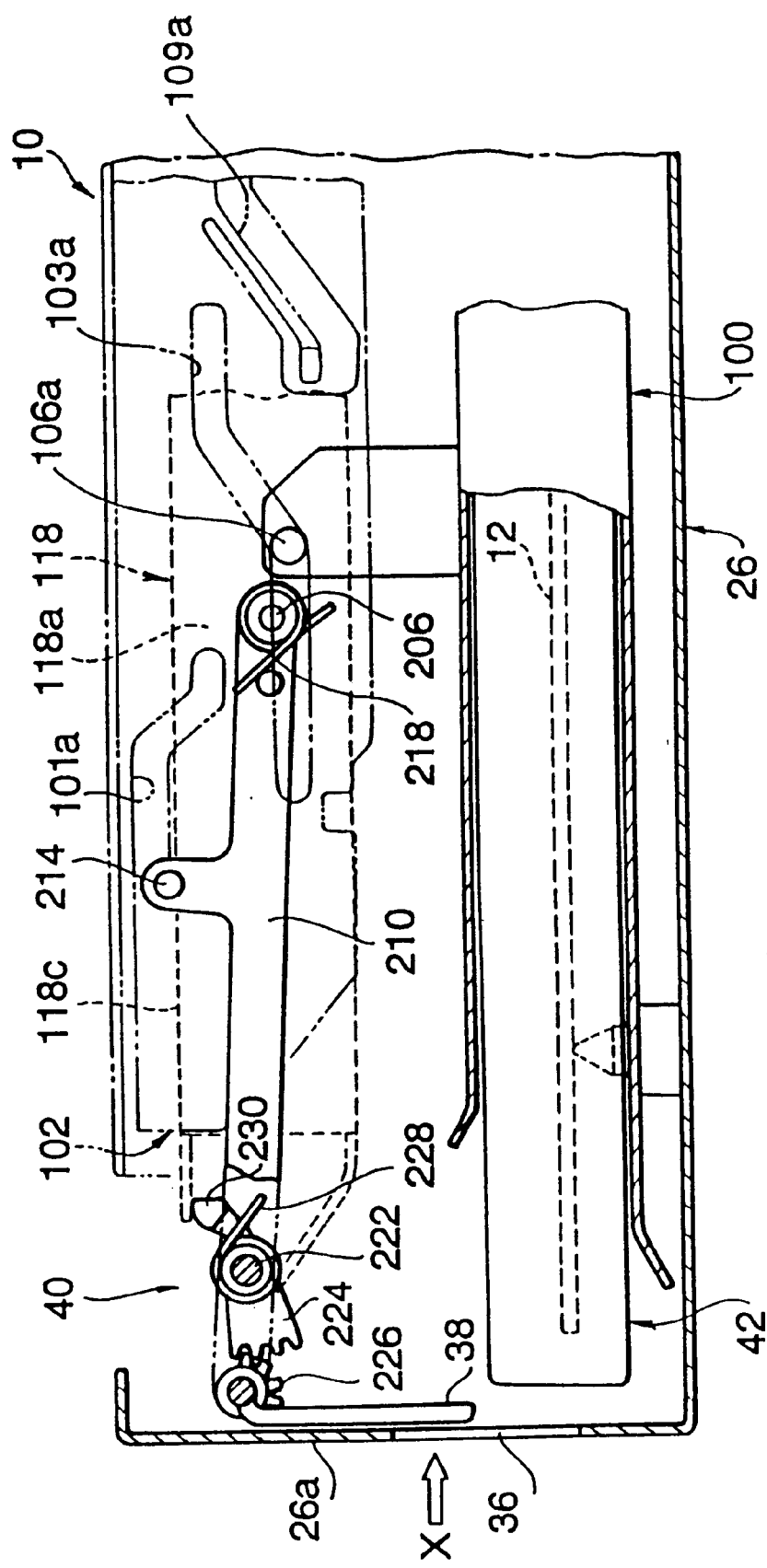
Figure 75:
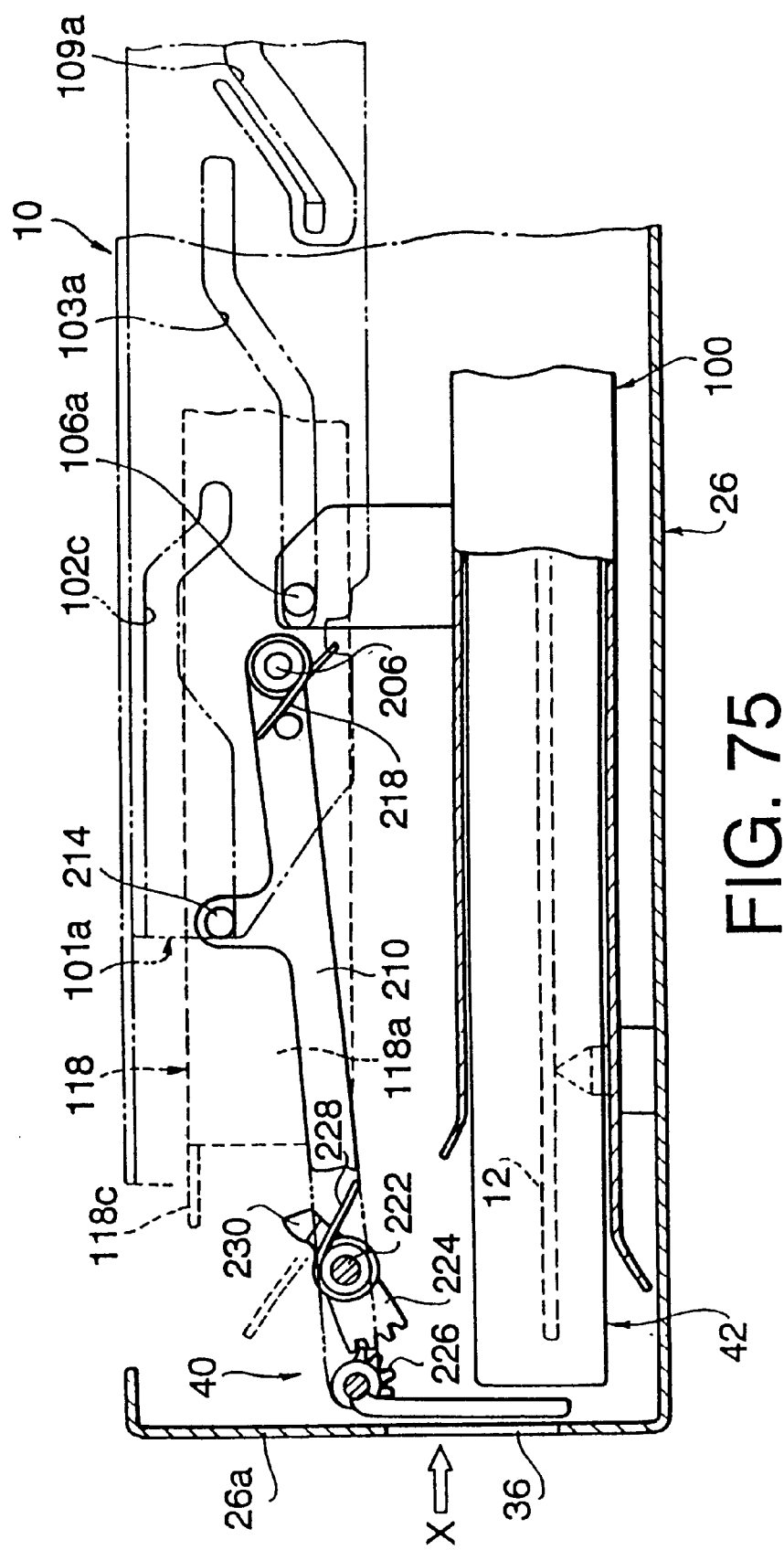
Figure 76:
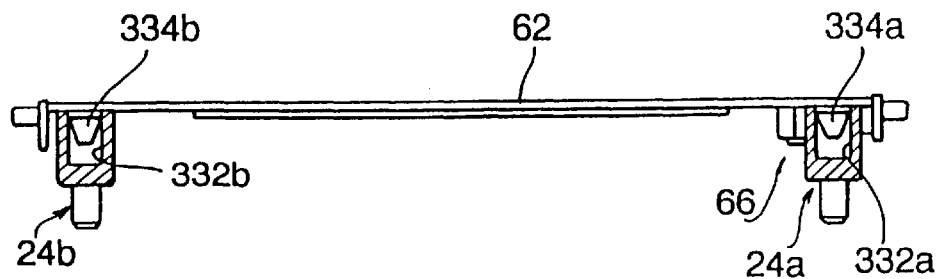
Figure 77:
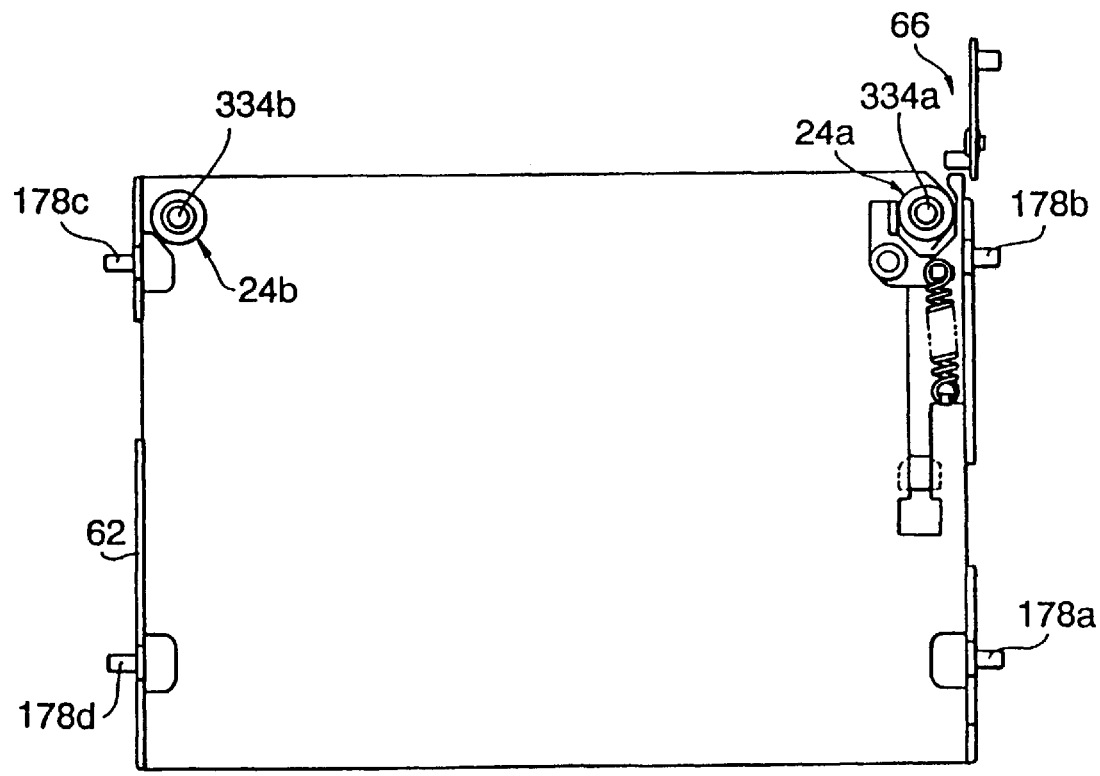
Figure 78A:
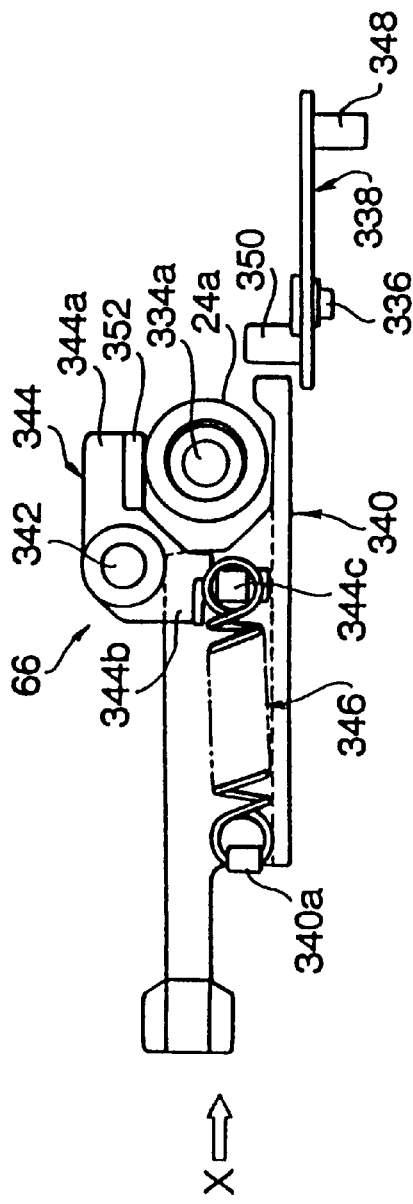
Figure 78B:
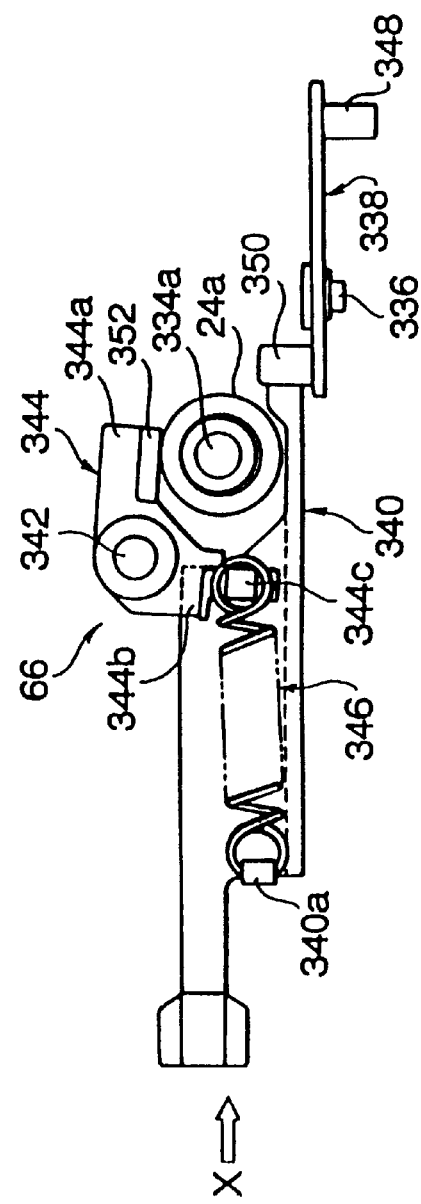
Figure 79:
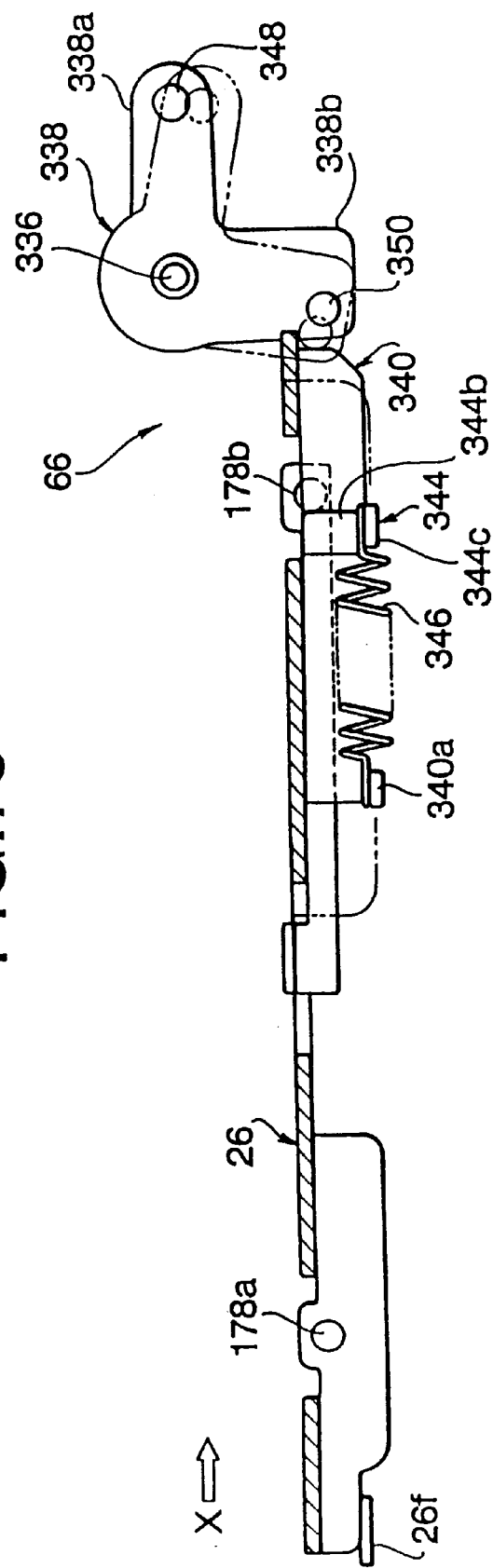
Figure 80:
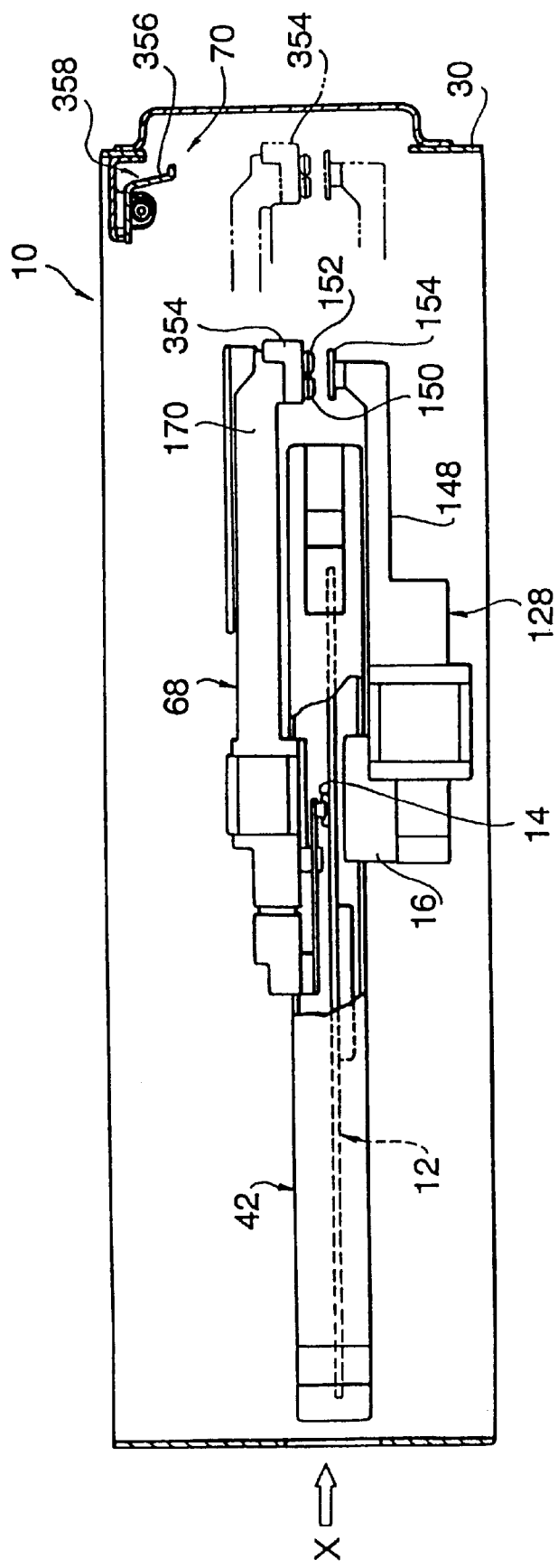
Figure 81:
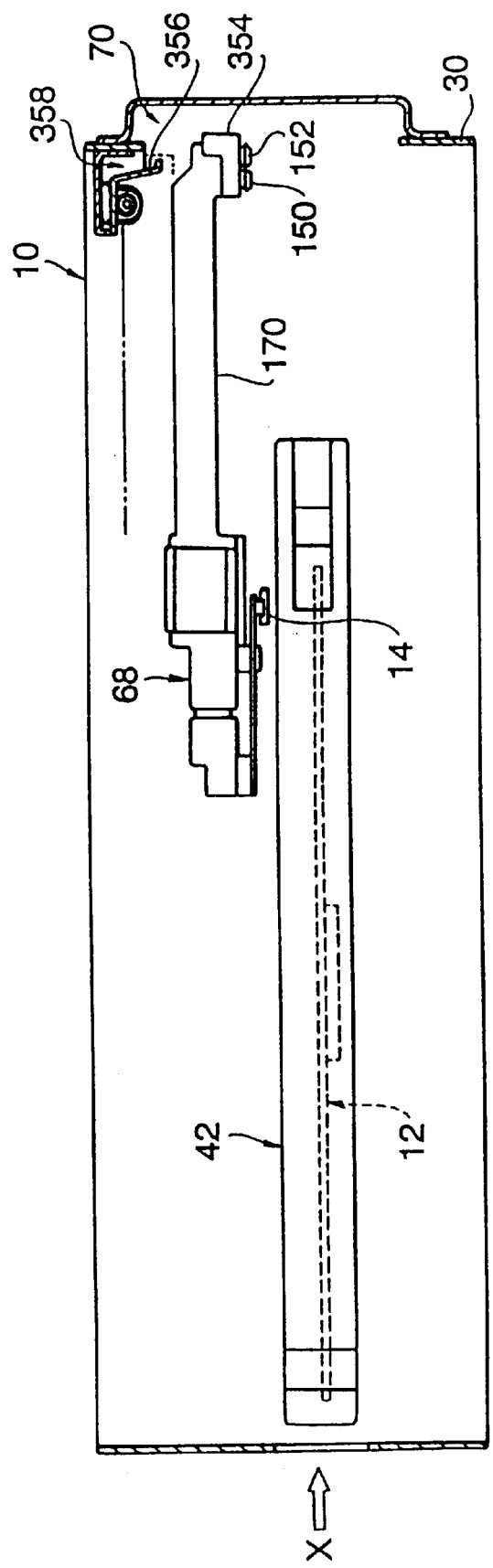
Figure 82:
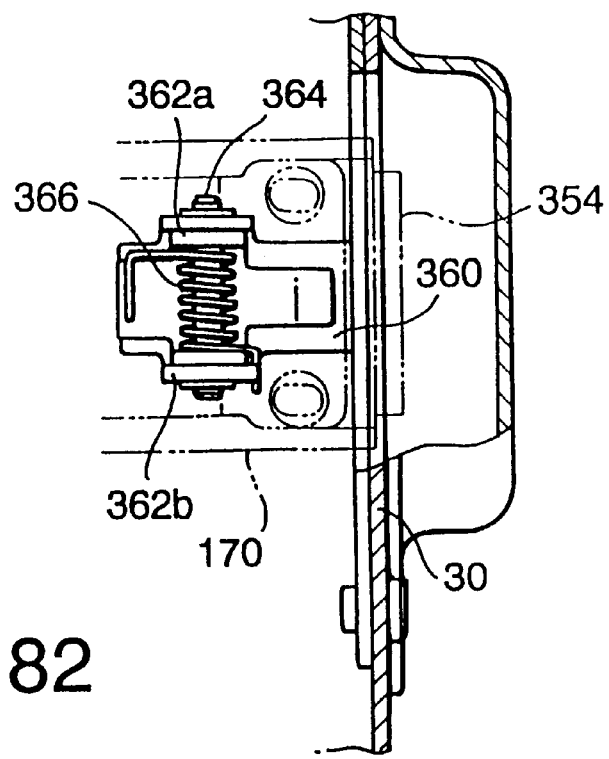
Figure 83:
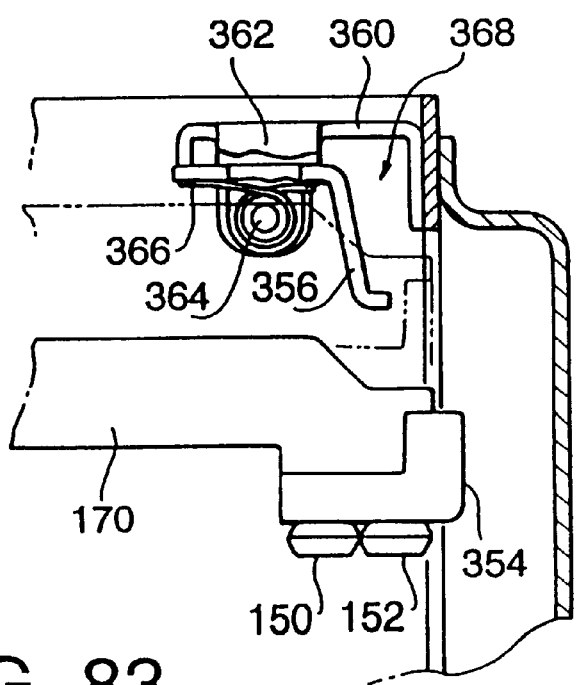
Figure 84:
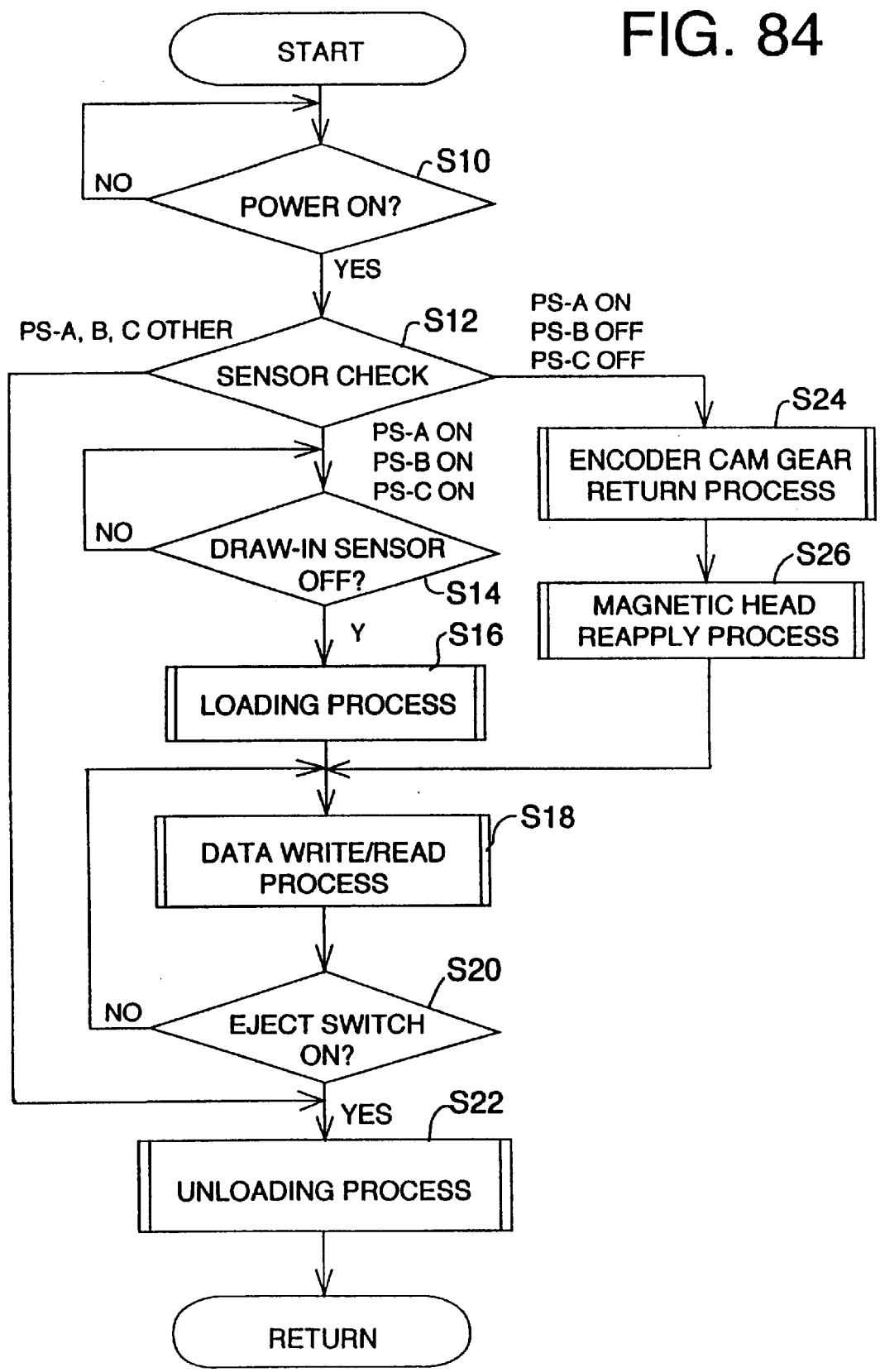
Figure 85:
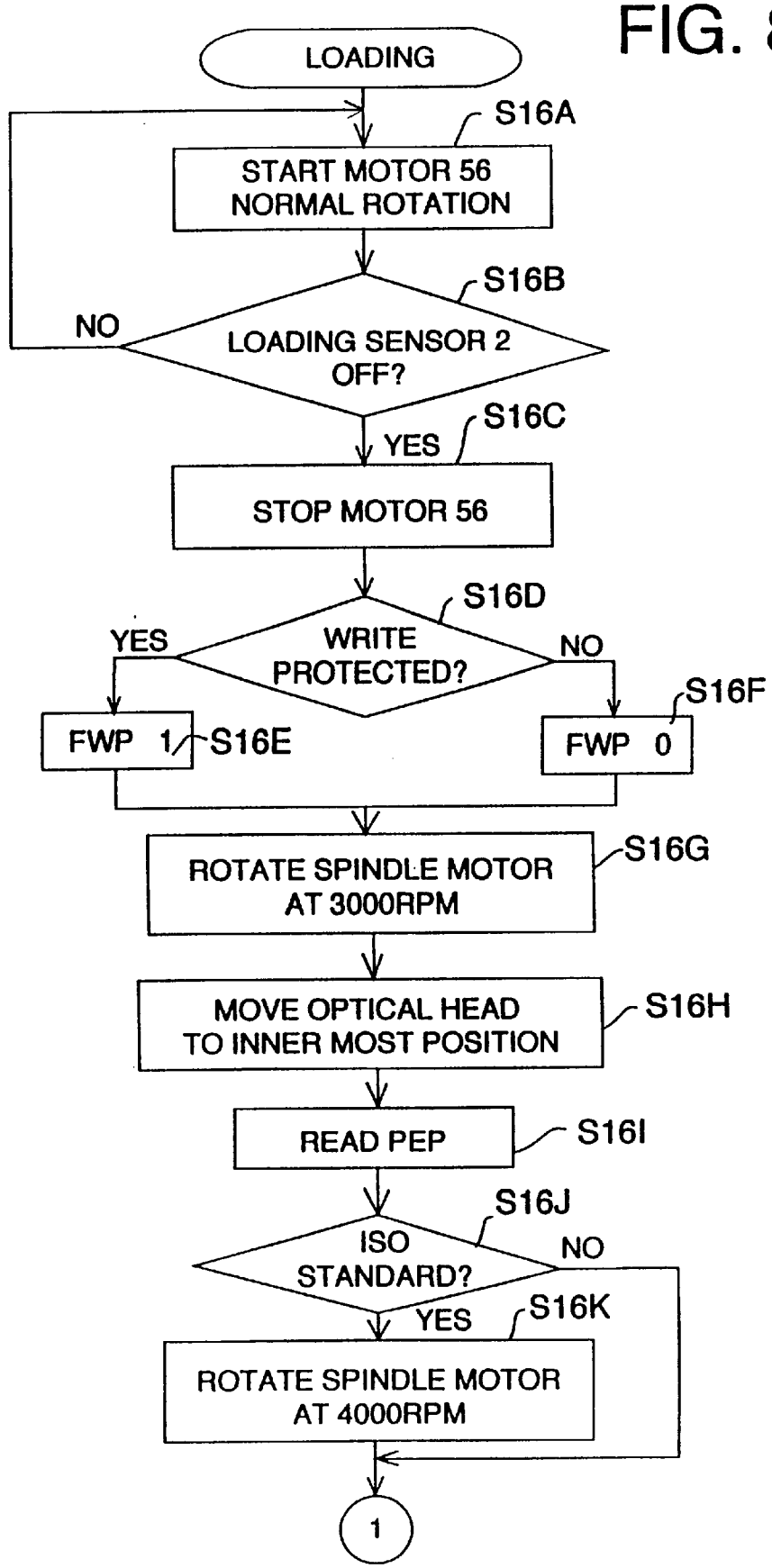
Figure 86:
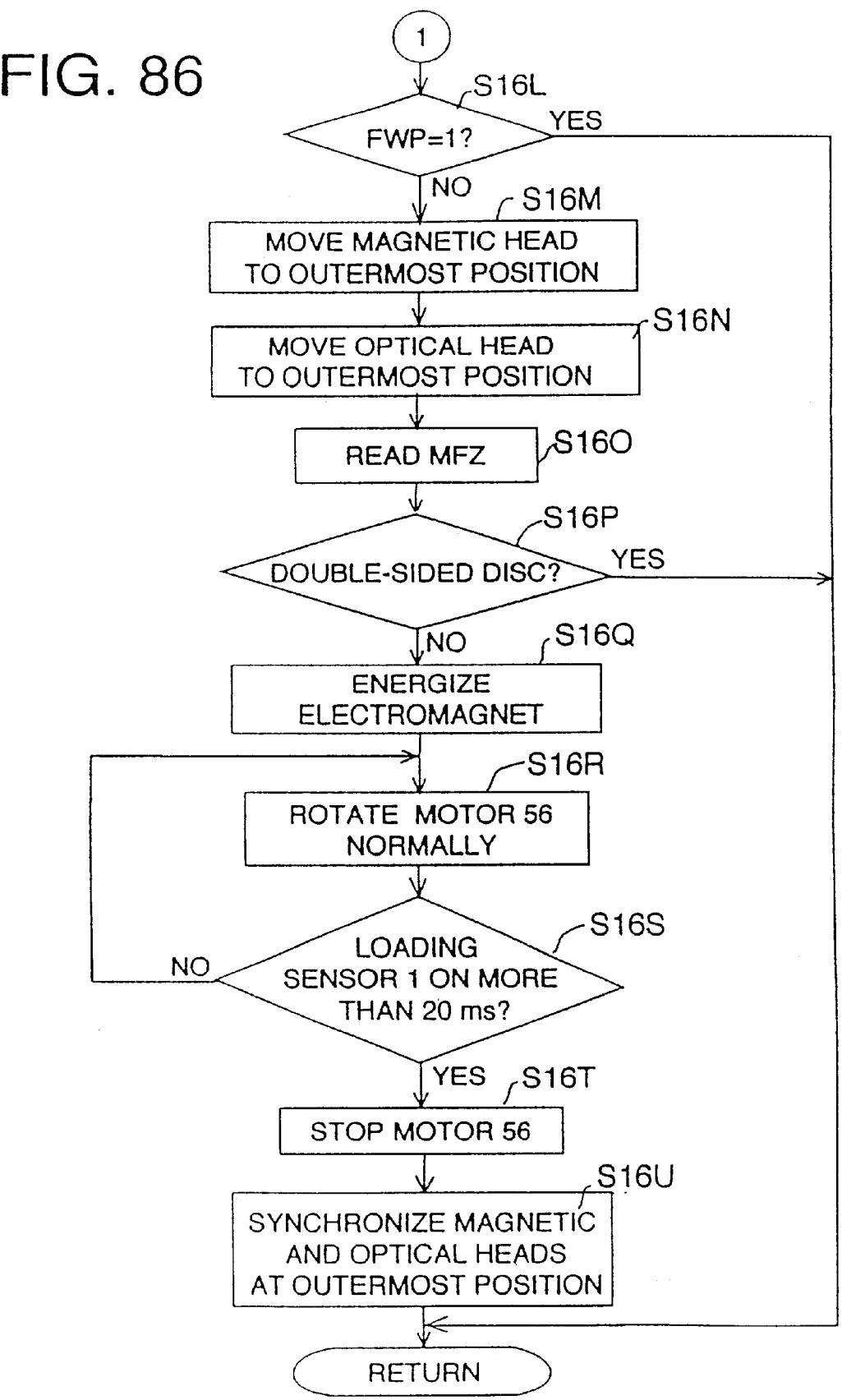
Figure 87:
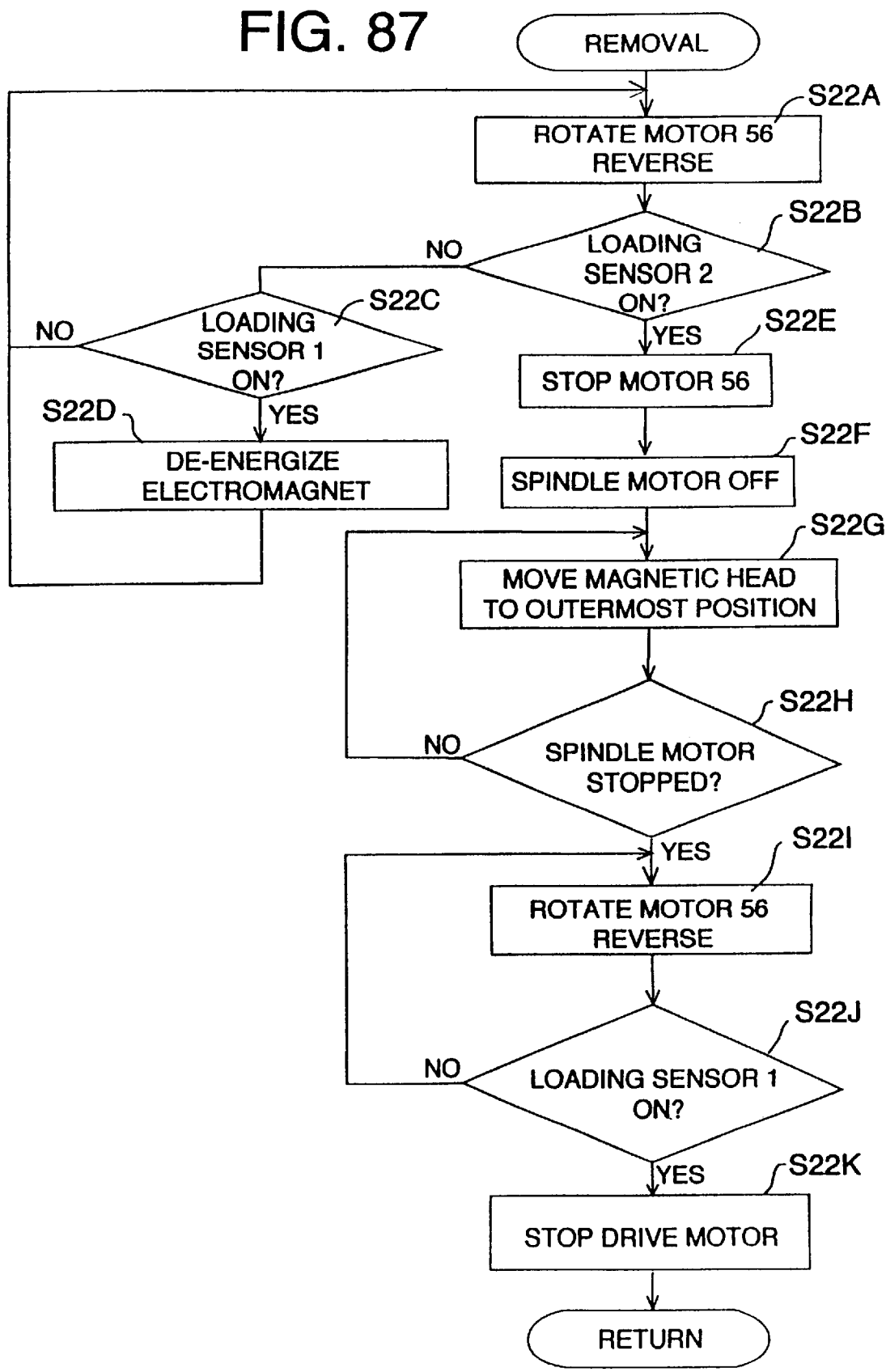
Figure 88:
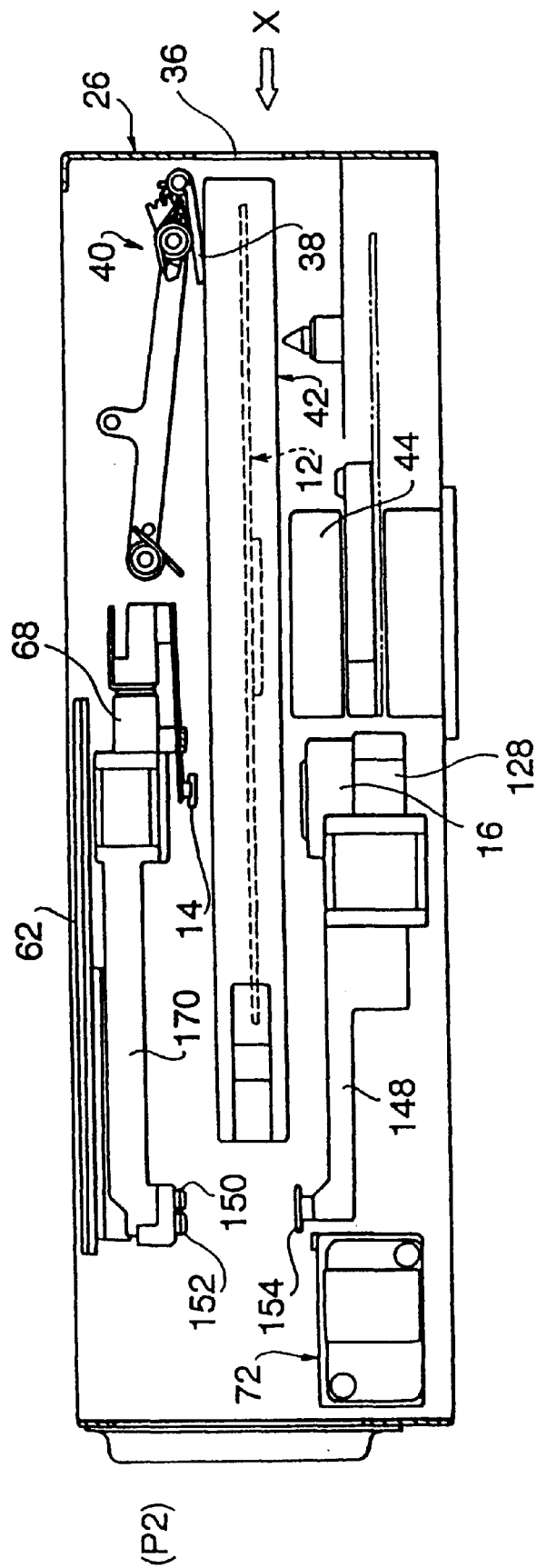
Figure 89:
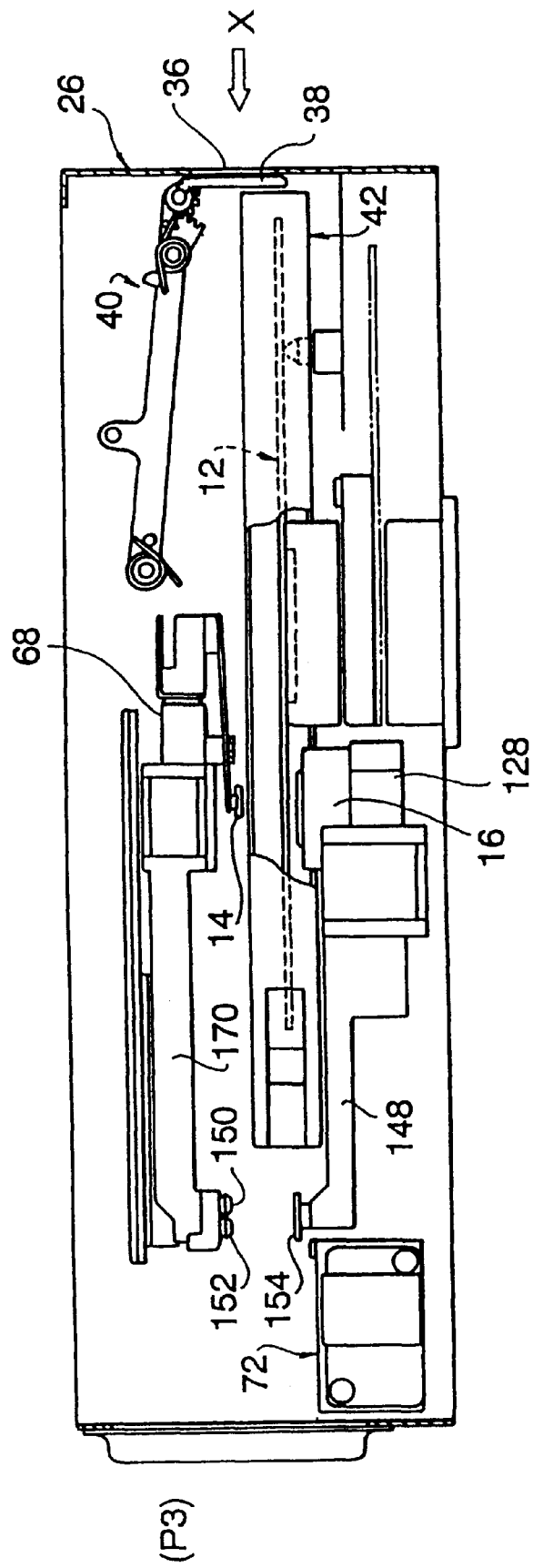
Figure 90:
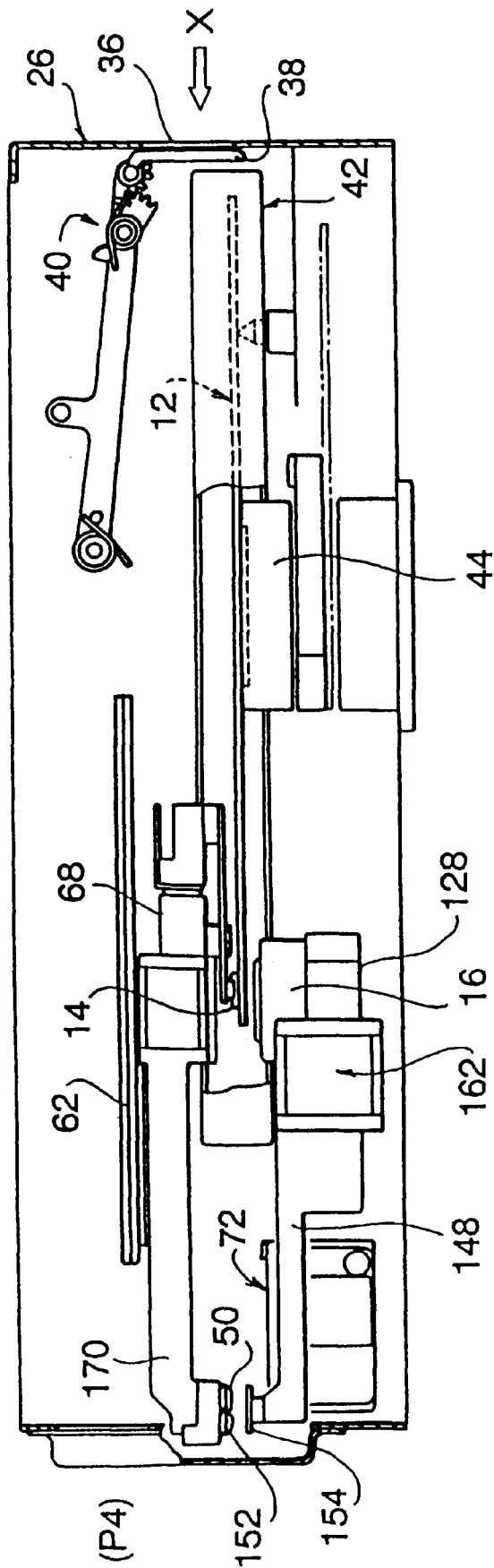
Figure 91:
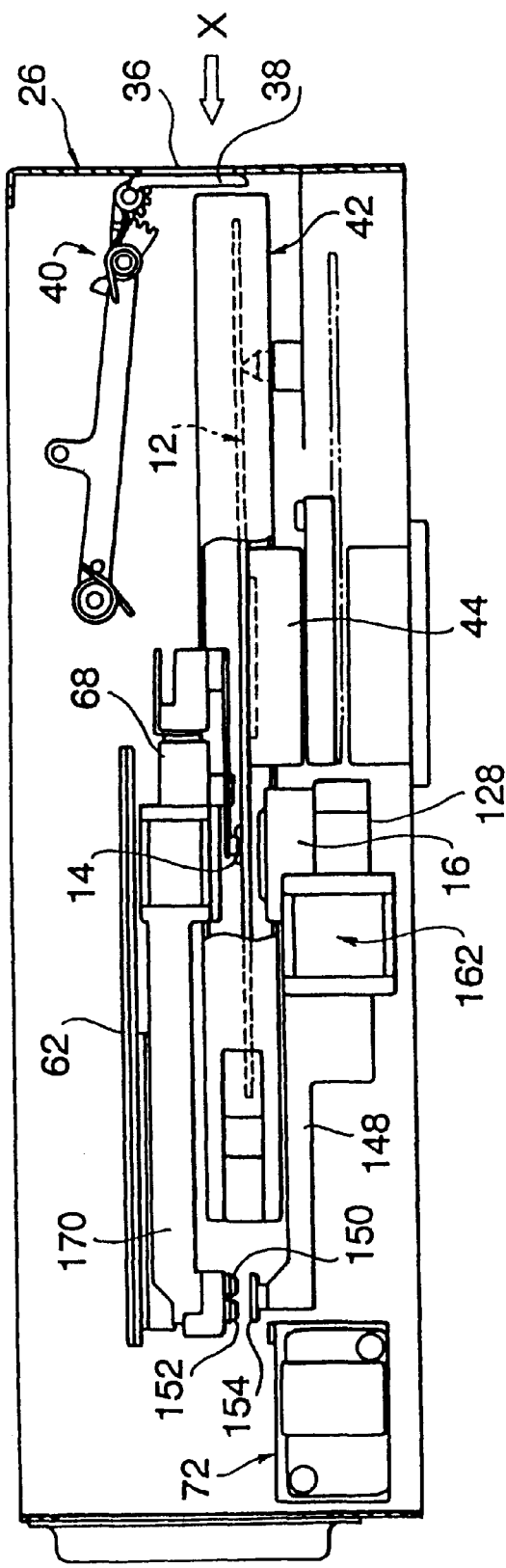
Figure 92:
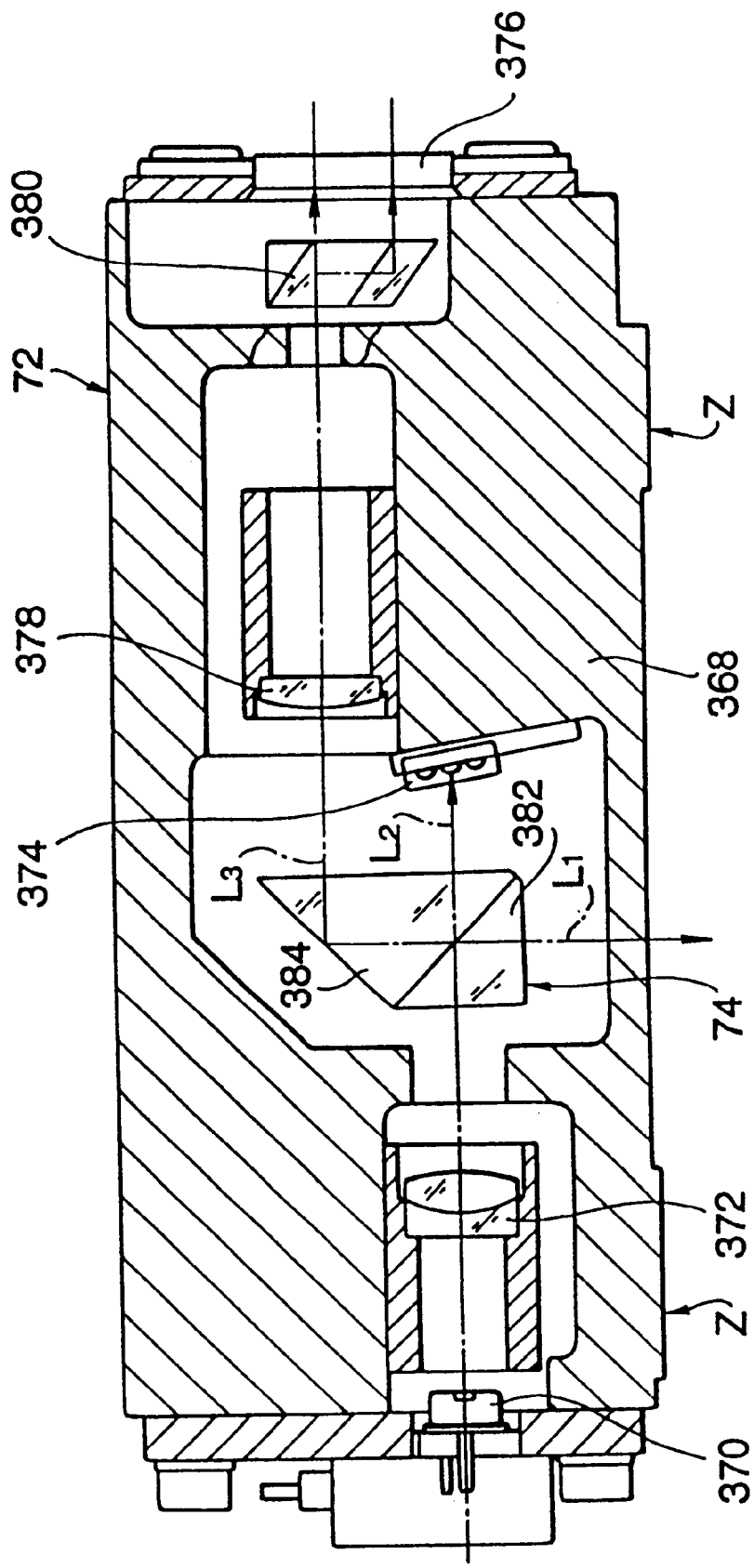

FIGS. 7(a) and 7(b) illustrate an exploded perspective view of the MO disk drive;

FIG. 8 is a perspective view of a mounting base according to the invention;

FIG. 9 is a cross-sectional front view of the MO disk drive;

FIG. 10 is a cross-sectional side view of the MO disk drive;

FIG. 11 is a cross-sectional front view of the MO disk drive, showing the relative locations of circuit boards and support members;

FIG. 12 is a schematic side view of a cartridge holder according to the invention;

FIG. 13 is a partial plan view of the cartridge holder and a cartridge draw-in mechanism according to the invention;

FIG. 14 is a bottom perspective view of a magnetic head base and magnetic head assembly according to the invention;

FIG. 15 is a side view of an external side of a right control cam plate according to the invention;

FIG. 16 is a side view of an external side of a left control cam plate according to the invention;

FIG. 17 is a side view of an internal side of the right control cam plate;

FIG. 18 is a side view of an internal side of the left control cam plate;

FIG. 19 is a schematic of control cam groove profiles, showing the magnetic head base, cartridge holder, and shutter control cam groove profiles of the control cam plates;

FIG. 20 is a top perspective view of a loading chassis according to the present invention;

FIG. 21 is a left side view of an MO disk drive main frame, showing a front panel mounting structure;

FIG. 22 is a plan view of an MO disk drive main frame, showing the front panel mounting structure;

FIG. 23 is a left side cross-sectional view of an MO disk drive main frame, showing the front panel mounting structure;

FIG. 24 is a left side view of an MO disk drive main frame, showing an assembly procedure for a front panel mounting structure;

FIG. 25 is a left side view of an MO disk drive main frame, showing a second front panel mounting structure;

FIG. 26 is a detailed cross-sectional view of the second front panel mounting structure, showing an assembly procedure;

FIG. 27 is a detailed cross-sectional view of the assembled second front panel mounting structure;

FIG. 28 is a plan view of a drive system of an embodiment of a cartridge loading system according to the invention;

FIG. 29 is a plan view of the drive system of FIG. 28, showing a first layer of parts removed;

FIG. 30 is a plan view of the drive system of FIG. 28, showing first and second layers of parts removed;

FIG. 31 is a plan view of the drive system of FIG. 28, showing first, second, and third layers of parts removed;

FIG. 32 is a cross-sectional front view of the drive system of FIG. 28;

FIG. 33 is a cross-sectional side view of the drive system of FIG. 28;

FIG. 34 is a partial side view of a control cam plate slidably mounted in the loading chassis;

FIG. 35 is a bottom perspective view of a cartridge draw-in mechanism of the drive system of FIG. 28;

FIG. 36 is a plan view of the cartridge loading system, showing a cartridge insertion position P1;

FIG. 37 is a plan view of the cartridge loading system, showing a cartridge drawn-in position P2;

FIG. 38 is a plan view of the cartridge loading system, showing a cartridge loaded position P3;

FIG. 39 is a plan view of the cartridge loading system, showing a magnetic head application position P4;

FIG. 40 is a plan view of the cartridge loading system, showing a fail-safe return position P5;

FIG. 41 is a left side view of the cartridge loading system, showing the cartridge insertion position P1;

FIG. 42 is a right side view of the cartridge loading system, showing the cartridge insertion position P1;

FIG. 43 is a left side view of the cartridge loading system, showing the cartridge drawn-in position P2;

FIG. 44 is a right side view of the cartridge loading system, showing the cartridge drawn-in position P2;

FIG. 45 is a left side view of the cartridge loading system, showing the cartridge loaded position P3;

FIG. 46 is a right side view of the cartridge loading system, showing the cartridge loaded position P3;

FIG. 47 is a left side view of the cartridge loading system, showing the magnetic head application position P4;

FIG. 48 is a right side view of the cartridge loading system, showing the magnetic head application position P4;

FIG. 49 is a left side view of the cartridge loading system, showing the fail-safe return position P5;

FIG. 50 is a right side view of the cartridge loading system, showing the fail-safe return position P5;

FIG. 51 is a cams-sectional front view of the cartridge loading system, showing the cartridge holder at cartridge insertion and drawn-in positions P1 and P2;

FIG. 52 is a cross-sectional front view of the cartridge loading system, showing the cartridge holder at the cartridge loaded and magnetic head application positions P3 and P4;

FIG. 53 is a cross-sectional front view of the cartridge loading system, showing the magnetic head base at cartridge insertion and drawn-in positions P1 and P2;

FIG. 54 is a cross-sectional front view of the cartridge loading system, showing the cartridge holder at the cartridge loaded position P3;

FIG. 55 is a cross-sectional front view of the cartridge loading system, showing the cartridge holder at the magnetic head application position P4;

FIG. 56 is a plan view of an embodiment of an encoder cam gear according to the invention;

FIG. 57 is a cartridge loading timing diagram according to the invention;

FIG. 58 is a magnetic head application timing diagram according to the invention;

FIG. 59 is a magnetic head removal timing diagram according to the invention;

FIG. 60 is a cartridge unloading timing diagram;

FIG. 61 is a timing diagram showing an actuation of an electromagnetic fail-safe mechanism according to the invention;

FIG. 62 is a drive mechanism return tiling diagram according to the invention, following the actuation of FIG. 61;

FIG. 63 is a magnetic head re-application timing diagram according to the invention, following the return of FIG. 62;

FIG. 64(a) shows an embodiment of a timing control system according to the invention in the cartridge insertion position P1;

FIG. 64(b) shows the embodiment of a timing control system in the cartridge drawn-in position P2;

FIG. 64(c) shows the embodiment of a timing control system in the cartridge loaded position P3;

FIG. 64(d) shows the embodiment of a timing control system in the magnetic head application position P4;

FIG. 64(e) shows the embodiment of a timing control system in the magnetic head application position P4 a, following the "cocking" of the electromagnetic fail-safe mechanism;

FIG. 65 shows the embodiment of a timing control system in the fail-safe return position P5;

FIG. 66 is a left side perspective view of an embodiment of a shutter operating mechanism according to the invention;

FIG. 67 is a right side perspective view of the embodiment of a shutter operating mechanism;

FIG. 68 is a side schematic view of the embodiment of a shutter operating mechanism;

FIG. 69 is a side schematic view of the embodiment of a shutter operating mechanism;

FIG. 70 is a side schematic view of the embodiment of a shutter operating mechanism;

FIG. 71 is a side schematic view of the embodiment of a shutter operating mechanism;

FIG. 72 is a side schematic view of the embodiment of a shutter operating mechanism;

FIG. 73 is a side schematic view of the embodiment of a shutter operating mechanism;

FIG. 74 is a side schematic view of the embodiment of a shutter operating mechanism;

FIG. 75 is a side schematic view of the embodiment of a shutter operating mechanism;

FIG. 76 is a front cross-sectional view of an embodiment of a vertical positioning system according to the invention;

FIG. 77 is a bottom plan view of an embodiment of a horizontal positioning system according to the invention;

FIGS. 78(a) and 78(b) are detailed views of the embodiment of a horizontal positioning mechanism, showing dynamic positions;

FIG. 79 is a cross-sectional side view of the embodiment of a horizontal positioning mechanism;

FIG. 80 is a side schematic view of an embodiment of a magnetic head carriage locking mechanism according to the invention, showing a first position;

FIG. 81 is a side schematic view of the embodiment of a magnetic head carriage locking mechanism, showing a second position;

FIG. 82 is a detailed plan view of the embodiment of a magnetic head carriage locking mechanism;

FIG. 83 is a detailed side view of the embodiment of a magnetic head carriage locking mechanism;

FIG. 84 is a flow chart describing an embodiment of a head synchronization control process according to the invention, showing a main routine;

FIG. 85 is a flow chart describing the embodiment of a head synchronization control process, showing a first part of a magnetic head application and head synchronization routine;

FIG. 86 is a flow chart describing the embodiment of a head synchronization control process, showing a second part of a magnetic head application and head synchronization routine;

FIG. 87 is a flow chart describing the embodiment of a head synchronization control process, showing a magnetic head removal routine;

FIG. 88 is a side schematic of the MO disk drive, describing the embodiment of a head synchronization control process;

FIG. 89 is a side schematic of the MO disk drive, describing the embodiment of a head synchronization control process;

FIG. 90 is a side schematic of the MO disk drive, describing the embodiment of a head synchronization control process;

FIG. 91 is a side schematic of the MO disk drive, describing the embodiment of a head synchronization control process;

FIG. 92 shows an optical housing, including a beam splitter arrangement; and

Figure 93:
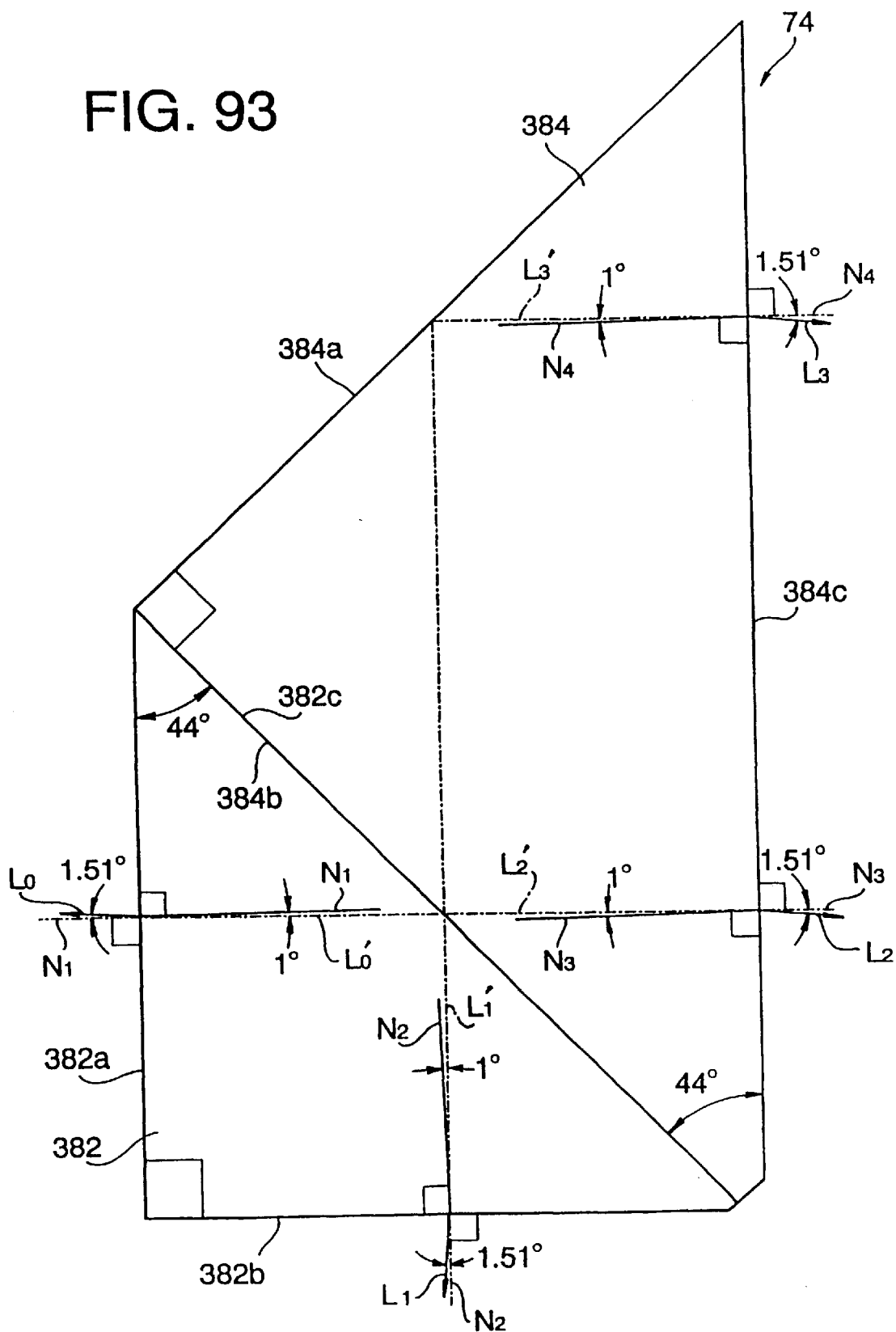

FIG. 93 is a detailed view of the beam splitter arrangement.

DESCRIPTION OF THE EMBODIMENTS

The subsystems and other portions of the MO disk drive are described following a description of the general structure and components of an MO disk drive 10 according to the invention. In order of description, the subsystems and other portions are:

(a) a first mounting structure 20 to attach a front panel 22 to a main frame 19 of an MO disk drive 10;

(b) a second mounting structure 20 to attach a front panel 22 to a main chassis 18 of an MO disk drive 10;

(c) an embodiment of an automatic cartridge loading system 52 to move a disk cartridge 42 from an insertion position to an operating position in an MO disk drive 10, according to the invention;

(d) an embodiment of a timing control system 60 to control the cartridge loading system 52 of an MO disk drive 10, according to the invention;

(e) a first embodiment of a shutter operating mechanism 40 for a cartridge slot shutter 38 of an MO disk drive 10, according to the invention;

(f) an embodiment of a magnetic head vertical positioning system 64 of an MO disk drive 10, according to the invention;

(g) an embodiment of a magnetic head horizontal positioning system 66 of an MO disk drive 10, according to the invention;

(h) an embodiment of a magnetic head carriage lock mechanism 70 of an MO disk drive 10, according to the invention;

(i) an embodiment of a control system for synchronizing the movements of a magnetic head 14 and an optical head 16 of an MO disk drive 10, according to the invention; and (j) a beam splitter arrangement 74 for an MO disk drive 10.

General Description

Figure 1:
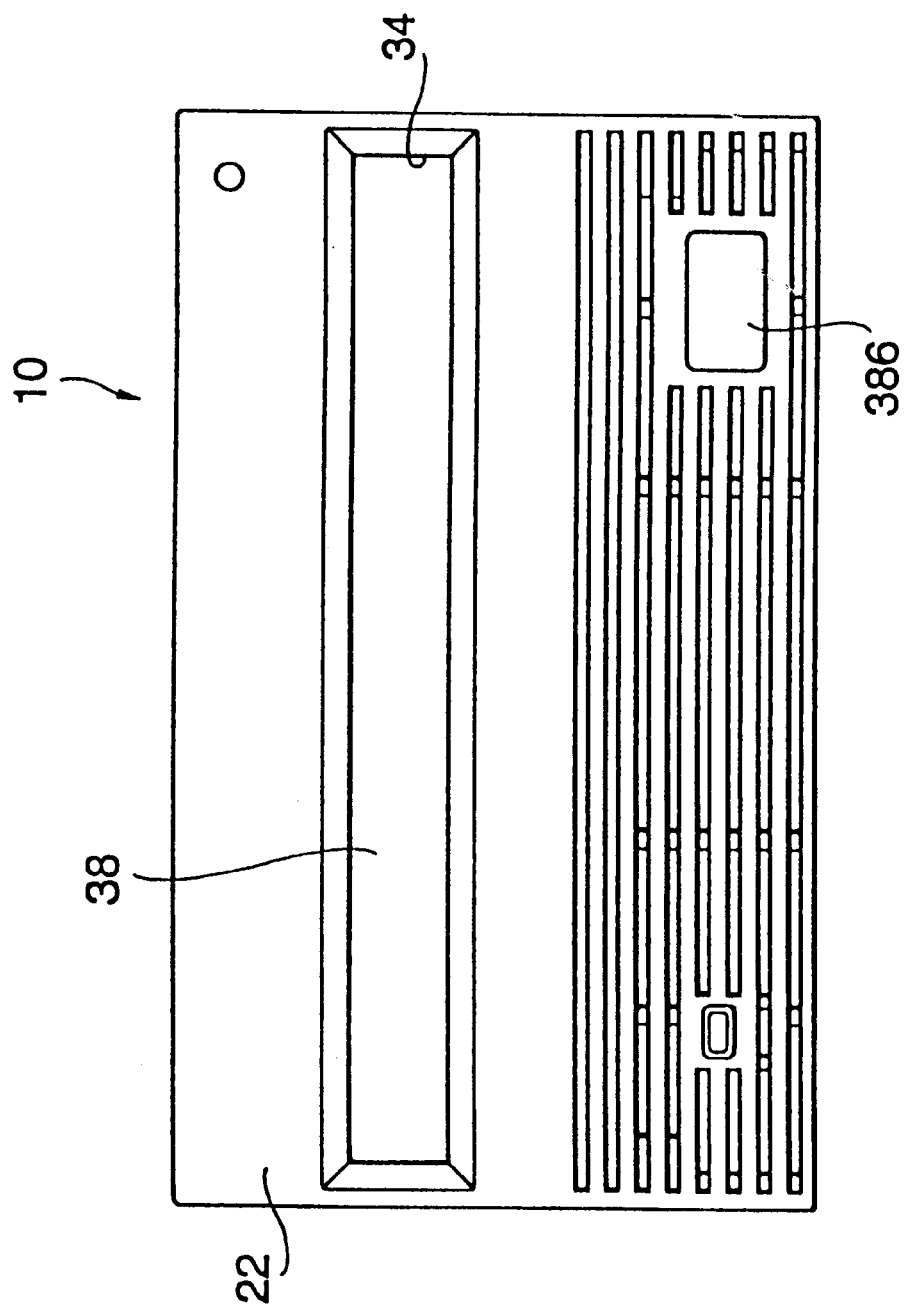
FIG. 1 is a front view of an assembled MO disk drive according to the invention.

FIGS. 1 to 20 show the basic structure of a magneto-optical disk drive 10 to which the embodiments of the present invention are applied. The disk drive 10 is shown in front, side, rear, and plan views in FIGS. 1, 2, 3 and 4, respectively. An exploded view of the disk drive 10 appears in FIGS. 7(a) and 7(b). The left and right sides of the MO disk drive 10, and of its component parts, are hereinafter defined as the left and right sides as seen from the viewpoint of FIG. 1. The MO drive accepts a conventional magneto-optical disk cartridge 42 (disk cartridge 42), shown in FIGS. 5 and 6.

Figure 5:
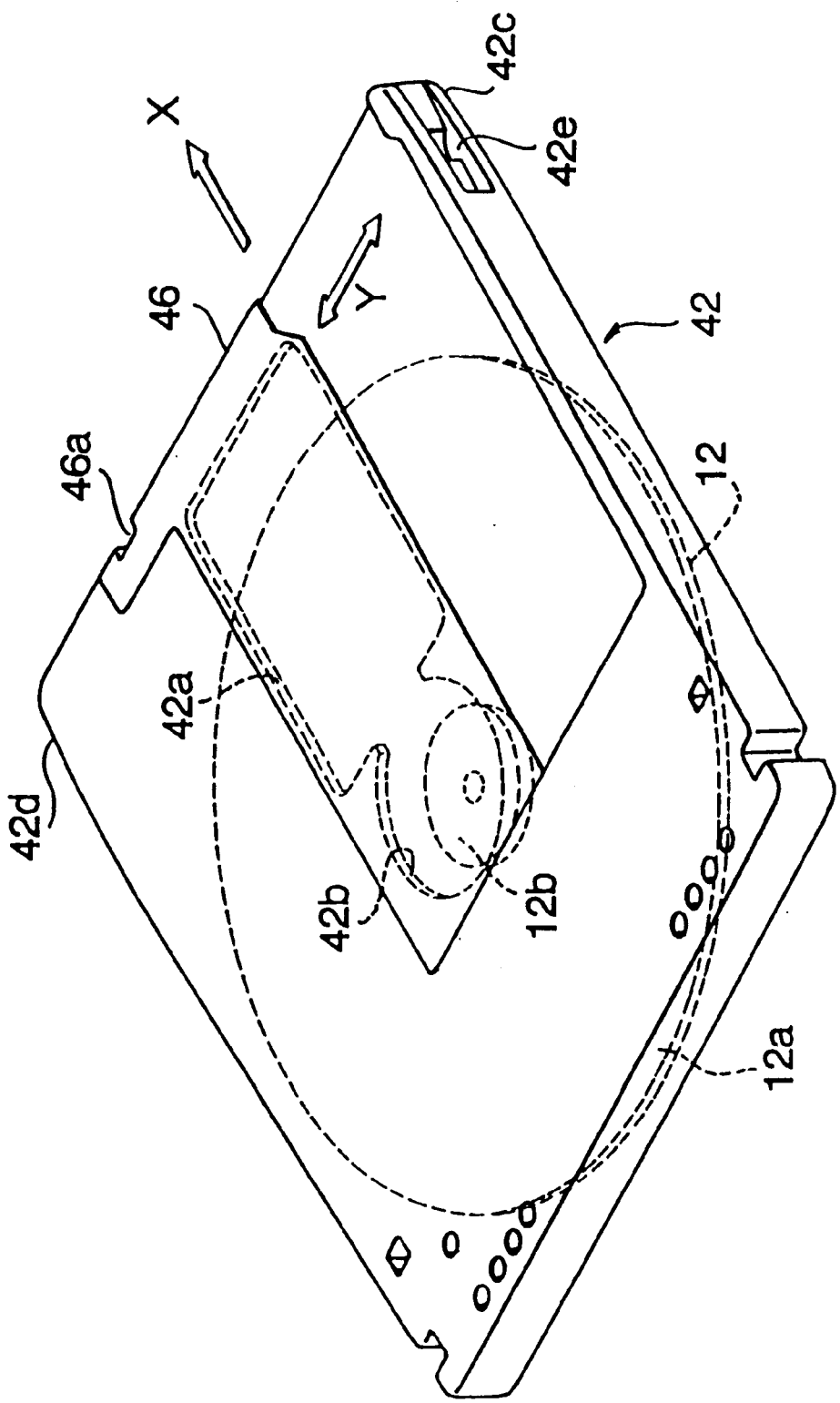
FIG. 5 is a top perspective view of an MO disk cartridge according to the invention.
Figure 6:
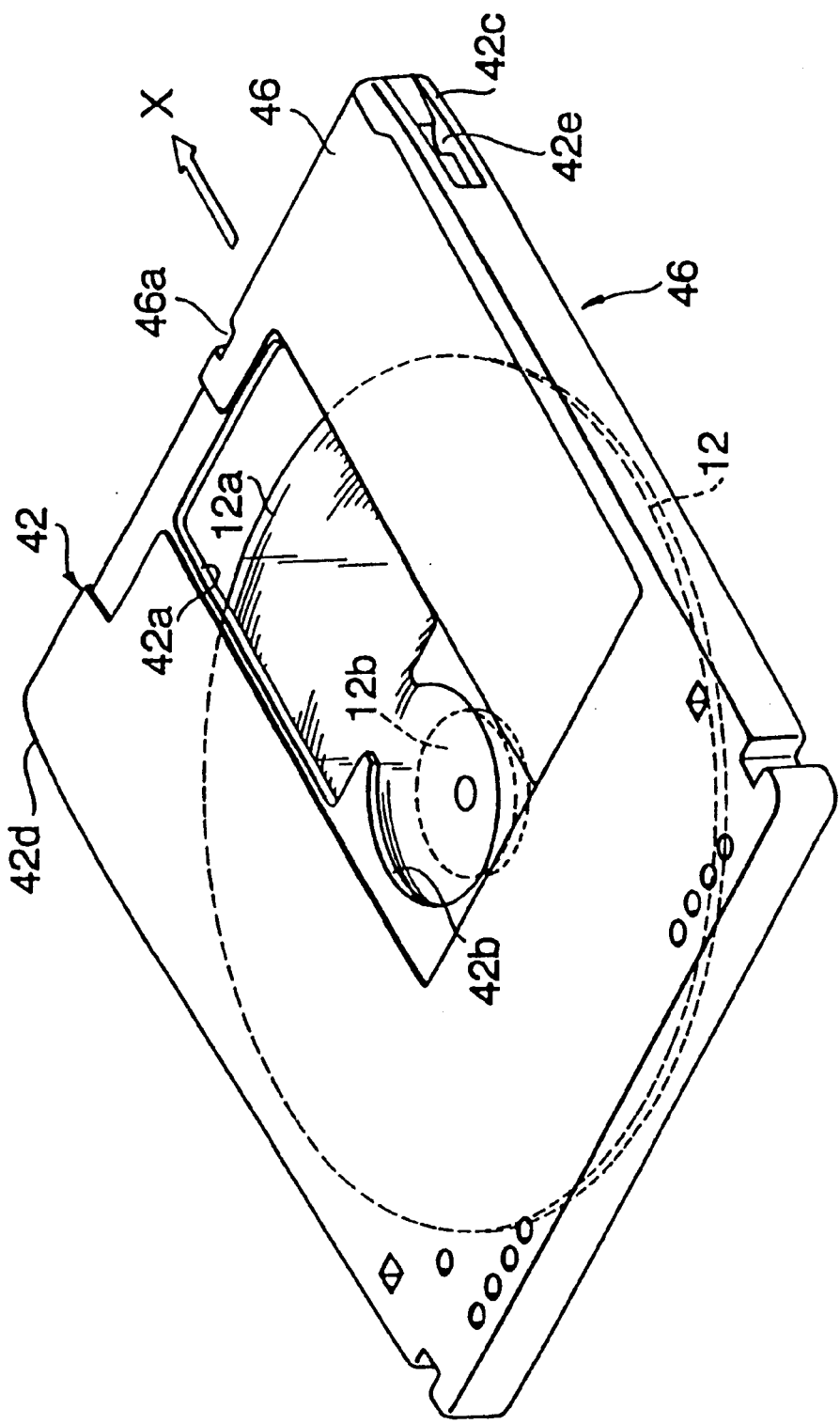
FIG. 6 is a bottom perspective view of the MO disk cartridge 42.

As shown in FIG. 5, the disk cartridge 42 houses a freely rotatable conventional magneto-optical disk 12, which includes a platter 12a and a hub 12b. The disk 12 may be read-only (both surfaces readable) or read-write (only one surface readable/writable). The disk cartridge 42 includes access openings 42a, 42a on top and bottom sides, which expose the hub 12b and a substantially rectangular area of the platter 12a. The openings 42a are covered by a cartridge shutter 46, which is slidable by means of a detent notch 46a to expose the access openings 42a on both sides of the cartridge 42, as shown in FIG. 6. Loading notches 42e are formed on both lateral sides of the cartridge 42 at the rear end, and notch entry slopes 42c lead into the loading notches 42e.

The disk platter 12a carries identification information, including the type of disk (single or double sided) and data transfer standard information. Information regarding the type of disk carried is conventionally written in MFZ (Manufacturer's Formatting Zone) control tracks at the periphery of the disk platter 12a. Data transfer standard information, which identifies the disk 12 as a 4000 rpm ISO (International Standards Organization) standard disk or a 3000 rpm ECMA (European Computer Manufacturers Association) standard disk is encoded on the innermost region of the platter 12a on a PEP (Phase Encoded Part) control track.

Figure 2:
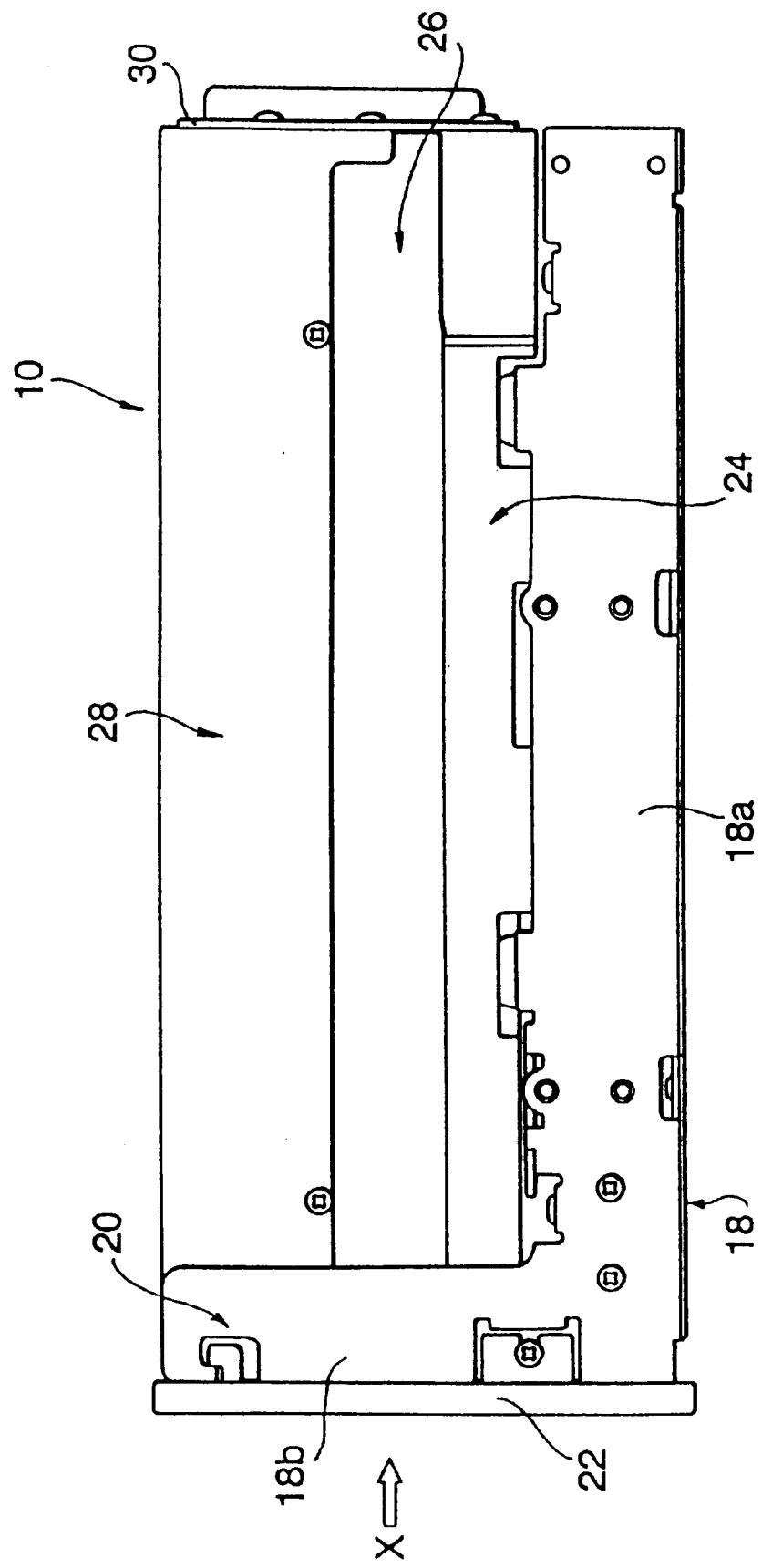
FIG. 2 is a left side view of the assembled MO disk drive.
Figure 3:
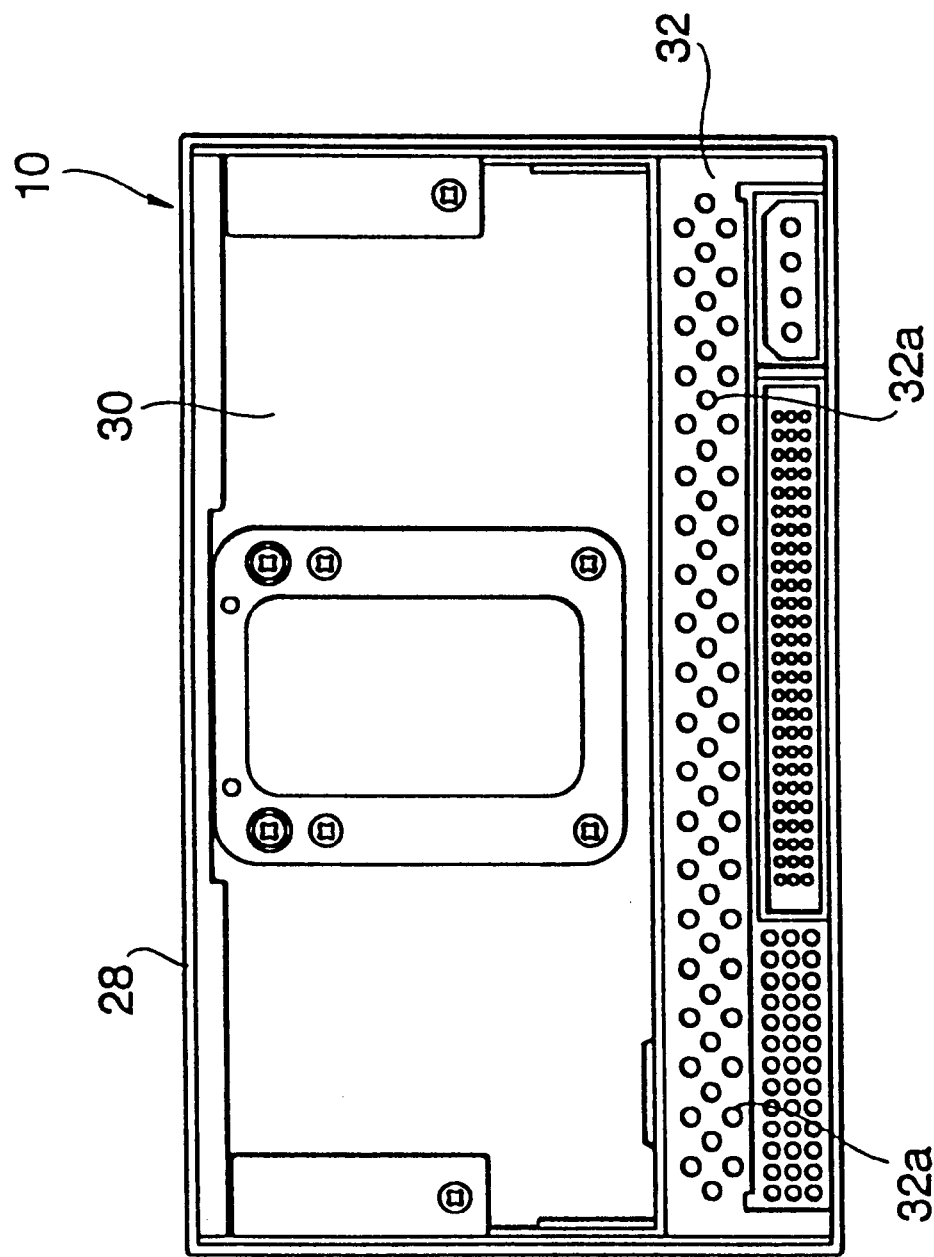
FIG. 3 is a rear view of the assembled MO disk drive.
Figure 4:
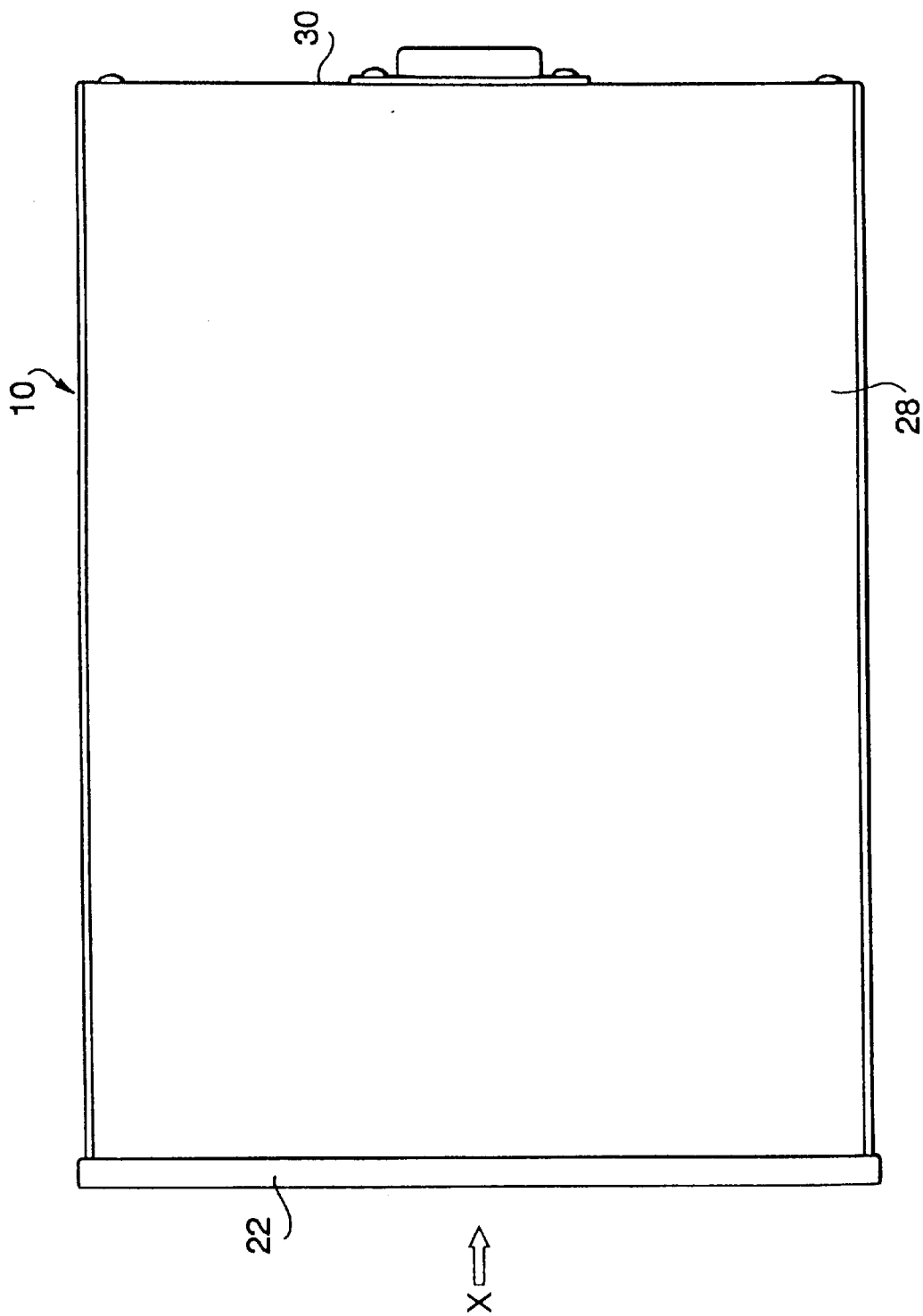
FIG. 4 is a plan view of the assembled MO disk drive.

The housing of the MO disk drive 10 according to the invention, shown in FIG. 2, includes a main frame 18, a mounting base 24, a loading chassis 26, and a top cover 28. The housing further includes a rear cover 30, which serves as an upper rear housing portion, and a control chamber cover 32, which serves as a lower rear housing portion.

The main frame 18 includes left and right L-shaped side panels, each side panel having a base portion 18a and a vertical portion 18b, and the two side panels are connected to each other by a connecting plate 90 (shown in FIG. 22). The front panel 22 includes a slot 34 through which a disk cartridge 42 may be inserted, and is attached to the left and right vertical portions 18b by means of a mounting structure (described later). The mounting base 24 is supported by and fixed to the top edges of the base portions 18a on both sides.

The loading chassis 26 is attached above the mounting base 24, and the top cover 28 covers the top of the loading chassis 26. A cartridge insertion slot 36 in the front of the loading chassis corresponds to the slot 34 in the front panel. A movable shutter 38 (described later) covers the slots 34 and 36 when closed. The rear cover 30 serves to cover a rear opening between the mounting base 24 and the loading chassis 26. Finally, the housing is fully closed by the control chamber cover 32 (see FIG. 3), which covers a lower rear opening between the base portions 18a of the main frame 18. The control chamber is ventilated by perforations 32a in the control chamber cover 32, and closed at the bottom by a plate (not shown). Control circuit boards 124a and 124b (shown in FIGS. 10 and 11) which include control circuits for linear motors for a magnetic head 14 and an optical head 16 are stacked in the control chamber under the mounting base 24.

The mounting base 24, top cover 28, rear cover 30, and shutter 38 define a loading space that is protected from dust, dirt and debris, except when the cartridge 42 is being inserted or ejected. The cartridge shutter 46 is closed during ejection or insertion, and protects the disk 12 during these operations. Thus, the disk 12 is always protected from dirt and dust.

A gear chassis 118 is fixed to the top of the loading chassis 26 towards the front end of the drive 10, in the position shown in FIG. 10. The gear chassis 118 is supported by the loading chassis 26 at fastening tabs 26g and 188 (the fastening tabs are shown in FIG. 20). The gear chassis 118 supports a motor 56, which ultimately drives the cartridge loading system 52 through a reduction gear train 236. The gears of the gear train 236 are rotatably supported by the gear chassis 118. The motor 56 is controlled by a servo circuit board 120 that is fixed to the top of the gear chassis 118, and is shielded by a heat guard plate 122 attached to the top cover 28. The circuit board 120 includes a synchronous servo control circuit, which drives the motor 56 according to sensor inputs, to control vertical movement of both a disk cartridge holder 100 and a magnetic head mounting base 62.

As shown in FIGS. 8 and 9, the mounting base 24 supports an optical head carriage 128 by means of a linear bearing 126. The optical head 16 is supported on the optical head carriage 128, and is therefore linearly movable in the radial direction of a loaded disk 12 by means of the bearing 126. The optical head carriage 128 further includes a carriage arm 148 that extends in the radial direction of a loaded disk 12, away from the center of the loaded disk 12. A reflector plate 154 is mounted at the remote end of the carriage arm 128.

A pair of yokes 132, adjacent to and parallel to the linear bearing 126, are supported by the mounting base 24 on the left and right sides of the optical head carriage 128. A pair of coils 130, corresponding to the yokes 132, are attached to the movable optical head carriage 128 and surround the yokes 132. Together, the coils 130 and yokes 132 constitute a linear motor 134. The optical head carriage 16 is moved back and forth in the disk 12 radial direction by means of the linear motor 134.

The optical head 16, which includes an objective lens 146 (shown in FIG. 8), converges a laser flux transmitted from a laser unit 72 onto the recording surface of a loaded disk 12. In a reading mode, a relatively weak laser flux is applied to the disk 12, and a signal detector 376 (describe later) receives the reflected light. The reflected light is interpreted by the signal detector 376 by utilizing the well-known Kerr effect. In a writing mode, as the disk 12 rotates, a stronger laser flux is applied to one side of the disk 12, raising the temperature of a recording substrate above its Curie point, while the magnetic head 14 impresses a polarization on the disk 12 from the other side of the disk 12, altering the optical properties of the disk 12 at the writing point.

Cartridge Holder 100

The cartridge holder 100 is shown in detail in FIGS. 12 and 13. The holder 100 is movably supported in the loading chassis 26 as shown in FIGS. 7(a) and 7(b). A cartridge 42 inserted into the MO drive 100 through the slots 34 and 36 is held and vertically transported by the holder 100. The cartridge holder 100 includes a holder top plate 100a, and left and right holder side panels 100b and 100c (left and right as seen from direction X in FIG. 13). The left and right side panels 100b and 100c are both bent at the bottom and extend below the cartridge holder to support the bottom of the cartridge 42 when it is inserted and as it is transported. The top plate 42 includes an access hole 100a to allow the magnetic head base 62 access to the top of the cartridge.

Front stays 108a and 108b are provided to the left and right sides respectively, of the front of the top panel 100a of the holder 100. Rear stays 115a and 115b are similarly provided to the two sides of the rear of the top panel 100a. The stays 108a, 108b, 115a, and 115b are proximate to the left and right edges of the cartridge holder 100, and support outwardly extending cam follower pins 106a, 106b, 107a, and 107b, respectively.

A cartridge shutter opening mechanism 48 is provided to the rear of the holder 100. The mechanism includes left and right opening arms 50a and 50b, each swingably mounted at a rotating axis 110 below the holder top panel 100a. The axes 110 are supported by the holder top panel 110a and positioned near the side edges of the rear portion of the cartridge holder 100. The arms 50a and 50b swing in a horizontal plane. Both arms 50a and 50b have a guiding protrusion which fits into arcuate grooves 112 formed in the upper plate 100a. The arcuate grooves 112 are centered on the rotating axes 110 of arms 50a and 50b, and the swinging movement of each arm 50a, 50b is guided and limited by the corresponding arcuate groove 112. Torsion springs 114, mounted on axes 110, provide a torsion bias to arms 50a, 50b, biasing the arms 50a, 50b towards the front of the holder 100. Right arm 50b is mounted to swing below left arm 50a, such that the arms 50a and 50b do not interfere with each other. Each arm 50a, 50b has an engaging know at its distal end. When a cartridge 42 is inserted, one of the arms 50a or 50b (depending on whether the top or the bottom side of a loaded cartridge is loaded) always engages the detent notch 46a on the cartridge shutter 46 of a loaded cartridge 42. As the cartridge 42 is pushed into the holder 100, the arms 50a and 50b swing as they are pushed back (as shown in FIGS. 36 and 37), and the swinging action of the engaged arm 50a or 50b opens the cartridge shutter 42 by means of the detent notch 46a engagement with the arm 50a or 50b.

Magnetic Head Base 62

The magnetic head base 62 is shown in a perspective view in FIG. 14. The magnetic head 14 is supported by a tapering cantilevered plate spring 172, fixed at one end to the magnetic head carriage 68 by a fixing screw 174. The plate spring 172 biases the magnetic head 14 towards the disk 12, but is stopped by a stopper plate 176. The magnetic head 14 is of the "flying head" type, resiliently held by the plate spring 172 to allow the head 12 to be supported by a film of air generated by a spinning disk 12.

The magnetic head carriage 68 is supported on the underside of a magnetic head base 62 by means of a linear bearing 156. The magnetic head carriage 68 is freely movable in the radial direction of a loaded disk 12 by means of the bearing 156. A pair of yokes 160, adjacent and parallel to the linear bearing 156, is supported by the magnetic head base 62 on the left and right sides of the magnetic head carriage 68. A pair of coils 158, corresponding to the yokes 160, is attached to the movable magnetic head carriage 68 and surround the yokes 160. Together, the coils 158 and yokes 160 constitute a linear motor 162 (shown in FIG. 14 and in cross-section in FIG. 9), and the magnetic head carriage 68 is moved back and forth in the radial direction of the disk 12 by means of the linear motor 162. The magnetic head carriage 68 further includes a carriage arm 170 that extends in the radial direction of a loaded disk 12, away from the center of the loaded disk 12, and a pair of photocouplers 150 and 152 that are mounted in order along the length of the carriage arm 170, at the bottom of the rear end of the carriage aim 170. An L-shaped stopper hook 354 (see FIGS. 80 and 81) is provided to the tip of the rear end of the carriage arm 170, and functions in association with the magnetic head carriage locking mechanism 70.

Each of the photocouplers 150 and 152 includes a light emitting device and a light receiving device. The photocouplers emit light towards and receive light from the reflector plate 154 mounted on the optical head carriage 128. The output signals from the light receiving devices of the photocouplers are used as synchronous movement detecting signals. The optical head 16 and the magnetic head 14 are arranged such that when the two heads 16, 14 become aligned, the reflector plate 154 is midway between the photocouplers 150 and 152. Thus, the tracking alignment of the two heads 16, 14 with each other in the radial direction of the disk 12 is achieved by actively adjusting the positional relationship between the two head carriages 68, 128 until each photocoupler 150, 152 detects the same amount of reflected light. The photocouplers 150, 152 and reflector plate 154 function in association with the control system for synchronizing the heads 14, 16.

The magnetic head base 62 is bent downwards at right angles at both right and left sides, and positioning recesses 62a are formed on each bend at the front of the magnetic head base 62. The positioning recesses 62a function in association with the vertical positioning system 64. Front cam pins 178a, 178b project outwardly from the left and right front sides of the magnetic head base 62, and rear cam pins 179a, 179b project outwardly from the left and right rear sides of the base 62. The cam pins 178a, 178b, 179a and 179b function in association with the automatic cartridge loading system 52. Tapered position determining pins 334a and 334b are provided towards the left and right sides respectively, of the rear of the magnetic head base 62. The position determining pins 334a and 334b function in association with the horizontal positioning system 66.

Cam Plates 102 and 104

The control cam plates 102 and 104 are shown in detail in FIGS. 15 to 19. The control cam plates 102 and 104 are each unitarily molded from plastic. FIG. 15 shows the internal (towards the inside of the drive) side of the left control cam plate 102, and FIG. 16 shows the external side of the left control cam plate 102. The left control cam plate 102 includes, in order from direction X in FIG. 16, a shutter blade movement cam groove 101a, a cartridge holder movement front cam groove 103a, a magnetic head base movement front cam groove 109a, a cartridge holder movement rear cam groove 105a, a cam plate guide groove 192, a magnetic head movement rear cam groove 111a, and a pre-load cam groove 113.

FIG. 17 shows the internal side of the right control cam plate 104, and FIG. 18 shows the external side of the right control cam plate 104. The right control cam plate 104 includes, in order from direction X in FIG. 17, a shutter blade movement cam groove 101b, a cartridge holder movement front cam groove 103b, a magnetic head base movement front cam groove 109b, a cartridge holder movement rear cam groove 105b, a cam plate guide groove 194, and a magnetic head base movement rear cam groove 111b.

The cam plate guide grooves 192 an 194, on control cam plates 102 and 104 respectively, extend in the loading direction X. Notches 102a and 104a, formed in the frontal portion of the respective control cam plates 102 and 104, serve as engaging points for the control cam plates 102 and 104 to be moved back and forth by the automatic cartridge loading mechanism 52.

The magnetic head base cam grooves 109a, 109b, 111a, and 111b further include resilient pressure members 200a, 200b, 201a, and 201b respectively, as shown in FIGS. 15 through 18. The resilient pressure members 200a, 200b, 201a, and 201b are unitarily formed and cantilevered from the plastic bodies of control cam plates 102 and 104, and are parallel to the lowest positions of their respective cam grooves. As shown in FIGS. 15 and 16, the resilient pressure members 200a and 200c are biased upward by a wire spring 204, and the resilient pressure members 200b and 200a are biased downward by a wire spring 202. The resilient pressure members function in association with the vertical positioning system 64.

The lower half of each of the magnetic head base cam grooves 109a, 111a and 109b, 111b penetrate through the respective cam plate 102 and 104, as shown in FIGS. 16 and 18. The remaining cam grooves open only towards the inside of the cam plates 102 or 104.

Cam groove profiles, formed in cam plates 102 and 104, and the movements of various parts of the drive 10, are shown in FIG. 19. Cartridge holder movement cam grooves 103a, 103b, 105a, and 105b, share a cam groove profile A defining the vertical movements of the cartridge holder 100. Magnetic head base movement cam grooves 109a, 109b, 111a, and 111b share a cam groove profile B defining the vertical movements of the magnetic head base 62.

The cam profile A, defining the vertical movement of the cartridge holder 100, has two horizontal surfaces, A1 and A3, each of which defines a vertical lever or position of the cartridge holder 100. The surface A1 defines a cartridge insertion position A1 (vertical level). At the cartridge insertion position A1, a cartridge 42 may be inserted, and will be drawn into the cartridge holder 100. The cartridge insertion position A1 of the cartridge holder 10 is also the position in which a cartridge 42 is ejected and may be removed from the drive 10. The surface A3 defines a cartridge loaded position A3 (vertical level). At the cartridge loaded position A3, a cartridge 42 has been moved to a position to be ready for reading or writing. Between A1 and A3, an inclined surface A2 defines a guided movement and a rate of movement from cartridge insertion position A1 to cartridge loaded position A3.

The cam profile B, defining the vertical movement of the magnetic head base 62, has three horizontal surfaces, B1, B3, and B5, each of which defines a position (vertical level) of the magnetic head base 62. The surface B1 defines an "idle" position B1. At the idle position B1 of the magnetic head base 62, the magnetic head base 62 is held at its highest position so that the cartridge holder 100 may be kept in the cartridge insertion position to accept or eject a cartridge 42. The idle position B1 of the magnetic base 62 is largely simultaneous with the cartridge insertion position A1 of the cartridge holder 10 along their respective cam profiles B and A. At the magnetic head base "standby" position B3, the magnetic head base is at a position ready to move into writing position, yet safely away from a loaded disk 12. The surface B5 defines a magnetic head base writing position B5. At the magnetic head base writing position B5, a loaded disk 12 is spinning and the magnetic head 14 is "flying" on the air cushion, ready for writing. Between B1 and B3, an inclined surface B2 defines a guided movement and a rate of movement from magnetic head base idle position B1 to magnetic head base standby position B3. Between B3 and B5 an inclined surface B4 defines a guided movement and a rate of movement from magnetic head base standby position B3 to magnetic head base writing position B5.

The cam profile C, defining the opening and closing movements of the shutter blade 38, has three horizontal surfaces, C1, C3, and C5, each of which defines a position (from open to closed) of a mechanism 40 controlling the shutter blade 38. Surface C1 and C3 both define closed positions C1, C3 of the shutter blade 38, and surface C2 corresponds to a fully open position of the shutter blade 38. Surfaces C2 and C4 define a guided movement and rate of movement of the shutter operating mechanism 40, between closed position C1 and open position C3, and between open position C3 and closed position C5.

Loading Chassis 26

The loading chassis is shown in perspective detail in FIG. 20. The loading chassis 26 is unitarily formed, including a front portion 26c, and a pair of side portions 26a and 26b extending back in the loading direction from the left and right sides respectively, of the front portion 26c. A plurality of supports 190 for attaching the loading chassis 26 to the mounting base 24 are bent in from the lower inside front regions of the side portions 26a and 26b. Recessed plate guide channels 27a and 27b extend along the length of the left and right sides respectively, and are formed towards the upper part of each side by bending a U-channel towards the interior of the drive 10. A plurality of supports 188 for attaching the gear chassis 118 are bent in from the inside upper front region of the channels 27a and 27b. A control cam plate is provided to each plate guide groove; cam plate 102 is slidable in the left guide groove 27a, and cam plate 104 is slidable in the right guide groove 27b. Guide pins 196 and 198, provided to the plate guide channels 27a and 27b, fit into the corresponding cam plate guide grooves 192 and 194 as shown in FIG. 34, thus ensuring that the movement of the cam plates 102 and 104 is restricted to movement back and forth in the X direction.

Magnetic head base guide slots 180a, 180b, 181a, and 181b are formed through the plate guide channels 27a and 27b on both side and at front and back, corresponding to the cam pins 178a, 178b, 179a, and 179b of the magnetic head base 62. The guide slots 180a, 180b, 181a, and 181b are vertical through slots, and when the cam pins 178a, 178b, 179a, and 179b are inserted in the corresponding guide slot, the magnetic head base 62 is constrained to move only vertically within the drive 10.

The cam follower pins 178a, 178b, and 179a, 179b of the magnetic head base 62 penetrate into the plate guide channels 27a and 27b, via the magnetic head base guide slots 180a, 180b, and 181a, 181b, to mate with cam grooves 109a, 109b, and 111a, 111b in the left and right control cam plates 102 and 104, respectively. Cam follower pin 178a penetrates into plate guide channel 27a through slot 180a to mate with cam groove 109a; pin 178b penetrates into channel 27b via slot 180b to mate with 109b; 179a penetrates into 27a through 181a to mate with 111a; and 179b penetrates into 27b through 181b to mates with 111b. The guide slots 180a, 180b, and 181a, 181b serve to guide the magnetic head base 62 to move vertically in response to sliding movement of the control cam plates 102 and 104 in the plate guide grooves 27a and 27b.

The movements of the cartridge holder 100 are also controlled by the control cam plates 102 and 104. The cartridge holder cam follower pins 106a, 106b, 107a, and 107b are constrained by cartridge holder guide slots 182a, 182b, 183a, and 183b, respectively, to move only vertically. The cam follower pins 106a, 107b, 107a, and 107b penetrate into the plate guiding channels 27a and 27b via the guide slots, where they mate with respective cartridge holder cam grooves 103a, 103b, 105a, and 105b. The guide slots 182a, 182b, 183a, and 183b serve to guide the cartridge holder 100 to move vertically in response to sliding movements of the control cam plates 102 and 104 in the plate guide grooves 27a and 27b.

The guide slots and plate guide grooves function in association with the automatic cartridge loading system 52. The cartridge holder 100 and magnetic head base 62 are shown in various positions in side and front views in FIGS. 41 through 55. The loading chassis 26 further includes reference surface tabs 26f and 26g for precisely positioning the magnetic head base 62, which function in association with the vertical positioning system 64.

(a) and (b) Front Panel Mounting Structures 20 and 20'

A front panel mounting structure 20 is shown in FIGS. 21 through 24, and includes mating parts on the front panel 22 and main frame 18. The front panel mounting structures 20 and 20' use mounting hooks 76 on the inside face of the front panel 22 to securely fasten the front panel 22 to the main frame 18 without any visible fastenings on the front panel 22.

As shown in FIG. 21, mounting hooks 76 are provided at the top of the back of the front panel 22 on both the left and right sides. The mounting hooks 76 are L-shaped plates, fixed at a tip of a support leg of the hook 76, the remaining leg projecting upwards and having a height H1 as shown in FIG. 23. The left and right mounting hooks 76 each mate to a hooked groove 84 provided to each of the left and right vertical portions 18b of the main frame side panels. Entrances to the hooked grooves 84 are made to be slightly larger (height H2 ) than the height of the upwardly projecting leg 76a of the mounting hooks 76. Each hooked groove 84 has a vertical recess 84a.

A mounting tab 78 having a U-slot 82 is formed on each of the left and right bottom sides of the back of the front panel 22. The mounting tabs 78 mate to frame tabs 86 of the main frame 18, each frame tab 86 having a screw hole 88. The frame tabs 86 are recessed towards the main frame interior by an amount corresponding to the thickness of the mounting tabs 78, allowing the amounting tabs 78 to slide outside the frame tabs 86 when the front panel 22 is attached. The U-slots 82 of the mounting tabs 78 are fixed to the frame tab screw holes 88 by screws 80.

The front panel 22 is attached to the main frame 18 by inserting the mounting hooks 76 into the hooked grooves 82, as shown in FIG. 24. The front panel is then slid up so that the upwardly projecting legs 76a of the mounting hooks 76 fit into the vertical recesses 84a of the hooked grooves 84. The U-slots 82 of the mounting tabs 78 are then aligned with the frame table screw holes 88, and the front panel 22 is fixed in position with the screws 80.

The front panel mounting structure allows the front panel to be quickly, securely and accurately mounted using only two screws 80, 80, and further does not have any panel mounting fixtures visible from the front of the drive 10.

FIGS. 25 to 27 show a second mounting structure 20' for a front panel 22 of an MO drive 10. The second structure is different in that pins 96 are provided to the mounting tabs 78, and the pins snap into corresponding holes 98 provided to the left and right vertical side panels 18b of the main frame 18. There are no frame tabs as in the first embodiment, and the side panels are not recessed in the region where the pins 96 and holes 98 mate; instead, the holes 98 are provided in the undeformed side panels 18b. As shown in FIG. 26, the mounting tabs 78 are designed to flex inwardly to allow the front panel 22 to be pressed into position.

The attachment procedure for the second front panel mounting structure 20' is similar to the procedure for the first structure. However, in the second structure, after the upwardly projecting legs 76a are properly positioned, mounting hooks are properly positioned in the vertical recesses 84a, the front panel 22 is pressed forward, the mounting tabs 78 flex inwardly as shown in FIG. 26, and the pins 96 snap into place in the holes 98 as shown in FIG. 27.

The front panel mounting structure allows the front panel to be quickly, securely and accurately mounted using no screws, and further does not have any panel mounting fixtures visible from the front of the drive 10.

(c) Cartridge Loading System 52

An embodiment of a cartridge loading system 52 according to the present invention appears in FIGS. 28 through 55. The cartridge loading system 52, controlled by the timing control system 60, automatically draws the cartridge 42 into the cartridge holder 100, and moves the cartridge holder 100 and cartridge 42 into the cartridge loaded position.

FIGS. 28 through 31 show plan views of a driving mechanism 116, with various components removed to show different levels of functional components as the views proceed downward in level from FIG. 28 to FIG. 31. As shown in FIG. 28, the cartridge loading system 52 includes a pair of control cam plates 102 and 104, a cartridge draw-in mechanism 232 (shown in FIGS. 13 and 35), and a driving mechanism 116. The cartridge loading system functions in association with an electromagnetic fail-safe mechanism 288, visible in FIGS. 28 through 30. The driving mechanism 116 engages with and drives both the cartridge draw-in mechanism 232 and the control cam plates 102 and 104.

Driving Mechanism 116

The driving mechanism 116 is shown in plan views in FIGS. 28 through 31 and in side views in FIGS. 32 and 33. The driving mechanism 116 includes a driving motor 56 mounted to the bottom plate of the gear chassis 118, an encoder cam gear 234, and a reduction gear train 236. The reduction gear train 236 transfers the motive power of the motor 56 to the encoder cam gear 234. The encoder cam gear 234 also functions in association with the timing control mechanism 60. The driving mechanism 116 drives both the cartridge draw-in mechanism and a control cam plate driving mechanism. The control cam plate driving mechanism drives the control cam plates 102 and 104 from the encoder cam gear 234, which is driven from the motor 56 by the gear train 236.

The driving motor 56 is mounted towards the front central area of the bottom plate of the gear chassis 118, with the drive axis oriented horizontally and transverse to the cartridge loading direction, in the direction Y as shown in FIG. 31. A worm gear 56a is fixed to the drive axis of the motor 56. Three reduction gears 238, 240 and 242 are rotatably mounted in a gear train 236, and engaged to the worm gear 56a and the encoder cam gear 234.

Control Cam Plate Driving Mechanism

The encoder cam gear 234 is coupled to a sector gear 310a of a gear lever 310 (shown in FIGS. 28 and 29), through a driving pinion 234a formed on the encoder cam gear 234. The gear lever 310 is rotatably mounted at its approximate center at an axis 282, which is approximately equidistant from the control cam plates 102 and 104. An axis pin 314 is mounted at the end of the gear lever 310 opposite the sector gear 310, and projects upward. A swingable catch arm 312 is rotatably mounted on the axis pin 314. The catch arm 312 is biased in a clockwise (as seen in FIG. 28, from a viewpoint looking downwards from the top of the drive 10) direction by a torsion spring 316 mounted on the axis pin 314. The catch arm 312 is substantially L-shaped, with the axis pin 314 at the elbow of the L shape. The shorter arm of the L shape includes an upright projection 312c. The projection 312c is positioned to contact a cocking axis pin 302 (shown in FIGS. 28 through 31) at a frontal position of the swinging range of the gear arm 310. The longer arm of the L shape of the catch arm 312 includes a hook catch 312a at the distal end of the longer arm, and a concave catch 312b approximately halfway along the longer arm. As the L-shaped catch arm 312 is biased in a clockwise direction by the torsion spring 316, the concave catch 312b is thereby urged to engage a driving pin 298 attached to a link arm 284.

The link arm 284 (shown in FIG. 31) is rotatably mounted to the axis pin 282, which is the same axis pin to which the gear lever 310 is rotatably mounted. However, the link arm 284 is mounted to the axis pin 282 on the bottom of the gear chassis bottom plate 118d, whereas the gear lever 310 is mounted to the axis pin 282 on the top of the gear chassis bottom plate 118c. The link arm 284 extends across the gear chassis 118 from the control cam plate 102 to the control cam plate 104, and includes engaging pins 292a and 292b at the two ends of the link arm 284. The engaging pins 292a and 292b engage the control cam plates 102 and 104 respectively, at engaging slots 102a and 104a. The driving pin 298 projects upwardly from the link arm 284 through the bottom plate 118c via a guide groove 294. The guide groove 294 is arcuate, and is centered about the axis pin 282.

As described, the gear lever 310 is coupled via the sector gear 310a and driving pinion 234a to the driven encoder cam gear 234 at one end, and has a clockwise-biased rotatable catch arm 312 at the remaining end. The catch arm 312 (specifically, the concave catch 312b) on the gear lever 310 can engage the driving pin 298 of the link arm 284, which is engaged to the control cam plates 102 and 104 at both ends of the link arm 284. Thus, the driving force of the motor 56 is transmitted to the control cam plates 102 and 104, driving the plates 102 and 104 in opposite directions relative to each other.

Electromagnetic Fail-safe Mechanism 288

If the power supply to the disk apparatus 10 is interrupted for any reason, a spindle motor 44 which drives the disk 12 stops, and the disk stops rotating. When operating, the "flying" magnetic head 14 is held away from the disk by only air pressure generated by the spinning disk 12. The stopping of the disk 12 therefore creates the risk of a "head crash", or contact of the magnetic head 14 with the disk 12 surface. This contact may result in damage to the disk 12 surface. To prevent damage to the disk 12, the described embodiment of the invention incorporates an electromagnetic fail-safe mechanism 288 to return the cartridge holder 100 to a standby position away from the magnetic head 14. The electromagnetic fail-safe mechanism 288, visible in FIGS. 28 to 30 and FIGS. 36 to 40, includes a locking arm 300, an armature contact 300a, a return arm 304, a return spring 318 and an electromagnet 290. The locking arm 300 is positioned along the outer circumferential edge of the guide groove 294 of the bottom plate 188d, and is rotatably mounted to the bottom plate 188d at the trigger axis pin 302, which is proximate to the front end of the guide groove 294. The electromagnet 290 is mounted to the bottom plate 118d at a position along the swinging range of the locking arm 300. The locking arm further includes a ferromagnetic armature contact 300a, which is rotatably mounted to the distal end of the locking arm 300, such that the armature contact 300a can self-align and abut the electromagnet 290. A portion of the inside edge of the locking arm 300 is arcuate, following the same arc as the guide groove 294, and contacts the driving pin 298 for a portion of the swinging travel of the driving pin 298. The locking arm 300 is biased to rotate in a counterclockwise direction by a torsion spring 308 provided to the cocking axis pin 302, and further includes a recessed concave stopper 300b proximate to the axis pin 302. When the driving pin moves forward along the guide groove 294, the driving pin 298 approaches the front end of the guide groove 294 and approaches the recessed concave stopper 300b. At this point, the lock arm 300 can swing in a counterclockwise direction, and the concave stopper 300b can engage the driving pin 298, at which time the armature contact 300a swings to abut the electromagnet 290.

The fail-safe mechanism 288 further includes the return arm 304. The return arm 304 shares the axis pin 282 with the gear lever 310 and the link arm 284. The return arm 304 is rotatably mounted to the axis pin 282 on top of the bottom plate 188d, but below the gear lever 310. A return tension spring 318 is stretched between an end of the return arm 304 and a tab on the bottom plate 118d, so that the return arm 304 is biased to rotate in a counterclockwise direction. A guide pin 320 is mounted on the bottom face of the return arm 304, and projects downwardly through the bottom plate 118d via a return arm guide groove 296 in the bottom plate 118d. The guide pin 320 is positioned on the return arm 304 so that the link arm 284 contacts and pushes the guide pin 320 when the link aim 284 has completed approximately one half of its range of travel as the link arm 284 swings. When the link arm 284 continues in a clockwise swinging direction after completing half of its range of travel, the return aim 304 swings clockwise in unison with the link arm 284 by virtue of the contact between the contact pin 320 and the link arm 284, against the bias of the return tension spring 318. Thus, for approximately the second half of the traveling range of the link arm 284 in the loading direction (clockwise swinging), the link arm 284 is biased to return to the middle point of its traveling range by the return tension spring 318.

The catch arm 312 is arranged to release the driving pin 298 when the driving pin 298 is moved to the front end of the guide groove 294 and the upright projection 312c abuts the cocking axis pin 302. Just before the driving pin 298 reaches the point along the groove 294 where the catch arm 312 releases the driving pin 298, the ferromagnetic contact armature 300 of the locking arm 300, biased to rotate counterclockwise by the torsion spring 308, contacts the energized electromagnet 290. The contact armature 300, and thereby the locking arm 300, is magnetically held, and the concave stopper 300b accepts the driving pin 298. The point where the catch arm 312 releases the driving pin 298 to be held by the concave stopper 300a corresponds to the magnetic head application position P4. At this point and thereafter, the driving pin 298 is held by the concave stopper 300b of the locking arm 300.

When power is removed from the electromagnet 290 for any reason, the electromagnet 290 is de-energized, having no power supply, and the link arm 284 is released by the locking arm 300. The link arm 284 rotates counterclockwise in unison with the return arm 304, both under the bias of the return spring 318. The link arm 284 and return arm 304 rotate counterclockwise until the guide pin 320 attached to the return arm 304 abuts the rear side of the return arm guide groove 296. When the link arm 284 becomes stationary, the driving pin 298 of the link arm 284 is held and stopped by the hook catch 312a at the distal end of the catch arm 312. The positions of the locking arm 300, return arm 304, link arm 284, and catch arm 312 in energized and released states of the electromagnetic fail-safe mechanism may be seen in FIGS. 64(d) and 64(e).

Cartridge Draw-in Mechanism 232

A mechanism to automatically draw a disk cartridge 42 into the cartridge holder 100 is also linked to the encoder cam gear 234. The cartridge draw-in mechanism 232 is shown in detail in FIGS. 13, 29 and 35. The cartridge draw-in mechanism 232 includes a hook lever 274, a slide plate 268, and a draw-in link member 266. The draw-in mechanism 232 is driven by means of a cam groove 278 formed in the bottom of the encoder cam gear 234. The cam groove 278 guides the draw-in link member by a cam follower pin 270 attached to the draw-in link member 266.

As shown in FIGS. 29 and 35, the draw-in link member 266 is rotatably mounted by means of an axis pin 252 to the top of the bottom plate 118d of the gear chassis 118. The draw-in member 266 is T-shaped, mounted by the axis pin 252 at one side of the top of the T shape. The base of the T shape of the member 266 is movable under the encoder cam gear 234. The cam follower pin 276 protrudes up from the base of the T-shape of the member 266 and engages the cam groove 278 formed in the bottom face of the encoder cam gear 234. The cam groove 278 leads the draw-in member 266 to rotate in a clockwise direction as the encoder cam gear rotates in a counter-clockwise direction. A forked guide groove 266a is formed on the remaining side of the top of the T shape of the draw-in member 266.

The forked guide groove 266a engages a driving pin 270 attached to the slide plate 268, driving the slide plate 268. The slide plate 268 is shown in FIGS. 13 and 35. The slide plate 268 is mounted to the cartridge holder 100 by means of guide pins (not shown) on the slide plate 268 and straight grooves (not shown) in the cartridge holder 100, such that the slide plate 268 may only move in as straight line, back and forth in the X direction (shown in FIG. 13). The driving pin 270 projects upward from the slide plate 268, and is of sufficient length that it may always engage the forked guide groove 266a of the draw-in link member 266 as the cartridge holder 100 moves vertically relative to the gear chassis 118. An axis pin 272 and a stopper tab 268b (not shown) are further provided to the slide plate 268, and extend downward into the cartridge holder 100 via two separate through grooves at a rear portion 268a as shown in FIG. 13.

The L-shaped hook lever 274 is rotatably mounted to the slide plate 268 by means of the axis pin 272 at the elbow of the L shape. The axis pin 272 extends downward into the cartridge holder 100 via a through groove (not shown). The hook lever 274 is positioned inside the cartridge holder 100. A first arm 274a of the hook lever 274 is substantially parallel on its internal surface with the rear of an inserted cartridge 42. The second aim 274b of the hook lever 274 extends in the unloading direction (opposite to X direction), and includes a rounded hood projecting inwards toward an inserted cartridge 42. The cartridge hood lever 274 is rotatable between (a) a draw-in position, where the fist arm 274a contacts a cartridge 42 and rotates the hook lever 274 so that the rounded hook of the second arm 274b engages a loading notch 42e of the cartridge 42, and (b) a release position, where the second arm 274 disengages from the loading notch 42e. In the draw-in position, the rotating hook lever 274 abuts the stopper tab 268b of the slide plate 268 when a cartridge 42 is pushed against the first arm 274a, so that the rounded hook of the second arm 274b is in a predetermined position as it engages the loading notch 42e. Furthermore, the tip of the second aim 274b is tapered so that it self-aligns when a cartridge 42 is inserted into the cartridge holder 100. A through opening 100g is formed in the side of the cartridge holder 100 to allow some play in this self-alignment. Thus, as the cam groove 278 guides the draw-in link member 266 clockwise, the linked slide plate 268 moves the hook lever 274 back from the insertion position as shown in FIG. 28, and the hook lever 274 draws the cartridge 42 into the cartridge holder 100 by means of the loading notch 42e.

The encoder cam gear 234 is coupled with the motor 56 through the gear train 236, and only turns when the motor 56 turns. Similarly, the slide plate 268 is connected without play to the draw-in link member 266 by means of the follower pin 270. However, in order to satisfy the operational timing of the system 52, the encoder cam gear 234 must elastically engage the draw-in link member 266. Thus, the cam groove 278 formed on the lower face of the encoder cam gear 234 has a clearance (visible in FIG. 56) to allow play in the engagement between the follower pin 276 of the draw-in link member 266 and the cam groove 278. A torsion spring 330 (shown in FIG. 28) is provided to the encoder cam gear 234 to bias the pin 276 to contact the wall of the cam groove 278 and to bias the slide plate 268 forward. The torsion spring 330 surrounds a cylindrical boss 234c formed unitarily and concentrically to the top of the encoder cam gear 234. The torsion spring 330 is fixed tot he encoder cam gear 234 at one end, the remaining end extending to ta recess 234d formed in the encoder cam gear 234 and contacting the follower pin 276 when the cartridge loading system 52 is in the cartridge insertion position.

The movement of the cam follower pin 276 and the draw-in link member 266 during a cartridge draw-in operation does not affect the stationary encoder cam gear 234 due to the play in the cam groove 278.

FIGS. 36 through 55 describe the motion of the cartridge loading system 52, but are also descriptive of the timing control mechanism 60. The dynamic motion of the cartridge loading system 52 is therefore described following a description of the timing control system 60.

Thus, when a disk cartridge 42 is manually inserted and pushed, activating the timing control system 60, the cartridge 42 is automatically drawn into the cartridge holder 100. The operator is not required to insert a disk cartridge 42 all the way into the disk drive 10, such that cartridge loading operation is very easy. The cartridge 42 is unloaded in an analogous reverse operation, and when a cartridge 42 is ejected, the operator may easily access the cartridge 42. In the loading operation, the disc cartridge 42 is securely held at the loading notches 42e by the hook lever 274, making the loading operation stable. Similarly, the hook lever 274 holds the disk cartridge 42 until the cartridge insertion position P1 when ejecting a cartridge 42. The cartridge ejection process is therefore much more stable than a conventional spring-loaded ejection system.

(d) Timing Control System 60

An embodiment of timing control system 60 according to the invention appears in detail in FIGS. 56 through 65. The timing control system 60 uses a unitary encoder cam gear 234 and photo-interruptor sensors 326 and 328 to control the loading of a cartridge 42 and the application of the magnetic head 14 to ta disk. FIG. 56 shows the encoder cam gear 234 in detail; FIGS. 57 through 63 show timing diagrams describing the embodiment; and FIGS. 64(a) to 64(e) and 65 show timed positions of the timing control system 60 and associated mechanisms. The timing control system 60 includes the encoder cam gear 234, loading sensors 326 and 328, a draw-in sensor 260, and an interrupter lever 250.

The encoder cam gear 234, shown in FIG. 56 includes unitarily formed portions including: driving pinion 234a, driven gear 234b, boss 234c, recess 234d, first encoder rib 322, first encoder rib gap 322a, second encoder rib 324, and cam groove 278. The driven gear 234b is driven by the motor 56 via the gear train 236, the driving pinion 234a drives the sector gear 310, and the cam groove 278 guides the follower pin 276 of the draw-in link member 266, as previously described.

The first and second encoder ribs 322 and 324 project upwards from the top of the encoder cam gear 234, and are arcuate forms having a common center at the axis pin 256 of the encoder cam gear 234. The first encoder rib 322 is formed towards the outer circumference of the encoder cam gear 234, and the second encoder rib 324 is formed towards the inner circumference of the gear 234. The first encoder rib 322 has a gap 322a at a predetermined position.

The first encoder rib 322 and the second encoder rib 324 of the encoder cam gear 234 are detected by respective (photo interrupter) loading sensors 326 and 328. The photo interrupters of the loading sensors 326 and 328, and of the draw-in sensor 260 described herein, each include a light-emitting device and a light-receiving device facing each other with an intermediate gap, and turn from normally ON to OFF when the gap is interrupted, and ON again when the interruption is removed. The first and second loading sensors 326 and 328 are directly mounted on a synchro-servo circuit (not shown) on the lower face of the synchro-servo base board 120, shown in FIG. 33. The positions of the loading sensors 326 and 328 (shown in FIGS. 64(a) to 64(e) and 65) are predetermined to detect the rotational position of the encoder cam gear 234 as the encoder ribs 322 and 324 interrupt the loading sensors 326 and 328.

The first encoder rib 322 is arranged to turn OFF the first loading sensor 326 at the cartridge draw-in position P1, and then to turn OFF the first loading sensor 326 until the magnetic head 14 is brought to the magnetic head application position P4. The gap 322a in the first encoder rib 322 is arranged to briefly turn ON the first loading sensor 326, turning OFF an electromagnet 290 according to the timing of the removal of the magnetic head base 62 from the magnetic head application position P4. The second encoder rib 324 is positioned to turn OFF the second loading sensor 328 at the cartridge loaded position P3.

The axis pin 252, which supports the draw-in link member 266, also rotatably supports the interrupter lever 250 (visible in FIG. 30). The interrupter lever 250 is substantially T-shaped, and is rotatably supported at one side of the top of the T shape. The interrupter lever 250 is biased by a torsion spring 258 provided to the axis pin 252 to rotate counterclockwise, and resiliently contacts the draw-in link member 266 on the rear side of the draw-in link member 266. The base of the T shape of the interrupter lever 250 extends below the bottom plate 118d of the gear chassis 118, and a follower pin 262 protrudes upward from the base of the T shape of the interrupter lever 250. The follower pin 262 engages a guide groove 254 formed in the bottom plate 118d of the gear chassis 118, and the guide groove 254 defines the rotating range of the interrupter lever 250. The follower pin 262 can be pushed by the edge of the link arm 284 at the extreme clockwise position of the link are 284. On the remaining side of the top of the T shape of the interrupter lever 250, a flat and curved interrupter member 250a protrudes upwardly.

The interrupter member 250a is detected by the (photo interrupter) draw-in sensor 260 in order to control the timing of the cartridge draw-in operation. The photo interrupter 260 is directly mounted on the synchro-servo circuit on the lower face of the synchro-servo base board 120 (FIG. 33), and is positioned to detect the insertion of a cartridge 42 when the interrupter member 250a interrupts the photo interruptor 260.

The timing control system 60 of the disk drive 10 according to the embodiment begins to operate when a cartridge 42 is inserted into the cartridge holder 100, and the hook lever 274, the slide plate 268, the draw-in link member 266 and the cam follower pin 276 are pushed to a predetermined position along the X loading direction as shown in FIG. 36. At this point, the draw-in link member 266 pushes the interrupter member 250 to interrupt the draw-in sensor 260, and the timing and control of the automatic loading system 52 is actuated.

Timing

The timing of the automatic cartridge loading system 52 is controlled according to the timing diagrams shown in FIGS. 57 through 63. In FIGS. 57 to 63, PS-A, PS-B, and PS-C represent the photo interrupter signals generated by the loading sensors 326 and 328, and the draw-in sensor 260, respectively. Thus, PS-A represents the detection status of first encoder rib 322 and gap 322a, PS-B represents the detection status of second encoder rib 324, and PS-C represents the status of the interruptor member 250a of the cartridge draw-in mechanism. SOLE shows a control signal fed to the electromagnet 290. LDA and LDB represent control signals fed to the motor 56; LDA low (L) and LDB high (H) is forward (loading) rotation, LDA high and LDB low is reverse rotation, and LDA high and LDB high is stopping.

Timing Control System & Cartridge Loading System: Dynamic

The following description of the dynamic operation of the timing control system 60 is also representative of the cartridge loading system 52.

FIG. 57 shows the loading operational timing of the disc cartridge 42 and cartridge holder 100. In FIG. 57, the control cam plates 102 and 104 are moved from the cartridge insertion position P1, to the cartridge loaded position P3. The loading sensors 326 and 328 and the draw-in sensor 260 are in ON states before a cartridge 42 is inserted and pushed into the cartridge holder 100. As the disk cartridge 42 is manually inserted through the chassis opening 36, the leading edge of the disk cartridge 42 pushes back the hook lever 274 and thereby the slide plate 268, rotating the interruptor member 250 as the draw-in link member is moved by the drive pin 270 attached to the slide plate 268, as shown in FIG. 64(a). The draw-in sensor 260 is turned OFF by the interruptor member 250 as the member 250 rotates. The automatic control system 52 thereby detects that the disk cartridge 42 is pushed to a cartridge insertion position P1.

FIGS. 36, 41, 42, and 51 are plan, left, right and front views respectively, of the status of the cartridge loading system 52 and other mechanisms at the cartridge insertion position P1. FIG. 649(a) is a detailed plan view of the timing control system 60 at position P1. At this stage, the cartridge holder 100 is positioned to accept a cartridge holder 100 is positioned to accept a cartridge, and the magnetic head base 62 is in the topmost idle position.

The structural arrangement of the components fixed to the gear chassis 118 are shown in plan view in FIG. 64(a), just as the cartridge 42 is detected by the draw-in sensor 260. The cartridge holder 100 and magnetic head carriage 62 have not yet moved as the motor 56 is just started. At this point, the first loading sensor 326 is interrupted by the first encoder rib 322 and is turned OFF, but the motor 56 control is not changed and the motor 56 continues.

As the motor 56 rotates the encoder cam gear 234 through the gear train 236, the follower pin 276 projecting from the draw-in link member 266 is thereby turned in a clockwise direction. The forked guide groove 266a of the draw-in link member 266 pushes on the slide plate 268 at the driving pin 270, and the slide plate 268 moves in the X direction as shown in FIG. 56. The disk cartridge 42 is engaged at the loading notch 42e with the hook lever 274, and the cartridge 42 is drawn into the cartridge holder 100.

Simultaneously, the encoder cam gear 310 drives the sector gear 310a attached to the gear arm 310. Thus, the gear arm 310, including the catch arm 312, swings in a clockwise direction. The concave catch 312b of the catch arm 312 holds the driving pin 298 of the link arm 284, which moves with the gear arm 310. The link arm 284, swinging in a clockwise direction, moves the control cam plates 102 and 104 in opposite directions. The control cam plate 102 moves towards the rear of the disk drive 10 and the control cam plate 104 moves towards the front of the disk drive 10. The control cam plates continue from the cartridge insertion position P1 to the cartridge drawn-in position P2.

FIGS. 37, 43, 44 are plan, left, and right views respectively, of the status of the cartridge loading system 52 and other mechanisms at the cartridge drawn-in position P2. The front view of position P2 appears the same as the cartridge insertion position P1 as the cartridge holder 100 and magnetic head base 62 have not started to descend, and is shown in FIG. 51. FIG. 64(b) is a detailed plan view of the timing control system 60 at position P2. After the disk cartridge 42 is entirely drawn into the cartridge holder 100 at position P2, the motor 56 and encoder cam gear 234 continue to rotate. The disk draw-in operation is complete, and the driving pin 276 stops rotating the draw-in link lever as it passes into a portion of the cam groove 278 which maintains the pin 276 in a constant position.

The gear arm 310 and link arm 284 continue to turn clockwise, driven by the encoder cam gear 234, with the link arm 284 driving the control cam plates 102 and 104. As shown in FIG. 19, the control cam profiles guide the cartridge holder 100 to descend at this stage, guiding the cam pins 106a, 106b, 107a, and 107b on the inclined portions A2 (corresponding to portions of cam grooves 103a, 103b, 105a, and 105b on the control cam plates 102 and 104). Similarly, the magnetic head base 62 descends as the cam pins 178a, 178b, 179a, and 179b are guided by the inclined portion B2 (corresponding to portions of cam grooves 109a, 109b, 11a, and 111b on the control cam plates 104 and 104).

The driving motor 56 stops when the second loading sensor 328 is interrupted by the second encoder rib 324 and is turned OFF. At this point, the cartridge holder 100 has descended to the cartridge loaded position P3.

FIGS. 38, 45, 46, and 52 are plan, left, right and front views respectively, of the status of the cartridge loading system 52 and other mechanisms at the loaded position P3. FIG. 64(c) is a detailed plan view of the timing control system 60 at position P3. The cartridge loaded position P3 is just before the magnetic head "standby" position, and the two positions may be considered functionally equivalent. At the cartridge loaded position P3, the spindle motor 44 begins to rotate the disk 12, and the optical head 16 reads the PEP control track information coded on the inner tracks.

FIG. 58 shows a timing chart for the cartridge loading operation from the cartridge loaded position P3 to the magnetic head application position P4 of the magnetic head base 61. The magnetic head 14 is applied when a writing operation is to be carried out. If the control circuit (not shown) transmits an instruction to apply the magnetic head 14, the electromagnet 290 is energized to attract the ferromagnetic armature contact 300a of the locking arm 300. At the same time, the driving motor 56 is restarted in the forward (loading) direction, and the gear arm 310 and link arm 284 proceed further in a clockwise direction, moving the control cam plates 102 and 104 further in opposite directions. The magnetic head base 62 descends, guided by the position of the control cam grooves 102a, 102b, 104a, 104b in the portion labeled B4 in FIG. 19. The magnetic head base 62 passes the standby position, descending towards the magnetic head application position P4. In this interval, the first loading sensor 326 detects a monetary ON (approximately 20 ms) as the gap 322a in the first encoder rib passes through the sensor 326. The monetary ON is ignored by the control circuit. Also in this interval, the draw-in sensor 260 is turned ON as the follower pin 262 is slightly pushed clockwise by the edge of the link arm 284. As the magnetic head base 62 continues to descend, it reaches the horizontal portion B5 at position P4 of the control cam grooves 102c, 102d, 102c, and 104d. FIGS. 39, 47, 48, and 55 show top, left, right and front plan views of the status of the cartridge loading system 52 and other mechanisms in the magnetic head application position P4, with the magnetic head 14 "flying" on the surface of the disk 12 and in position to commence a writing operation. FIG. 64(e) is a detailed plan view of the timing control system 60 at position P4. As the link arm 184 continues in the clockwise direction, the upright projection 312c of the catch arm 312 abuts the cocking axis pin 302, and the catch aim is forced in the counterclockwise direction, releasing the driving pin 298, shown in FIG. 64(e). Simultaneously, the counterclockwise-biased locking arm 300 has swung and electromagnetically locked to the electromagnet 290 as the driving pin 298 enters the concave stopper 300b. Thus, the electromagnetic fail-safe mechanism is "cocked", and the driving pin 298 is held by the concave stopper 300b as long as the electromagnetic 290 is energized. At this point, the first encoder rib 322 passes out of the detection gap of the first loading sensor 326, turning the sensor 326 ON. The motor 56 is stopped at this point, and the magnetic head base 62 is stopped and held in the magnetic head application position P4.

The unloading operation is the reverse of the loading operation, with some significant differences hereafter described. The timing of the unloading operation is shown in FIGS. 59 and 60. The status of the cartridge loading system 52 and timing control system 60 may be followed in reverse order in FIGS. 55 through 36 and 64(e) through 64(a), respectively.

When the control circuit determines that the magnetic head 14 is to be removed, the control cam plates 102 and 104 must be reversed from the magnetic head application position P4 to the cartridge loaded position P3, and the motor 56 is started in the reverse (unloading) direction. In this reverse operation, the gear arm 310 starts moving in the counterclockwise direction, and the sensors 260 and 326 are again turned ON. As the encoder cam gear 324 rotates, the concave catch 316b of the catch arm 312 re-engages the driving pin 298 as the concave stopper 300b of the locking arm 300 is forced away at the corner of the concave stopper 300b. At this point, the first encoder rib gap 322a passes through the first loading sensor 326, generating an ON signal that tells the control circuit to de-energize the electromagnet 290. Thus, the electromagnetic fail-safe mechanism is "uncocked", and the link arm 284 again moves together with the gear arm 310. The link arm 284 and the gear arm 310 then move together back to the cartridge loaded position P3 (in this case, the same as the standby position) where the second encoder rib 324 passes out of the detection gap of the second loading sensor 328 and generates an ON signal to the control circuit. Here, the control circuit stops the motor 56.

The timing from the cartridge loaded position P3, through the cartridge drawn-in position P2, to the cartridge insertion (in this case, ejection) position P1 is shown in FIG. 60. When the control circuit determines that the cartridge 42 is to be ejected, the motor 56 is again started in the reverse (unloading) direction. The cartridge holder is guided up to the cartridge drawn-in position P2. At this point, the slide plate 268 and hook lever 274, driven by the draw-in link member 266 and encoder cam gear 234, begin to push the cartridge 42 from the drawn-in position P2 inside the cartridge holder 100 to the insertion position P1. As the encoder cam gear 234 continues to rotate in the reverse direction, the interruptor member 250a passes out of the detection gap of the draw-in sensor 260, but the resultant ON signal is not used by the control circuit The control circuit determines that the disk cartridge 42 is brought back to the cartridge insertion position P1 when first encoder rib 322 passes out of the detection range of the first loading sensor 326, and stops the motor 56 at this point.

The timing of the automatic cartridge loading system 42 is again different when the electromagnetic fail-safe mechanism 288 has been actuated by a loss of power when the magnetic head base 62 is in the applied position (corresponding to control cam plate 102 and 104 magnetic head application position P4 ). The fail-safe mechanism sends the cartridge loading system 52 to the position P5 shown in plan, left, and right views in FIGS. 40, 49, and 50, respectively. The status of the timing control system 60 is shown in FIG. 65. FIG. 61 shows the timing of the sensor and signal status following a power loss, the dotted line representing a power loss. As previously described, when power is lost, the armature contact 300a is released from the electromagnet 290, the concave stopper 300b releases the axis pin 298, and the link arm 284 and control cam plates 102 and 104 return to the standby position (close to cartridge loaded position P3 ) under the bias of the return spring 318, moving the magnetic head 14 and magnetic head base 62 away from the disk 12.

When the link arm 284 returns to the standby position, the encoder cam gear 234 does not rotate, and the status of the loading sensors 326 and 328 remains unchanged at ON and OFF respectively, while the draw-in sensor 260 is again blocked by the interrupter member 250a as the link arm 284 returns. FIG. 65 shows the status of the timing control system 60 after an actuating of electromagnetic fail-safe mechanism 288. At this point, when power is returned, the control circuit performs a restart operation.

The control circuit recognizes that a restart operation must be performed by the ON, OFF, and ON status of the loading sensors 326 and 328 and the draw-in sensor 260, respectively. The control circuit then starts the driving motor 56 in a reverse (unloading) direction as shown in FIG. 62, and starts the spindle motor 44 to spin the disk 12. The link arm is not coupled to the gear arm 310 at this point and does not rotate. However, as the encoder cam gear 234 rotates, the gear arm 310 swings in a counterclockwise direction.

The first encoder rib 322 then enters the detection gap of the first loading sensor 326, turning OFF the sensor 326, followed by a short ON signal as the first encoder rib gap 322a enters the detection area of first loading sensor 326. These signals from the sensor 326 are ignored by the control circuit. Further rotation of the encoder cam gear 234 allows the concave catch 312b of the clock-biased catch arm 312 to re-engage the axis pin 298 of the link arm 284, and then advances the second encoder rib 324 out of the second loading sensor 328, generating an ON signal. This ON signal from the second loading sensor 326 signifies that the encoder cam gear is at the standby position, and the motor 56 is stopped.

When the control circuit determines that the magnetic head 14 is to be applied, the electromagnet 290 is energized, and the motor 56 again drives the encoder cam gear 234 in the forward (loading) direction (as shown in FIG. 63), moving the gear arm 310 and the link arm 284 in the clockwise direction, and the control cam plates 102 and 104 in the loading direction. The forward rotation of the encoder cam gear 234 causes, in order, an OFF signal of the second loading sensor 328, an OFF signal of the draw-in sensor 260, and a momentary ON signal of the first loading sensor 326, all of which are ignored by the control circuit. The magnetic head base 62 descends, guided by the control cam plates 102 and 104 as these signals are generated. As the rotation of the encoder cam gear 234 continues, when the magnetic head base 62 reaches the magnetic head application position P4, the first encoder rib 322 passes out of the detection range of the first loading sensor, generating an ON signal. The control circuit turns off the motor 56 upon receiving this ON signal from the first loading sensor 326, and the magnetic head 14 is in the writing position.

Thus, the timing control system 60 is able to load and unload a cartridge 42 and remove a magnetic head in all operating circumstances without the use of many sensors or a complicated electronic control circuit. Furthermore, the timing control system 60 uses very few part, and at least the cam encoder gear 234 and control cam plates 102 and 104 are unitarily formed, each serving multiple driving, guiding, and/or sensing functions.

(e) Shutter Operating Mechanism 40

An embodiment of a shutter operating mechanism according to the invention is shown in FIGS. 66 through 75. The shutter operating mechanism moves a shutter blade 38 in synchronization with cartridge loading and unloading events as previously described, completely retracting the shutter blade 38 from the cartridge loading path and completely covering the cartridge insertion slot 34 both when the disk drive 10 is empty and when a cartridge 42 is loaded.

As shown in FIGS. 66 and 67, the shutter operating mechanism 40 includes a shutter blade 38 and left and right swinging levers 212 and 210. The shutter blade 38 is swingably supported at the distal ends of the swinging levers 212 and 210. The left and right swinging levers 212 and 210 are swingably supported by left and right pin axes 208 and 206 on the respective sides plates 26e and 26d of the loading chassis 26. Torsion springs 220 and 218, provided to the pin axes 208 and 206, bias the swinging levers to swing downwards. The swinging levers 212 and 210 further include cam pins 216 and 214, projecting outwards from the respective swinging levers 212 and 210 at the approximate middle portions of the levers 212 and 210. The left and right cam pins 216 and 214 mate with respective cam grooves 101a and 101b of the corresponding cam plates 102 and 104. The motion of the swinging levers 212 and 210 is thereby defined by the profile and movement of the cam grooves 101a and 101b.

A sector gear 224 is rotatably mounted to an axis pin 222 provided to the front end of the swinging lever 210, near the shutter blade 38. The sector gear 224 includes a unitarily formed stopper 230, which is positioned on the opposite side of the axis pin 222, and is able to turn the sector gear 224 so that the sector gear 224 rotates upwards when the stopper 230 is rotated downwards. The sector gear 224 is biased to turn down by a torsion spring 228 provided to the axis pin 222. The sector gear 224 engages with a shutter blade gear 226, formed unitarily with the shutter blade 38. When the sector gear 224 turns up, the shutter blade gear 226 swings the rotatably mounted shutter blade 38 towards an open state. The sector gear 224 turns up when the stopper 230 is turned down by contact with a contact plate 118c on the right side plate 118a of the gear chassis 118, according to the motion of the right control cam plate 104 and the cam groove 11b.

The operational positions and steps of the shutter operating mechanism 40 appear in FIGS. 68 to 75. The operation of the shutter operating mechanism 40 is shown by only the right swinging lever 210, right cam pin 214, and right control cam plate 104. The left swinging lever 212 follows a symmetrically equivalent path as it is guided by the left control cam plate 102.

As shown in FIG. 68, when a disc cartridge 42 is not loaded in the disk drive 10, the right cam pin 214, controlling the movement of the right swinging lever 210, contacts the right cam groove 101*b* at the first horizontal portion C1, defining the lowest position of the right swinging lever 210. The symmetrical left side parts are similarly positioned. At this point, nothing contacts the stopper 230, and the shutter blade 38 is in the closed position by virtue of the bias of the torsion spring 228. As the front of a disk cartridge 42 is inserted into the chassis opening 36 of the disk drive as shown in FIGS. 69 and 70, the shutter blade 38 is pushed by the front end of the disk cartridge 42, and rotates inward. The inward rotation of the shutter blade 38 turns the shutter blade gear 226, turning the sector gear 224 against the bias of the torsion spring 228. The swinging levers 210 and 212 remain at their lowest positions.

As the cartridge 42 proceeds to the position shown in FIG. 71, the automatic cartridge loading system 52 is activated, and moves the control cams 102 and 104. The surface C2 of cam groove 101*b* lifts the cam pin 214, and the swinging lever 210 is moved up, bringing the shutter plate 38 up, as shown in FIG. 72. On the left side, the control cam plate 102, cam groove 101*a* and cam pin 216 are symmetrically engaged and in motion. Before the cam pin 214 reaches its highest position, the stopper 230 contacts the bottom of the contact plate 118*c* of the gear chassis 118, swinging the sector gear 224 up. As the cartridge 42 is drawn fully into the cartridge holder 100 by the automatic cartridge loading mechanism 52, the cam plates 102 and 104 continue, and the cam groove 104 guides the cam pin 214 to position C3, the highest position of the pin 214 and swinging lever 210 (FIG. 73). At this point, the stopper 230 has swung the sector gear 224 and the shutter blade 38 up and away from the cartridge 42. As the control cam plates 102 and 104 are later moved in an opposite direction to eject the cartridge 42, the shutter blade 38 must be moved to an open position when the cartridge 42 is ejected. Moving the shutter blade 38 up and away at the described point on the cam surface 101*b* serves to keep the shutter blade 38 from interfering with the cartridge 42 during the ejection operation.

After the cartridge 42 is completely drawn into the cartridge holder 100, the control cam plates 102 and 104 then continue into the state shown in FIG. 74. The right cam pin 214 follows the downwardly inclined surface C4 of the groove 101*b* (corresponding to movements of the pin 216 and groove 101*a* on the left side), and the swinging lever 210 swings down. At the same time, the stopper 230 moves away from the contact plate 18*c*, and the shutter blade 38 is returned to a vertical position. As the control cam plate 104 moves into the state shown in FIG. 75, the cam pin 214 engages the horizontal surface C5 of the cam groove 101*b*, and the shutter blade 38 closes the chassis opening 36 similarly to the beginning of the operation, but with the cartridge 42 and the cartridge holder 100 completely drawn into the disk drive 10 housing.

When the disk cartridge 42 is ejected, the control cam plates 102 and 104 move in opposite directions, and the shutter operating mechanism 40 operates in the reverse order to that described.

Thus, the shutter blade 28 closes the chassis opening 36 at all times, except during actual cartridge insertion or ejection. According to the described embodiment of a shutter operating mechanism 40, the shutter blade 38 is resiliently pressed against the inside surface of the front panel 26*a* of the loading chassis 26 by the bias of the torsion spring 228. Both swinging levers 210 and 212 are further resiliently pressed downward by the bias of the torsion springs 218 and 220. Consequently, if a foreign object is inserted into the chassis opening 36 during the cartridge loading operation, the shutter blade 38 and swinging levers 210 and 212 will resiliently give, and the shutter operating mechanism 40 is not damaged or jammed by any outside influence.

(f) Magnetic Head Vertical Positioning System 64

The magnetic head base 62 is precisely vertically positioned with respect to the mounting base 24 by means of a resilient four-point vertical positioning system 64. The positioning system includes right and left position determining fixtures 24*a* and 24*b*, mounted to posts at the rear of the mounting base 24 as shown in FIG. 8. The right and left position determining fixtures 24*a*, 24*b* have accurately machined top reference surfaces and cylindrical sockets 332*a*, 332*b* and are formed as cylindrical pin-socket members, the pin portions fitting into holes (not shown) on the posts of the mounting base 24. Alternatively, the top reference surfaces of the fixtures 24*a*, 24*b* and cylindrical sockets 332*a*, 332*b* may be unitarily formed with the mounting base 24.

The vertical positioning system 64 further includes the reference surface tabs 26*f* and 26*g* of the loading chassis 26, which provide reference surfaces towards the front of the magnetic head base 62, as shown in FIGS. 20 and 79. Lastly, the vertical positioning system 64 includes the resilient pressure members 200*a*, 200*b*, 201*a*, and 201*b*, and the wire springs 202 and 204, shown in FIGS. 15 through 18.

When the cam pins 178*a*, 178*b*, 179*a*, and 179*b* of the magnetic head base 62 reach the horizontal portion B5 of the cam grooves 103, 103*b*, 105*a*, and 105*b* respectively, the front and rear of the magnetic head base 62 contact the reference surfaces. The front end edge of the magnetic head base 62 abuts the reference surfaces 26*f* and 26*g*, and the rear end surface of the magnetic head base abuts the top reference surfaces of the fixtures 24*a* and 24*b*. At this point, the cam pins 178*a*, 178*b*, 179*a*, and 179*b* are slightly lifted from the horizontal portion B5, and push against the resilient pressure members 200*a*, 200*b*, 201*a*, and 201*b* respectively, at the position shown in FIGS. 47 and 48. Thus, the magnetic head base is dynamically and resiliently held against the reference surfaces 26*f* and 26*g* and the top reference surfaces of the fixtures 24*a* and 24*b*.

Thus, the dynamic four-point vertical positioning system 64 holds the magnetic head base 62 in a precise position with respect to the mounting base 24, and therefore with respect to the optical head 16. Furthermore, the magnetic head base is resiliently biased against reference surfaces, and is therefore more stable and less subject to misalignment.

(g) Magnetic Head Horizontal Positioning System 66

FIGS. 76 through 79 show an embodiment of a magnetic head horizontal positioning system 66 according to the invention. The horizontal positioning system 66 properly and precisely positions the magnetic head base 63 in the horizontal plane.

The left and right position determining fixtures 24*a* and 24*b*, mounted directly to the mounting base 24, have cylindrical position determining sockets 332*a* and 332*b* respectively, as shown in FIG. 76. The tapered position determining pins 334*a* and 334*b* of the magnetic head base 62 are positioned to engage with sockets 332*a* and 332*b* of the position determining fixtures 24*a* and 24*b* respectively, when the magnetic head base 62 is in the magnetic head application position P4. The matching pins 334*a*, 334*b* and sockets 332*a*, 332*b* are constructed such that the fit between left pin 334*a* and socket 332*a* is a clearance fit (allowing some horizontal relative movement), and the fit between the right pin 334*a* and socket 332*b* is a slip fit (no horizontal relative movement). FIG. 77 shows a bottom plan view of the fitted fixtures 24*a*, 24*b* and pins 334*a*, 334*b*.

The magnetic head horizontal positioning system 66 is shown in FIGS. 78(*a*) and 78(*b*), and includes a pre-load link arm 338, a pre-load slide plate 340, a pre-load arm 344, and a pre-load spring 346. The L-shaped pre-load link arm 338 is rotatably supported at the elbow of the L shape by an axis pin 26*b* fixed to the left side 26*b* of the loading chassis 26, and may rotate in a vertical plane. The pre-load link arm 338 includes a cam follower pin 348 on an arm of the L shape, which extends to the control cam plate 102 and is guided by the pre-load link arm 338 further includes a pusher pin 350, fixedly mounted to the remaining arm of the L shape, which extends below the magnetic head base 62 to push the slide plate 340 when the magnetic head base is in the magnetic head application position P4. The pre-load slide plate 240 is slidably mounted to the bottom of the magnetic head base 62, and the pre-load slide plate 340 slides in the X direction (FIG. 78(*b*), FIG. 79) when pushed by a pusher pin 350 attached to the pre-load link arm 338. The L-shaped pre-load arm 344 is rotatably mounted to the bottom of the magnetic head base at the elbow of the L shape, rotating in a horizontal plane about an axis pin 342 fixed to the bottom of the magnetic head base 62. The pre-load arm 344 includes a vertical contact portion 352 on a rear arm 344*a* of the L shape, and can rotate slightly such that the vertical contact portion 352 contacts the position determining fixture 24*a* when the magnetic head base is in the magnetic head application position P4. The pre-load spring 346 is stretched between a tab 344*c* on a transverse arm 344*b* of the L-shaped pre-load arm 344 and a tab 340*a* on the pre-load slide plate 340, and biases the slide plate 340 towards the back of the magnetic head base 62. When the slide plate 340 is not pushed by the pusher pin 350, the vertical contact portion 352 of the pre-load arm has a slight clearance with the position determining fixture 24*a*, as shown in FIG. 78(*a*). When the slide plate 340 is pushed, the vertical contact portion 352 is brought to contact the position determining fixture 24*a* as the pre-load arm is swung by the pre-load spring 240, as shown in FIG. 78(*b*).

As shown in FIG. 79, when the control cam plate 102 reaches the magnetic head application position P4, the pre-load link arm 338 rotates in a clockwise direction (from the perspective of FIG. 79), guided by the pre-load cam groove 113*a* and the cam follower pin 348, from the position shown by a solid line in FIG. 79 to the position shown by a double-dotted line in FIG. 79. At this point, the pusher pin 350 pushes the pre-load slide plate 340 in the direction opposite to the X loading direction against the bias of the pre-load spring 346. The pre-load spring 346 rotates the pre-load arm 344 so that the vertical contact portion 352 moves towards the position determining fixed 24*a* and contacts the outer circumference of the fixture 24*a*. At this point, the magnetic head base 62 is pushed at the vertical contact portion 352, and slightly rotates about the slip fit between the right position determining pin 334*b* and socket 332*b* of position determining fixture 24, such that the cylindrical wall of the left position determining fixture 24*a* is resiliently clamped between the vertical contact portion 352 and the left position determining pin 334*a*, as shown in FIG. 78(*b*). The magnetic head base 62 is thus precisely positioned and immobilized in the horizontal plane by the horizontal positioning system 66, by virtue of the initial restriction to a single rotational degree of freedom in a horizontal plane, and the removal of all horizontal freedom of movement with a resilient bias against a reference surface.

(h) Magnetic Head Carriage Lock Mechanism 70

When the linear motor 162 that moves the magnetic head carriage 68 is unpowered, the magnetic head carriage 68 is free to slide back and forth along the linear bearing 156 if it is not restrained. An embodiment of a mechanism 70 for locking the magnetic head carriage 68 in the "idle" position, according to the invention, appears in FIGS. 80 to 83.

The magnetic head carriage lock mechanism 70, shown in detail in FIGS. 82 and 83, includes a lock lever 356, positioned to engage the L-shaped stopper hook 354 of the magnetic head carriage 68. The lock lever 356 is substantially L-shaped with one arm of the L shape pointing downwards, and is rotatably mounted to a lock mount 358. The lock mount 358 is fixed to the upper part of the inner wall of the rear cover 30. The lock mount includes a mounting stay 360, two vertical fixture portions 362*a*, 362*b*, a shaft 364, and a torsion spring 366. The mounting stay 360 is directly attached to the rear cover 30, and the vertical fixture portions 362*a*, 362*b* are parallel and project downwards. The shaft 360 is fixed between the two fixture portions 362*a*, 362*b*, transverse to the X loading direction. The lock lever 356 is rotatably mounted to the shaft 360, and the torsion spring 366 is provided to the shaft 360 and biases the lock lever 356 in a clockwise direction (as seen in FIG. 83). When not engaged, the lock lever 356 is held with the upper arm of the L shape horizontal by a front edge portion of the mounting stay 360.

When the control circuit of the disk drive 10 determines that the magnetic head 14 is to be removed from the disk 12 (for example, at the position shown in FIG. 80), it controls the motor 56 to move the magnetic head base 62 to the "standby" position. In the "standby" position, the control circuit momentarily pauses the ascent of the magnetic head base 62. At this point, the linear motor 162 transfers the magnetic head carriage 68 towards the outer edge of the disk 12 until it reaches a mechanical stop, as shown in FIG. 81. Then, if the magnetic head base 62 is to be moved to the insertion position P1 or cartridge drawn-in position P2 (both of which are "idle" positions of the magnetic head base 62), the motor 56 is restarted and the magnetic head base continues to its topmost position (with the head carriage 68 held at the outermost position). As the magnetic head base 62 is moved to the "idle" position, the stopper hook 354 provided to the carriage arm 170 of the magnetic head carriage 68 engages with the spring-loaded lock lever 356. At this point, the magnetic head carriage 68 can only be released from the lock mechanism 70 to move horizontally if the magnetic head base 62 is moved back down by the control circuit. Thus, even if power to the disk drive 10 is removed, the magnetic head carriage 68 remains restrained from movement.

Thus, as a linear motor conventionally allows free movement when unpowered, the magnetic head carriage lock mechanism 70 immobilizes the magnetic head carriage 68 when the disk drive 10 is transported or idle. The sensitive magnetic head 14 is thereby protected from shock damage and misalignment.

(i) Head Synchronization Control System

In order to synchronize reading and writing operations of the MO disk drive 10, the magnetic head 14 and the optical head 16 must be dynamically aligned with each other. An embodiment of a magnetic head and optical head synchronization process performed by the control circuit is described in flow charts in FIGS. 84 through 87. FIG. 84 is a master flow chart for the entire process, and FIGS. 85 through 87 describe synchronization subroutines when the magnetic head 14 is applied to and removed from the disk. The system optimizes the synchronization process by aligning the magnetic head 14 and optical head 16 to each other early on, thus saving time later when the linear positions of the heads 14 and 16 are synchronized.

The process begins when the control circuit checks if the power is applied (step S10), and proceeds when the power is ON. A sensor check is then performed, where 15 the control circuit checks the first and second loading sensors 326 and 328 and the cartridge draw-in sensor 260 (S12). If the sensors 326, 328, and 260 are ON, OFF and OFF respectively, at step S12, the control circuit interprets these signals to mean that the electromagnetic fail-safe mechanism 288 has been released and the magnetic head base 62 has been moved to the "standby" position, and proceeds to step 24. If all the sensors 326, 328, 260 are ON, the control circuit interprets these signals to mean that the cartridge holder 100 and disk cartridge 42 are in the cartridge insertion position P1, and proceeds to step 14. If the sensors 326, 328, and 260 are not in either of the states described above at step S12, then the control circuit proceeds immediately to the cartridge ejection process (S22) and ejects any inserted cartridge 42 from the disk drive.

At step 14, the control circuit loops until the cartridge draw-in sensor 260 is OFF, signaling that a cartridge 42 has been inserted and pushed into the holder 100. The cartridge loading process (S16) is then started (described below and detailed in FIGS. 85 and 86), and after the cartridge is loaded to a reading or writing position, the control circuit begins a reading or writing process (S18). The reading or writing process continues until an eject switch 386 (see FIG. 1) is actuated (S20), whereupon the cartridge ejection process is performed (S22, described in detail below and shown in FIG. 87).

At step 24, the control circuit returns the encoder cam gear 324 to the "standby" position. The process flow then proceeds to the magnetic head re-application process (S26) to re-apply the magnetic head 14 to the disk 12, and returns to the main flow at the reading or writing process (S18).

The cartridge/magnetic head loading process (S16) is shown in detail in FIGS. 85 and 86. In this process, the motor 56 is driven in the forward (loading) rotation (S16A) until the second loading sensor 328 turns OFF (S16B) and the motor is stopped. These steps (S16A, S16B, S16C) result in the cartridge 42 being drawn in to the cartridge holder 100 and moved to the cartridge loaded position P3, and the magnetic head base 62 is moved to the "standby" position. In the cartridge loaded position P3, the disk 12 may be read by the optical head 16. The control circuit then checks a write protect sensor (not shown) and assigns 1 to the write protect flag (FWP) if the cartridge 42 is write protected, and 0 to FWP if the cartridge 42 is not write protected (S16D, S16E, S16F). The control circuit then rotates the spindle motor (S16G) at the ECMA standard operating speed 3000 rpm and actuates the linear motor 134 to move the optical head 16 to the innermost position (S16H). At this position, the optical head 16 reads the disk format information PEP (S16I) and raises the spindle motor 44 speed to 4000 rpm if the disk 12 is an ISO standard disk (S16J, S16K).

The control circuit then checks the write protect flag FWP in step S16L, and if the disk is write protected (FWP=1), the magnetic head will not be used and the control flow return directly to the main routine of FIG. 84. If the disk 12 is not write protected (FWP=0), the control circuit moves the magnetic head carriage 68 to the outermost position (S16M) and the optical head carriage 128 to the MFZ reading position (outermost position) at step S16N, and reads the manufacturer's formatting zone MFZ using the optical head 16 on the optical head carriage 128 to determine if the inserted disk 12 is single or double-sided (S16O, S16P). The MFZ reading position of the optical head 16 corresponds to the outermost position of the optical head 16, and is slightly inside the outermost position of the magnetic head 14. If the disk 12 is double-sided, the magnetic head 14 will not be used and the control flow returns directly to the main routine of FIG. 84.

If the disk is single-sided, the control circuit energizes the fail-safe electromagnet 290 (S16Q), and starts the motor 56, driving the motor 56 until the first loading sensor stays ON for more than 20 ms (S16R, S16S). These steps (S16Q, S16R, S16S) bring the magnetic head base 63 down to the magnetic head application position P4 where the magnetic head 14 may "fly" above the disk 12, and the magnetic head is electromagnetically held in position.

At this point, the control circuit moves the magnetic head carriage 68 to synchronize the radial positions of the optical and magnetic heads 14 and 16 (S16U), using the reflector page 154 on the optical carriage arm 154 and the photocouplers 150 and 150 on the magnetic head carriage arm 170. As both the magnetic head 14 and the optical head 16 are already at their outermost positions, the synchronizing time is very short. Alternatively, the magnetic head 14 is first brought inwards to a position corresponding to the MFZ reading position (the outermost position) of the optical head to further speed the synchronization process. At this point, the control circuit returns to the main process of FIG. 84.

The unloading process of step S22 appears in detail in FIG. 87. When the unloading process of step S22 is called, the control circuit rotates the motor 56 in a reverse direction until both the first and second loading sensors 326, 328 are ON, deenergizing the electromagnet 290 when the first loading sensor 326 is detected as ON and stopping the drive motor 56 and turning OFF the spindle motor 44 when the second loading sensor 328 is detected as ON (S22A through S22F). In this case, the ON detection of the first detecting sensor 326 is caused by the first detection rib gap 322A. In these steps (S22A through S22F), the magnetic head base 62 is brought from the magnetic head application position P4 to the "standby" position (corresponding to the cartridge loaded position P3 ). The spindle motor 44 slows down gradually when turned OFF in step S22F by virtue of the rotational inertia of the loaded disk 12. The control circuit then activates the linear motor 162 to move the magnetic head carriage 68 to the outermost radial position (S22G), and waits for the spindle motor to stop (S22H).

The driving motor 56 is re-activated in the reverse (unloading) direction until the first loading sensor 326 is detected as ON, where the motor 56 is stopped (S22I, S22J, S22K). These Steps (S22, S22J, S22K) move the cartridge holder to the topmost position and push the disk cartridge holder to the topmost position and push the disk cartridge 42 out to the cartridge insertion position P1, and further move the magnetic head base 62 to the topmost "idle" position where the magnetic head carriage lock mechanism 70 engages and immobilizes the magnetic head carriage 68. The disk cartridge 42 is partially ejected through the front panel opening 34 at the cartridge insertion position P1, and may be easily extracted by hand. The control circuit then terminates the unloading process and returns to the main process of FIG. 84.

As described, by this system, the control circuit is able to save time in the initialization process by ensuring that the magnetic head 14 and optical head 16 are almost aligned before beginning any synchronization process, even before it is decided by the control circuit that synchronization is necessary.

(j) Beam Splitter Arrangement 74

An arrangement for a laser beam splitter 74 appears in detail in FIGS. 92 and 93. The beam splitter arrangement 74 keeps all incident and exiting beams perpendicular or parallel to each other, while at the same time reflecting stray light away from a laser source 370 and the signal detector 376. A laser optical system 72 that directs a laser beam to the optical head 16 is mounted at the back of the mounting base 24, as shown in Fibs. 36 and 41. Shown in detail in FIG. 92, the laser optical system 72 includes an optical housing 368 fixed to the mounting base 24 at the laser optics reference plane z. The optical housing 368 includes a semiconductor laser source 370, a collimator lens 372 for converging the laser beam from the laser 370, and a beam splitter 74. The laser beam from the semi-conductor laser source 370 follows the optical axis Lo (In an opposite direction along the Lo direction arrow to the direction shown in FIG. 93) and impinges on the beam splitter 74, where it is divided into two beams, a first beam directed to the optical head 16 and the disk 12 along and optical axis L1 and a second beam directed to a power controller photodiode 374 along an optical axis L2. Light reflected from the disk 12 enters the optical head 16, and returns along the optical axis L1, striking the beam splitter 74, and then is internally reflected in the beam splitter 74 to a condenser lens 378 along an optical axis L3. The condenser lens 378 converges the beam along the optical axis L3. The converged beam proceeds to a polarizing splitter 380 where it is split into so-called called s and p polarized light beams, which are sent on to a signal detector 376.

The beam splitter 74 is formed by cementing a dielectric semi-transmissive layer and two triangular prisms 382 and 384 by known optical cementing techniques. The first triangular prism 382 includes two right angle surfaces 382a and 382b, at right angles to each other, and a hypotenuse surface 382c as shown in FIG. 93. The second triangular prism 384 also includes two right angle surfaces 382a and 384b, at right angles to each other, and a hypotenuse surface 384c. The beam splitter 74 is formed by cementing the hypotenuse surface 384c of the second prism 384 to a right angle surface 382a of the first prism 382. The dielectric semi-transmissive mirror layer is formed between the cemented surfaces 382c and 384b.

To prevent stray light from returning to the semiconductor laser 370 or from striking the signal detector 376, the angles between reflective and transmissive surfaces are predetermined to direct scattered light toward other directions. The angle between the right angle surface 382a and the hypotenuse (cemented) surface 382c of the first prism is 44 degrees, and the angle between the right angle (cemented) surface 384b and the hypotenuse surface 384c is 44 degrees. The beam splitter is arranged such that a normal line N1 to the surface 382a of the first prism 382 is inclined by 1.51 degrees to the optical axis Lo. If an optical medium having a refractive index of 1.51 is used for the prisms 382 and 384, the angle between the optical axis Lo (refracted beam entering the prism) and the normal line N1 becomes 1 degree. Consequently, both the angle of incident light along optical axis Lo upon the semi-transmissive prism surface 384b and the angle of reflected light from the semi-transmissive surface 384b along optical axis L1 are 45 degrees. The optical axis L1 is inclined by 1 degree from the normal N2 to the surface 382b, and the exit optical axis L1 is inclined by 1.51 degrees from the normal N2. Similarly, the exit optical axes L2 and L3 from the hypotenuse surface 384c are each deflected from the normal N3 or N4 to the surface by 1.51 degrees.

Accordingly, the optical axes Lo and L1 are maintained perpendicular to each other, and the optical axes L2 and L3 are kept parallel, duplicating the axis relationships of a conventional beam splitter made with two cemented isosceles triangle sided prisms. However, by inclining the optical axes to the normal lines of incident and exit surfaces, the reflected stray light at each surface follows a different path than incident light. For example, stray light emitted by the semiconductor laser source 370 and reflected by the hypotenuse surface 382a is reflected at an angle of 3.02 degrees and does not return to the semiconductor laser source 370. Similarly, stray light reflected by the semi-transmissive surface 384b to the right angle surface 382b is reflected from the surface 382b at a 2 degree angle within the prism, and does not fall upon either the semiconductor laser source 370 or upon the signal detector 376.

Furthermore, the semi-transmissive dielectric mirror surface of a beam splitter must be redesigned when the angle of incident light changes. In the described beam splitter structure 74, the angle of incident light on the semi-transmissive mirror surface is always 45 degrees. Since the 45 degree angle is the same as conventional isosceles triangle prism beam splitters, the semi-transmissive dielectric mirror layer does not require redesign.

The present disclosure relates to subject matter contained in Japanese Patent Application Nos. HEI 5-300868, HEI 5-300869, HEI 5-300870, HEI 5-300871, HEI 5-300872, HEI 5-300873 and HEI 5-300875, all filed on Nov. 6, 1993, which are expressly incorporated herein by reference in their entireties.

What is claimed is:

1. A disk cartridge loading system for a disk drive, comprising:

a disk cartridge holder provided in said disk drive;

a drawing mechanism which draws a disk cartridge from an insertion position, where the disk cartridge is partially inserted, to a draw-in position, where the disk cartridge is fully returned into said disk drive so that said disk cartridge is accommodated in said disk cartridge holder;

a magnetic head that is in an idle position when the disk cartridge is in the insertion position and the draw-in position;

a holder moving mechanism that moves said disk cartridge holder downwardly from the draw-in position to a loaded position where at least one of data reading and data writing is performed on a recording media accommodated in said disk cartridge, the holder moving mechanism further moving the magnetic head from the idle position to a standby position synchronous to the movement of the disk cartridge holder, the standby position being where the magnetic head is away from the disk cartridge held in the disk drive, but being closer than the idle position;

a draw-in sensor that detects the insertion position of said disk cartridge into said disk cartridge holder;

a loading sensor that detects when said disk cartridge is located at said loaded position;

a head moving mechanism that moves the magnetic head from the standby position to a head application position after the loading sensor detects that the disk cartridge is located at the loaded position, the head application position being a position where the magnetic head is proximate to the disk cartridge and positioned for performing data writing; and a control unit that drives said drawing mechanism, said holder moving mechanism and said head moving mechanism based on said detection of said draw-in sensor and said detection of said loading sensor.

2. The disk cartridge loading system of claim 1, wherein said drawing mechanism is provided to one side of said disk cartridge holder.

3. The disk cartridge loading system of claim 1, wherein said drawing mechanism draws said disk cartridge in response to the detection by said draw-in sensor, and wherein said drawing mechanism stops drawing said disk cartridge in response to the detection by said loading sensor.

4. The disk cartridge loading system of claim 1, wherein said draw-in sensor and said loading sensor comprise photo-interruptor sensors.

5. The disk cartridge loading system of claim 1, wherein said drawing mechanism and said holder moving mechanism are moved by a common driving mechanism.

6. The disk cartridge loading system of claim 5, wherein said common driving mechanism includes a cam.

7. The disk cartridge loading system of claim 6, wherein said loading sensor is arranged to detect a rib formed on said cam.

8. The disk cartridge loading system of claim 1, wherein a direction which said holder moving mechanism moves said disk cartridge holder to the loaded position is transverse to a direction which said drawing mechanism draws the disk cartridge.

9. The disk cartridge loading system of claim 1, wherein a type of the disk is written in the disk, and is read by an optical head while the disk cartridge is in the loaded position, and wherein when the type of the disk is a rewritable disk, the head moving mechanism moves the magnetic head from the standby position to the head application position.

10. The disk cartridge loading system of claim 1, wherein a type of the disk is written in the disk, and is read by an optical head while the disk cartridge is in the loaded position, and wherein when the type of the disk is a single-sided disk, the head moving mechanism moves the magnetic head from the standby position to the head application position.

11. A disk cartridge loading system of a disk drive, comprising:

a receiver into which a disk cartridge is partially inserted;

an insertion detector that detects said partial insertion of said disk cartridge into said receiver;

a drawing mechanism that draws said disk cartridge into said disk drive in response to said insertion detector detecting said partial insertion of said disk cartridge into said receiver;

a magnetic head that is in an idle position when the insertion detector detects the partial insertion of the disk cartridge and while the drawing mechanism draws said disk cartridge into the disk drive;

a loading mechanism that moves said disk cartridge downwardly to a loading position, where at least one of a data writing operation and a data reading operation is performed, the loading mechanism further moving the magnetic head downwardly from the idle position to a standby position synchronous to the movement of the disk cartridge, the standby position being where the magnetic head is away from the disk cartridge held in the disk drive, but being closer than the idle position;

loading sensor that detects when the disk cartridge is moved to the loading position; and a head moving mechanism that moves the magnetic head downwardly from the standby position to a head application position after said loading sensor detects that the disk cartridge is moved to the loading position the head application position being a position where the magnetic head is proximate to said disk cartridge and positioned for performing the data writing operation.

12. The disk cartridge loading system of claim 11, further comprising:

a cartridge holder, said drawing mechanism drawing said disk cartridge into said cartridge holder associated with said disk drive.

13. The disk cartridge loading system of claim 11, further comprising:

a cartridge holder that accommodates said disk cartridge drawn by said drawing mechanism, said cartridge holder being moved by said loading mechanism to said loading position after said cartridge holder accommodates said disk cartridge.

14. The disk cartridge loading system of claim 11, wherein said drawing mechanism comprises a hook that engages said partially inserted disk cartridge.

15. The disk cartridge loading system of claim 11, wherein a direction which said loading mechanism moves said disk cartridge to the loading position is transverse to a direction which said drawing mechanism draws the disk cartridge.

16. The disk cartridge loading system of claim 11, wherein a type of the disk is written in the disk, and is read by an optical head while the disk cartridge is in the loading position, and wherein when the type of the disk is a rewritable disk, the head moving mechanism moves the magnetic head from the standby position to the head application position.

17. The disk cartridge loading system of claim 11, wherein a type of the disk is written in the disk, and is read by an optical head while the disk cartridge is in the loading position, and wherein when the type of the disk is a single-sided disk, the head moving mechanism moves the magnetic head from the standby position to the head application position.

* * * * *